(12) United States Patent
Sperry et al.

(10) Patent No.: US 8,465,689 B2
(45) Date of Patent: Jun. 18, 2013

(54) ELEVATOR AND METHOD FOR TILTING SOLID IMAGE BUILD PLATFORM FOR REDUCING AIR ENTRAINMENT AND FOR BUILD RELEASE

(75) Inventors: Charles R. Sperry, Leeds, MA (US); Dennis F. McNamara, Jr., Charlestown, NH (US); Suzanne M. Scott, Springfield, VT (US); Charles W. Hull, Santa Clarita, CA (US); Mehdi Mojdeh, Valencia, CA (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 13/176,190

(22) Filed: Jul. 5, 2011

(65) Prior Publication Data

US 2011/0272857 A1 Nov. 10, 2011

Related U.S. Application Data

(63) Continuation of application No. 11/856,225, filed on Sep. 17, 2007, now Pat. No. 8,003,039.

(60) Provisional application No. 60/885,257, filed on Jan. 17, 2007, provisional application No. 60/949,614, filed on Jul. 13, 2007, provisional application No. 60/956,051, filed on Aug. 15, 2007.

(51) Int. Cl.
*B29C 35/08* (2006.01)
*B29C 41/02* (2006.01)
*B29C 41/42* (2006.01)

(52) U.S. Cl.
USPC ............................. 264/401; 264/308; 264/334

(58) Field of Classification Search
USPC ........................................ 264/308, 334, 401
See application file for complete search history.

(56) References Cited

U.S. PATENT DOCUMENTS

| 4,752,498 A | 6/1988 | Fudim |
| 4,837,379 A | 6/1989 | Weinberg |
| 4,929,402 A | 5/1990 | Hull |

(Continued)

FOREIGN PATENT DOCUMENTS

| DE | 4105314 | 8/1991 |
| DE | 4102257 | 7/1992 |

(Continued)

OTHER PUBLICATIONS

English Transalation of DE 19957370A1, (Jun. 13, 2001).

(Continued)

*Primary Examiner* — Leo B Tentoni

(57) ABSTRACT

A solid imaging apparatus is provided that includes a replaceable cartridge containing a source of build material and an extendable and retractable flexible transport film for transporting the build material layer-by-layer from the cartridge to the surface of a build in an image plane. An operator using the device needs merely to remove a spent cartridge and replace it with a fresh cartridge to continue solid imaging virtually uninterrupted. The apparatus also includes the capability of withdrawing and inserting an imager without the operator having to perform a separate alignment step. A brush attached to the transport film and forming part of the cartridge provides for intra-layer removal of excess uncured build material. If desired, the apparatus can produce a fully reacted build. A high intensity UV source cures the build between layers. An injection molded build pad is designed to hold a build in an inverted position for improving the build. The invention also provides for tilting the build elevator to reduce air entrainment and for releasing the build from the image plane.

8 Claims, 62 Drawing Sheets

U.S. PATENT DOCUMENTS

| | | | |
|---|---|---|---|
| 4,999,143 | A | 3/1991 | Hull et al. |
| 5,014,207 | A | 5/1991 | Lawton |
| 5,049,901 | A | 9/1991 | Gelbart |
| 5,093,130 | A | 3/1992 | Fujii et al. |
| 5,094,935 | A | 3/1992 | Vassiliou et al. |
| 5,096,530 | A | 3/1992 | Cohen |
| 5,122,441 | A | 6/1992 | Lawton et al. |
| 5,132,723 | A | 7/1992 | Gelbart |
| 5,137,662 | A | 8/1992 | Hull et al. |
| 5,139,338 | A | 8/1992 | Pomerantz et al. |
| 5,143,663 | A | 9/1992 | Leyden et al. |
| 5,143,664 | A | 9/1992 | Noguchi et al. |
| 5,143,817 | A | 9/1992 | Lawton et al. |
| 5,157,423 | A | 10/1992 | Zur |
| 5,158,858 | A | 10/1992 | Lawton et al. |
| 5,169,579 | A | 12/1992 | Marcus et al. |
| 5,171,490 | A | 12/1992 | Fudim |
| 5,173,266 | A | 12/1992 | Kenney |
| 5,174,931 | A | 12/1992 | Almquist et al. |
| 5,192,559 | A | 3/1993 | Hull et al. |
| 5,236,637 | A | 8/1993 | Hull |
| 5,236,812 | A | 8/1993 | Vassiliou et al. |
| 5,247,180 | A | 9/1993 | Mitcham et al. |
| 5,248,456 | A | 9/1993 | Evans, Jr. et al. |
| 5,263,130 | A | 11/1993 | Pomerantz et al. |
| 5,268,994 | A | 12/1993 | Keskes |
| 5,289,214 | A | 2/1994 | Zur |
| 5,298,208 | A | 3/1994 | Sibley et al. |
| 5,306,446 | A | 4/1994 | Howe |
| 5,345,391 | A | 9/1994 | Hull et al. |
| 5,360,981 | A | 11/1994 | Owen et al. |
| 5,391,072 | A | 2/1995 | Lawton et al. |
| 5,429,908 | A | 7/1995 | Hokuf et al. |
| 5,447,822 | A | 9/1995 | Hull et al. |
| 5,474,719 | A | 12/1995 | Fan et al. |
| 5,510,077 | A | 4/1996 | Dinh et al. |
| 5,529,473 | A | 6/1996 | Lawton et al. |
| 5,545,367 | A | 8/1996 | Bae et al. |
| 5,569,431 | A | 10/1996 | Hull |
| 5,571,471 | A | 11/1996 | Hull |
| 5,573,721 | A | 11/1996 | Gillette |
| 5,630,981 | A | 5/1997 | Hull |
| 5,650,260 | A | 7/1997 | Onishi |
| 5,651,934 | A | 7/1997 | Almquist et al. |
| 5,653,925 | A | 8/1997 | Batchelder |
| 5,695,708 | A | 12/1997 | Karp et al. |
| 5,823,778 | A | 10/1998 | Schmitt et al. |
| 5,858,746 | A | 1/1999 | Hubbell et al. |
| 5,876,550 | A | 3/1999 | Feygin et al. |
| 5,891,382 | A | 4/1999 | Almquist et al. |
| 5,894,036 | A | 4/1999 | Tylko |
| 5,902,537 | A | 5/1999 | Almquist et al. |
| 5,945,058 | A | 8/1999 | Manners et al. |
| 5,980,813 | A | 11/1999 | Narang et al. |
| 6,013,099 | A | 1/2000 | Dinh et al. |
| 6,027,324 | A | 2/2000 | Hull |
| 6,048,487 | A | 4/2000 | Almquist et al. |
| 6,051,179 | A | 4/2000 | Hagenau |
| 6,153,034 | A | 11/2000 | Lipsker |
| 6,158,946 | A | 12/2000 | Miyashita |
| 6,171,610 | B1 | 1/2001 | Vacanti et al. |
| 6,174,156 | B1 | 1/2001 | Chapman et al. |
| 6,206,672 | B1 | 3/2001 | Grenda |
| 6,280,727 | B1 | 8/2001 | Prior et al. |
| 6,281,903 | B1 | 8/2001 | Martin et al. |
| 6,334,865 | B1 | 1/2002 | Redmond et al. |
| 6,352,710 | B2 | 3/2002 | Sawhney et al. |
| 6,391,245 | B1 | 5/2002 | Smith |
| 6,500,378 | B1 | 12/2002 | Smith |
| 6,547,552 | B1 | 4/2003 | Fudim |
| 6,630,009 | B2 | 10/2003 | Moussa et al. |
| 6,641,772 | B2 | 11/2003 | Gelbart |
| 6,665,048 | B2 | 12/2003 | Gelbart |
| 6,733,267 | B2 | 5/2004 | Chapman et al. |
| 6,764,636 | B1 | 7/2004 | Allanic et al. |
| 6,792,327 | B1 | 9/2004 | Bamford |
| 6,824,714 | B1 | 11/2004 | Turck et al. |
| 6,833,231 | B2 | 12/2004 | Moussa et al. |
| 6,833,234 | B1 | 12/2004 | Bloomstein et al. |
| 6,932,935 | B1 | 8/2005 | Oberhofer et al. |
| 6,942,830 | B2 | 9/2005 | Mulhaupt et al. |
| 6,965,364 | B1 | 11/2005 | Eggers et al. |
| 6,974,656 | B2 | 12/2005 | Hinczewski |
| 6,989,225 | B2 | 1/2006 | Steinmann |
| 7,052,263 | B2 | 5/2006 | John |
| 7,073,883 | B2 | 7/2006 | Billow |
| 7,090,484 | B2 | 8/2006 | Ueno |
| 7,128,866 | B1 | 10/2006 | Henningsen |
| 7,133,041 | B2 | 11/2006 | Kaufman et al. |
| 7,158,849 | B2 | 1/2007 | Huang et al. |
| 7,195,472 | B2 | 3/2007 | John |
| 7,215,430 | B2 | 5/2007 | Kacyra et al. |
| 7,261,542 | B2 | 8/2007 | Hickerson et al. |
| 7,467,939 | B2 | 12/2008 | Sperry et al. |
| 2001/0028495 | A1 | 10/2001 | Quate et al. |
| 2001/0048183 | A1 | 12/2001 | Fujita |
| 2002/0028854 | A1 | 3/2002 | Allanic et al. |
| 2002/0153640 | A1 | 10/2002 | John |
| 2002/0155189 | A1 | 10/2002 | John |
| 2002/0195748 | A1 | 12/2002 | Farnworth |
| 2003/0021823 | A1 | 1/2003 | Landers et al. |
| 2003/0067539 | A1 | 4/2003 | Doerfel et al. |
| 2003/0074096 | A1 | 4/2003 | Das et al. |
| 2003/0205849 | A1 | 11/2003 | Farnworth |
| 2004/0008309 | A1 | 1/2004 | Yamahara et al. |
| 2004/0075882 | A1 | 4/2004 | Meisburger |
| 2004/0118309 | A1 | 6/2004 | Fedor et al. |
| 2004/0265413 | A1 | 12/2004 | Russell et al. |
| 2005/0023710 | A1 | 2/2005 | Brodkin et al. |
| 2005/0208168 | A1 | 9/2005 | Hickerson et al. |
| 2005/0248061 | A1 | 11/2005 | Shkolnik et al. |
| 2005/0248062 | A1 | 11/2005 | Shkolnik et al. |
| 2005/0288813 | A1 | 12/2005 | Yang et al. |
| 2006/0078638 | A1 | 4/2006 | Holmboe et al. |
| 2006/0192312 | A1 | 8/2006 | Wahlstrom et al. |
| 2006/0223901 | A1 | 10/2006 | Xu |
| 2006/0239588 | A1 | 10/2006 | Hull et al. |
| 2006/0249884 | A1 | 11/2006 | Partanen et al. |
| 2007/0063389 | A1 | 3/2007 | John |
| 2007/0074659 | A1 | 4/2007 | Wahlstrom |
| 2007/0075458 | A1 | 4/2007 | Wahlstrom et al. |
| 2007/0075459 | A1 | 4/2007 | Reynolds et al. |
| 2007/0075460 | A1 | 4/2007 | Wahlstrom et al. |
| 2007/0075461 | A1 | 4/2007 | Hunter et al. |
| 2007/0077323 | A1 | 4/2007 | Stonesmith et al. |
| 2007/0120842 | A1 | 5/2007 | Hess |
| 2007/0257055 | A1 | 11/2007 | Scott et al. |
| 2007/0259066 | A1 | 11/2007 | Sperry et al. |
| 2008/0038396 | A1 | 2/2008 | John et al. |
| 2008/0054531 | A1 | 3/2008 | Kerekes et al. |
| 2008/0169586 | A1 | 7/2008 | Hull et al. |
| 2008/0169589 | A1 | 7/2008 | Sperry et al. |
| 2008/0170112 | A1 | 7/2008 | Hull et al. |
| 2008/0171284 | A1 | 7/2008 | Hull et al. |
| 2008/0179786 | A1 | 7/2008 | Sperry et al. |
| 2008/0179787 | A1 | 7/2008 | Sperry et al. |
| 2008/0181977 | A1 | 7/2008 | Sperry et al. |
| 2008/0206383 | A1 | 8/2008 | Hull et al. |
| 2008/0217818 | A1 | 9/2008 | Holmboe et al. |
| 2008/0226346 | A1 | 9/2008 | Hull et al. |
| 2008/0231731 | A1 | 9/2008 | Hull et al. |
| 2008/0309665 | A1 | 12/2008 | Gregory, II |
| 2009/0020901 | A1 | 1/2009 | Schillen et al. |

FOREIGN PATENT DOCUMENTS

| | | |
|---|---|---|
| DE | 4125534 | 2/1993 |
| DE | 9319405 | 3/1994 |
| DE | 4340108 | 6/1995 |
| DE | 19727554 | 1/1999 |
| DE | 29911122 | 9/1999 |
| DE | 19838797 | 3/2000 |
| DE | 19929199 | 1/2001 |
| DE | 19957370 | 6/2001 |
| DE | 10003374 | 8/2001 |
| DE | 20106887 | 9/2001 |
| DE | 10018987 | 10/2001 |
| DE | 10119817 | 10/2002 |

| | | |
|---|---|---|
| DE | 69909136 | 5/2004 |
| DE | 10256672 | 6/2004 |
| EP | 0250121 | 12/1987 |
| EP | 0322257 | 6/1989 |
| EP | 0426363 | 5/1991 |
| EP | 0435564 | 7/1991 |
| EP | 0466422 | 1/1992 |
| EP | 0470705 | 2/1992 |
| EP | 0484086 | 5/1992 |
| EP | 0549993 | 7/1993 |
| EP | 0676275 | 10/1995 |
| EP | 1156922 | 11/2001 |
| EP | 1192041 | 4/2002 |
| EP | 1250995 | 10/2002 |
| EP | 1253002 | 10/2002 |
| EP | 1270185 | 1/2003 |
| EP | 1274559 | 1/2003 |
| EP | 1338846 | 8/2003 |
| EP | 1439051 | 7/2004 |
| EP | 1439052 | 7/2004 |
| EP | 1250997 | 11/2005 |
| EP | 1600282 | 11/2005 |
| EP | 1674243 | 6/2006 |
| EP | 1849587 | 10/2007 |
| EP | 1864785 | 12/2007 |
| EP | 1880830 | 1/2008 |
| EP | 1894704 | 3/2008 |
| EP | 1950032 | 7/2008 |
| EP | 2011631 | 1/2009 |
| FR | 2254194 | 7/1975 |
| FR | 2583334 | 12/1986 |
| FR | 2634686 | 2/1990 |
| FR | 2692053 | 12/1993 |
| JP | 04371829 | 12/1992 |
| JP | 08192469 | 7/1996 |
| JP | 2002370286 | 12/2002 |
| JP | 6-39928 | 12/2007 |
| WO | 9511007 | 4/1995 |
| WO | 9600422 | 1/1996 |
| WO | 0100390 | 1/2001 |
| WO | 0112679 | 2/2001 |
| WO | 0133511 | 5/2001 |
| WO | 0172501 | 10/2001 |
| WO | 0236331 | 5/2002 |
| WO | 03059184 | 7/2003 |
| WO | 2005110722 | 11/2005 |
| WO | 2006109425 | 10/2006 |

OTHER PUBLICATIONS

PCT Search Report for International Application No. PCT/US2007/087715 dated Aug. 11, 2008.

PCT Search Report for International Application No. PCT/US2007/087716 dated Aug. 11, 2008.

PCT Search Report for International Application No. PCT/US2007/087718 dated Oct. 9, 2008.

PCT Search Report for International Application No. PCT/US2007/087720 dated Aug. 11, 2008.

C. Sun et al., "Projection Micro-Stereolithography Using Digital Micro-Mirror Dynamic Mask" Sensors and Actuators A 121 (2005) 113-120, available online at www.sciencedirect.com.

C. Chen et al., "Gray-Scale Photolithography Using Microfluidic Photomasks," PNAS, Feb. 18, 2003, vol. 100, No. 4, 1499-1504.

K. Takahashi, "A New Application of DMD to Photolithography and Rapid Prototyping System," Institute of Electronics, Information, and Communication Engineers.

Yi Lu et al., "A Digital Micro-Mirror Device-Based System for the Microfabrication of Complex, Spatially Patterned Tissue Engineering Scaffolds," Jan. 27, 2006, 396-405: available at www.interscience.wiley.com.

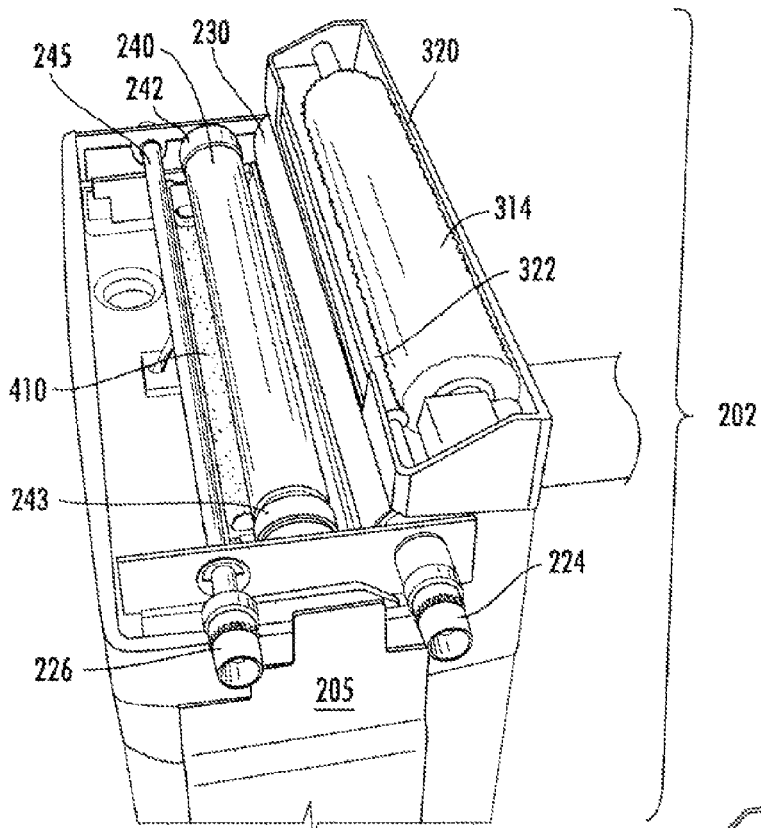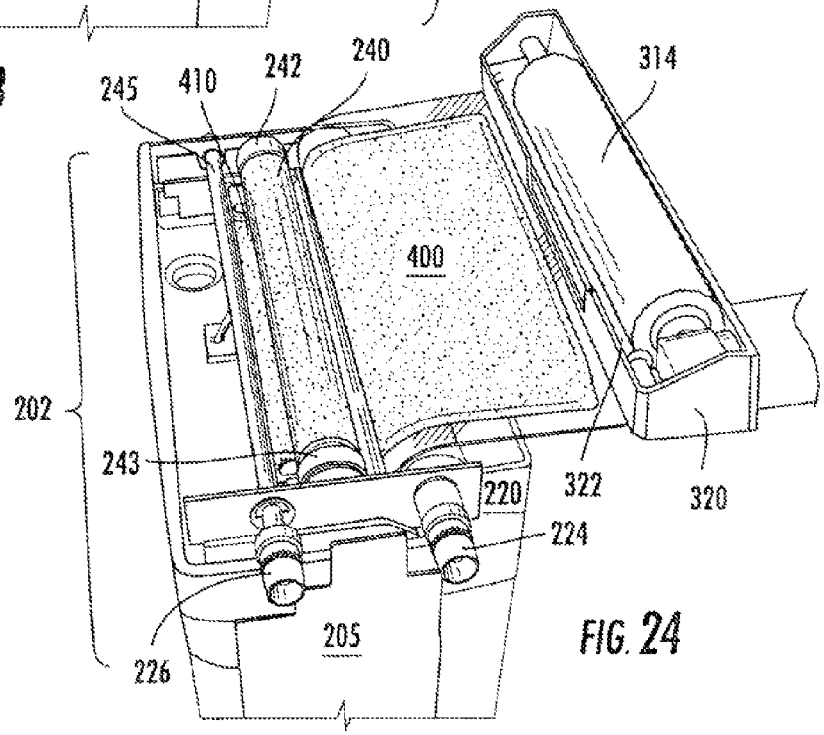

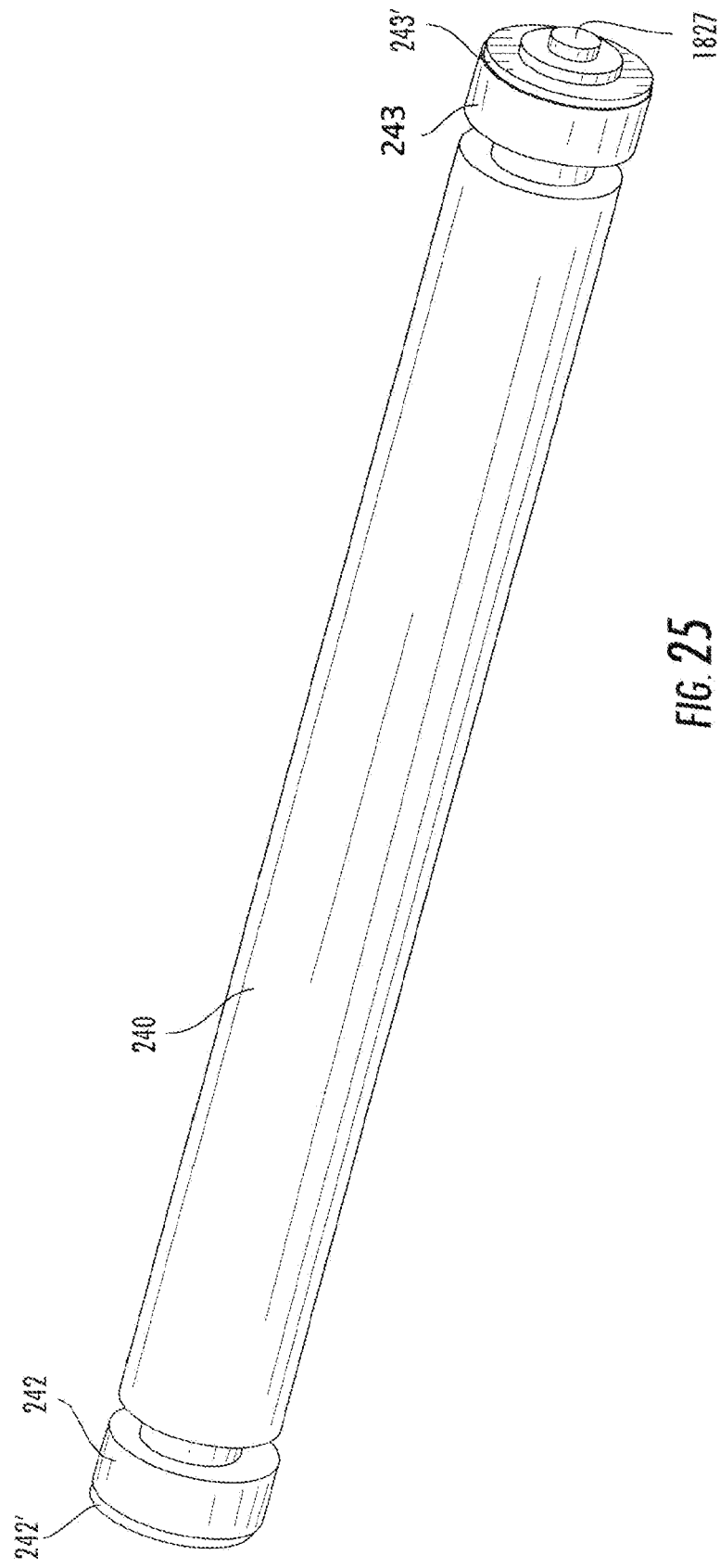

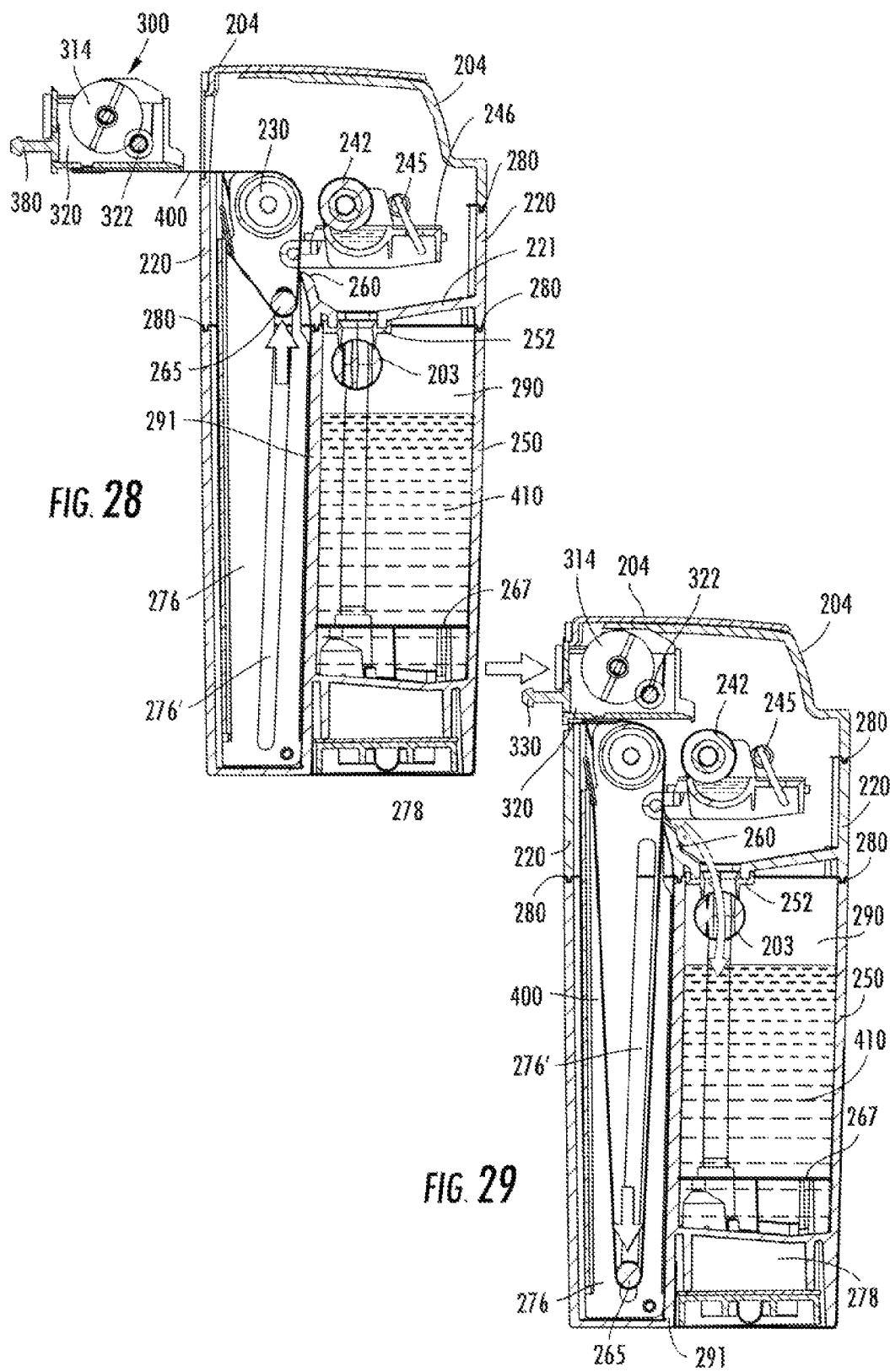

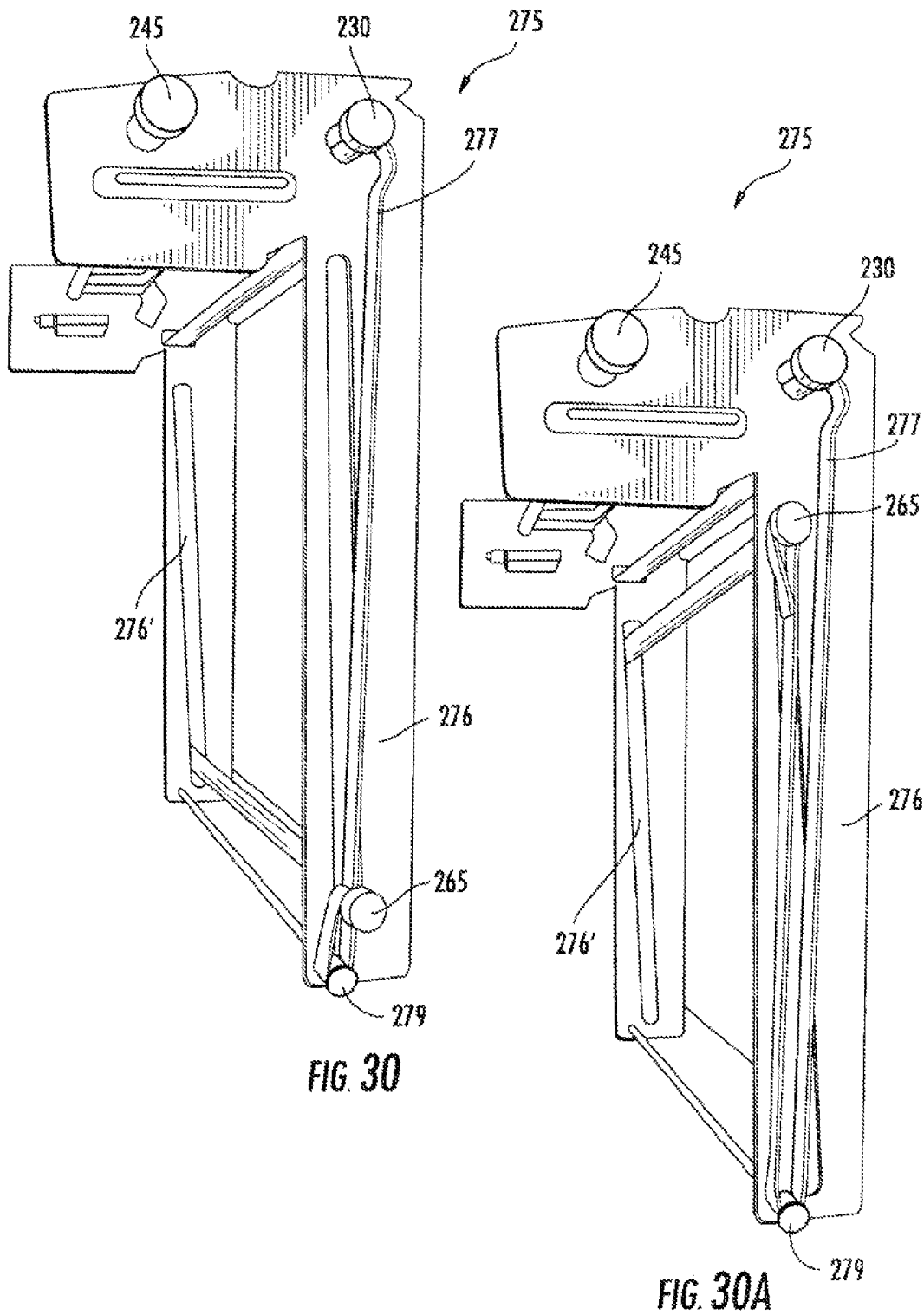

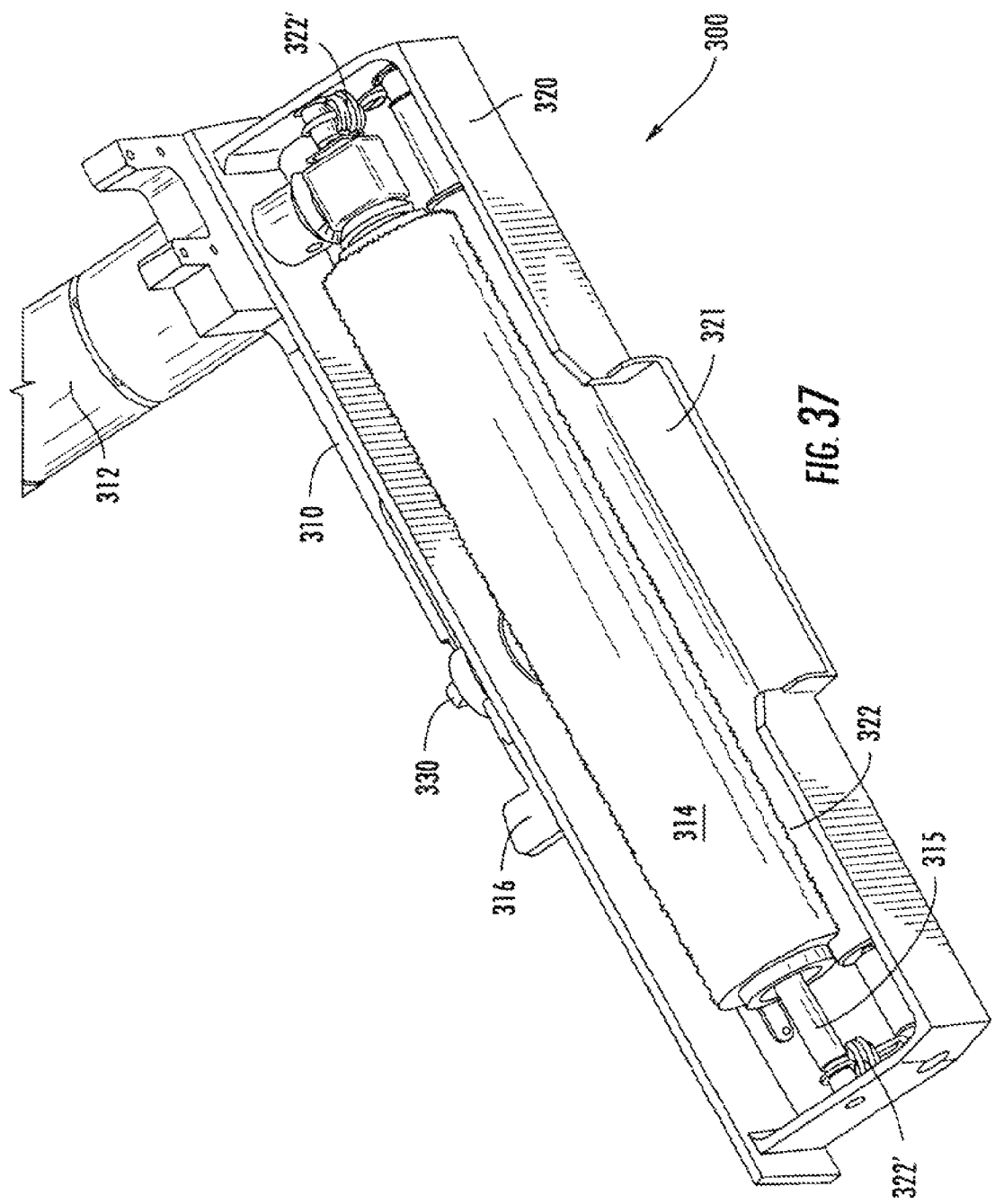

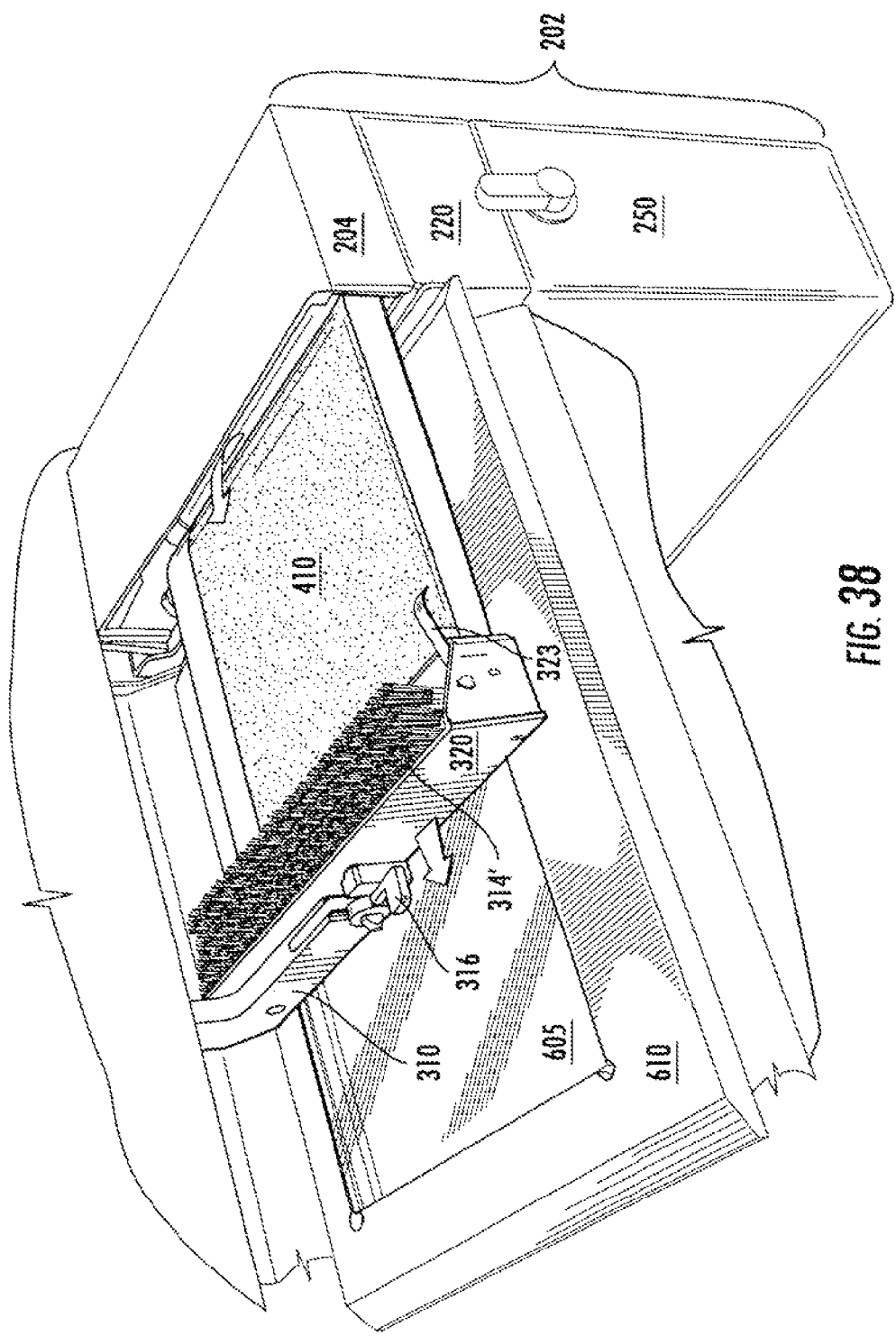

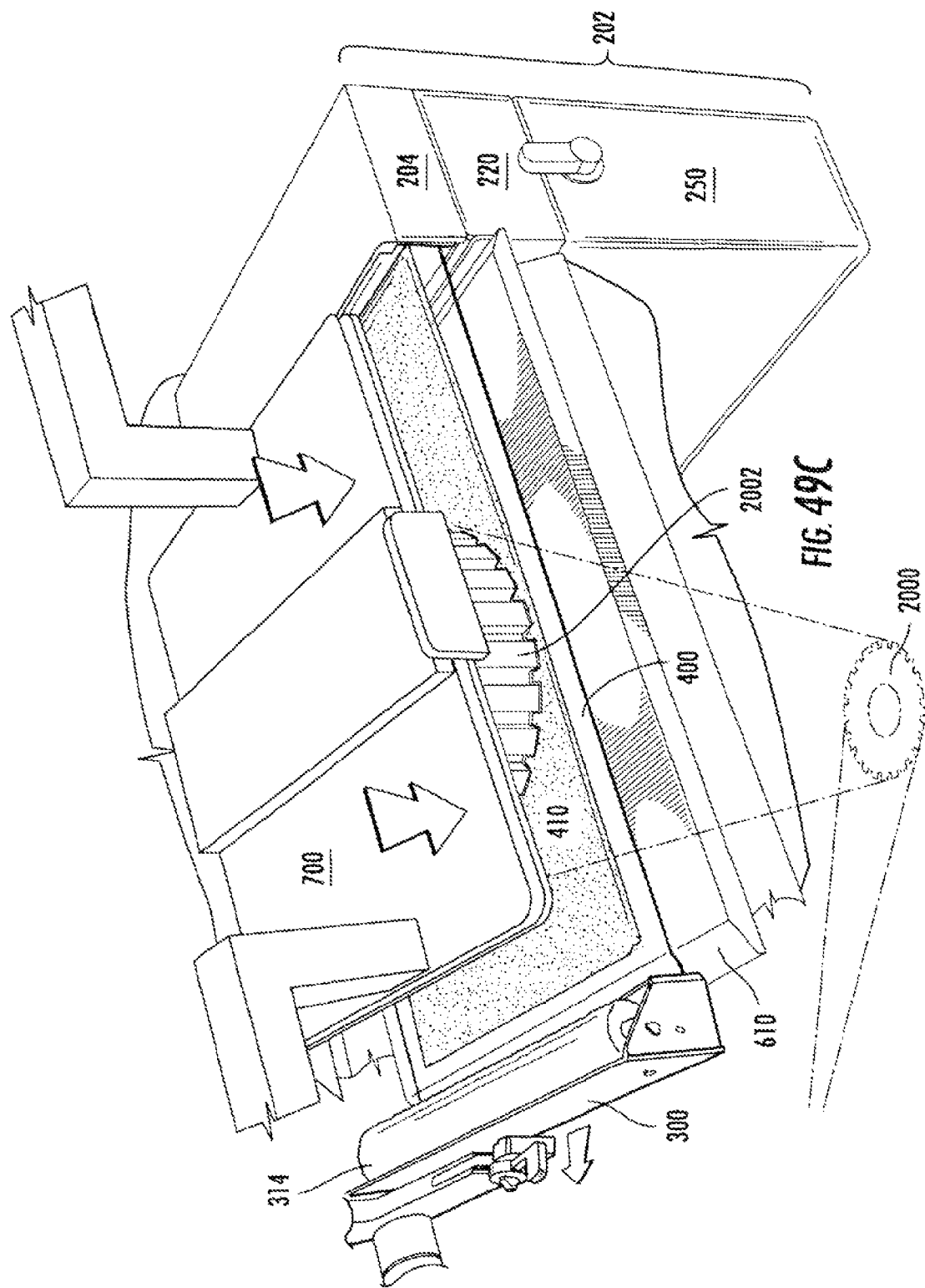

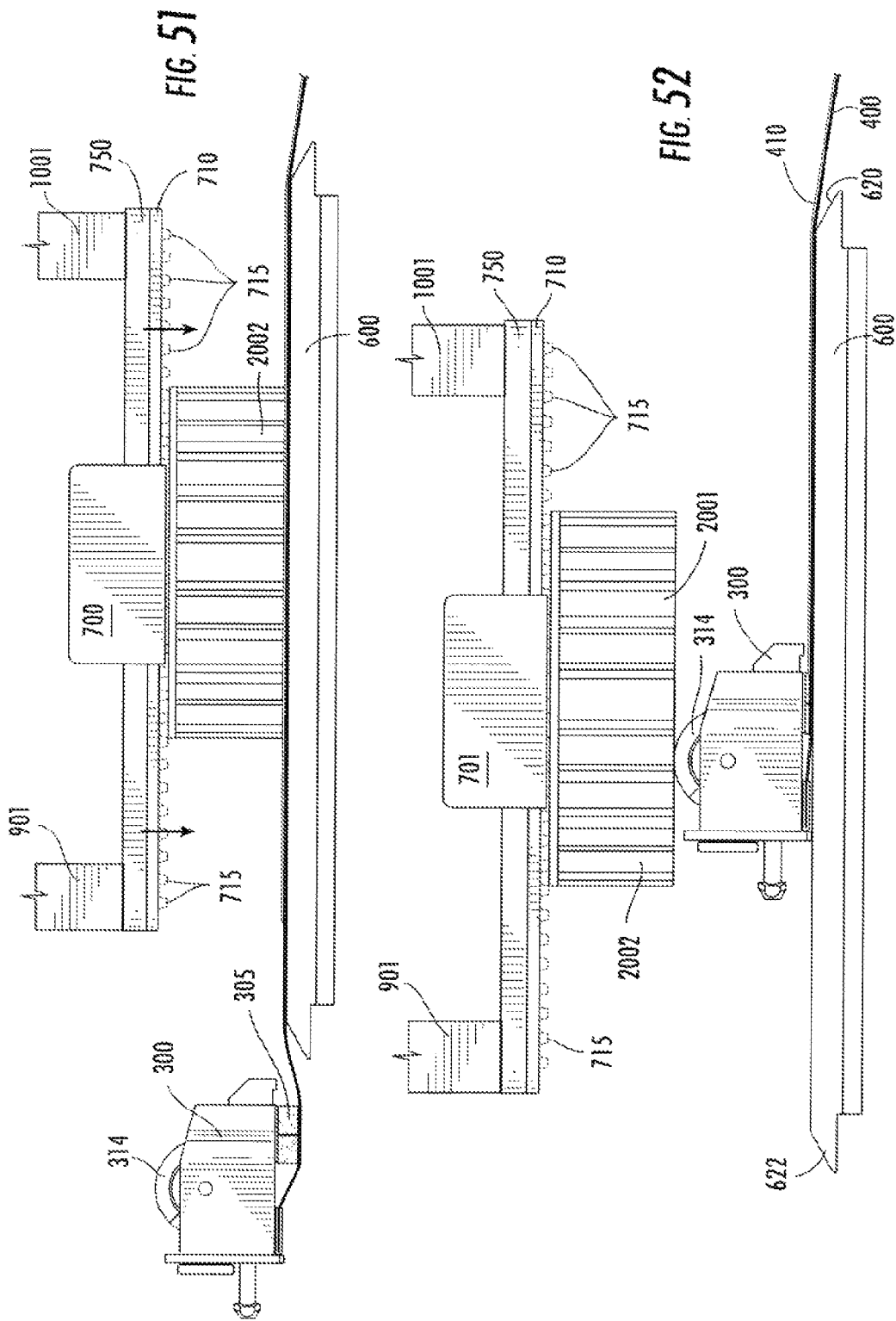

ELEVATOR AND METHOD FOR TILTING SOLID IMAGE BUILD PLATFORM FOR REDUCING AIR ENTRAINMENT AND FOR BUILD RELEASE

CROSS REFERENCE TO RELATED APPLICATION

This application is a continuation of U.S. patent application Ser. No. 11/856,225, filed Sep. 17, 2007 now U.S. Pat. No. 8,003,039, which is hereby incorporated herein in its entirety by reference.

This application claims priority from Provisional Application Ser. No. 60/885,257 filed Jan. 17, 2007 for "Solid Imaging Apparatus and Method Including: Cartridge for Solid Imaging Apparatus; Method for Conveying Build Material Layer-By-Layer; Elevator for Tilting Solid Image Build Platform for Reducing Air Entrainment and for Consistent Repeatable Alignment in a Solid Imaging Apparatus;" Provisional Application Ser. No. 60/949,614 filed Jul. 13, 2007 for "Solid Imaging Apparatus, and Method Including: Cartridge for Solid Imaging Apparatus; Method for Conveying Build Material Layer-by-Layer; Elevator for Tilting Solid Image Build Platform for Reducing Air Entrainment and for Build Release; Build Platform, Solid Image, and Method for Solid Imaging; Imager and Method for Consistent Repeatable Alignment in a Solid Imaging Apparatus; Eccentric Reciprocating Brush and Method for Reducing Overbuild; and Provisional Application Ser. No. 60/956,051 filed Aug. 15, 2007 for "Solid Imaging Apparatus and Method Including: Cartridge for Solid Imaging Apparatus; Method for Conveying Build Material Layer-By-Layer; Elevator for Tilting Solid Image Build Platform for Reducing Air Entrainment and for Build Release; Build Platform, Solid Image, and Method for Solid Imaging; Imager and Method for Consistent Repeatable Alignment in a Solid Imaging Apparatus; and Intra-Layer Cleaning Assembly and Method for Removing Excess Uncured Build Material;" the contents of which are incorporated herein by reference in their entirety.

FIELD OF INVENTION

This invention relates to solid imaging apparatus and methods.

BACKGROUND

Solid imaging devices have been used for rapid prototyping for models for product development, and, more recently, for manufacturing operations. Solid imaging devices produce three-dimensional objects from fusible powders or photocurable liquids, typically by exposure to radiation in response to computer control. Data representing thin cross-sectional layers of a three-dimensional object provide the computer with control parameters for programs for automated building of the object, typically layer-by-layer. A laser or other source of radiation suitable for solid imaging sequentially irradiates individual thin layers of the build material in response to which the material transforms into a solid, layer-upon-layer, to create a solid imaging product.

Solid imaging is sometimes referred to as "rapid prototyping and manufacturing" and includes such diverse techniques as stereolithography, laser sintering, ink jet printing, and others. Powders, liquids, and other materials for solid imaging sometimes are referred to as "build materials" and the three-dimensional objects that solid imaging produces sometimes are called "builds," "parts," and "solid imaging products," which can include a variety of shapes. The builds are usually prepared on surfaces referred to as "build pads" or "build platforms" that can be raised or lowered to place the surface of a build into contact with imaging radiation. The area where the build material is exposed sometimes is referred to as the "build plane" or "image plane."

Despite the variety of devices and methods developed for solid imaging, a number of drawbacks have yet to be resolved. The apparatus and methods for practicing solid imaging tend to be somewhat characterized by excessive moving parts and complex systems that can require a good deal of effort to service, maintain, and operate. Laser imaging and UV imaging systems tend to be costly and to place these systems out of reach for many applications. Complex, tedious alignment steps for aligning the radiation source and the image plane reduce efficiency and increase cost. The large vats of liquid resin used in stereolithography are expensive and can become contaminated with pieces of cured resin. Solid imaging devices typically produce "green" three-dimensional products, in which uncured build material wets the surface and causes the product to be tacky and to require cleaning prior to fully curing the product throughout the build.

It would be desirable to provide solid imaging systems and methods that reduce service and maintenance problems and that are simpler to operate, less costly, and more efficient.

SUMMARY OF THE INVENTION

The invention relates to solid imaging apparatus and methods that have been completely redesigned from the ground up with a number of subassemblies to provide improved systems, including a replaceable cartridge assembly that contains the build material, a transport surface for transporting build material from the cartridge to the build plane layer-by-layer, and a cleaning assembly attached to the transport surface for removing excess uncured build material from the build between application of layers. The cartridge of the invention does not spill during storage or transport, is sealed against light, and is not activated for dispensing build material until inserted into the apparatus and switched on by an operator. An operator of the system merely has to remove and replace the spent cartridge with a fresh cartridge containing new build material, disposing of or recycling the spent cartridge.

In a specific embodiment of the cartridge, a flexible film typically serves as the transport surface. The cartridge provides a housing containing the build material, a pump for supplying the build material to the film, and an internal assembly for storing the film and cleaning assembly that cooperates with external motors for coating the film with build material, extending the film, and retracting the film. The film attaches to the cleaning assembly by which assembly the film is extended. The cleaning assembly includes a brush for contacting the build to remove excess uncured build material as the film is retracted and the excess uncured build material is returned to the cartridge housing for filtration and reuse.

The invention provides an imager assembly for a solid imaging device in which the imager assembly includes an alignment fixture that is fixedly attached to the imager for precision mounting of the imager to the solid imaging apparatus. An operator of the apparatus can simply remove and replace the imager without additional complex alignment steps. The imager illuminates the build from underneath.

The invention includes a high-intensity UV lamp, in the range of approximately 600 Watts, and associated cooling channels for air flow, the UV lamp illuminating the build from the bottom for curing operations for each layer of the part after imaging and cleaning. Builds produced by the apparatus have substantially reduced or no tackiness and can be produced in a fully cured state within the apparatus.

In one embodiment, the build pad includes on one side raised discontinuous surfaces forming a grid upon which a lattice can be built for the support surfaces for the build, enhancing the bond to the build part and better enabling the part to be built in an upside down position. Holding the build in an upside down position facilitates building with less excess uncured build material on the build. The build pad includes on its opposite side raised discontinuous surfaces forming a grid for the purpose of supporting the build pad under vacuum against a ground, flat metal build platform. A vacuum seal is included about the periphery of this build pad side.

In another embodiment, the build pad is transmissive to curing radiation and does not include the vacuum supporting grid, and the build platform is a bracket providing for unobstructed application of curing radiation to the build and supports through the build pad. In this embodiment, multiple UV assemblies of relatively lower wattage, of around 100 Watts, are provided for intra-layer curing, normally without the higher intensity UV source.

Elevator arm assemblies reduce the possibility of air entrainment in the build and facilitate release of the build from the transport surface. Independently operated elevator arms slightly tilt a retaining frame and supporting platform for the build pad as the build pad approaches the build material on the transport surface in the image plane. Tilting on approach provides a path for air to escape. Tilting the build platform after imaging has take place while lifting the build off the transport surface facilitates release of the build from the transport surface.

The cartridge assembly with its transport surface, coating and cleaning assembly, and build material, the imager assembly and additional post-curing assemblies, the build pad and grid, the elevator assemblies with the tilt feature, and additional assemblies and features cooperate to promote production of drier, cleaner, more precise and fully cured builds by solid imaging. The transport surface enables the invention to be used in a flexible transport imaging apparatus. The cartridge, imager and post curing assemblies, build pad, elevator assemblies, and additional features can be combined in a small format, including a desk top modeler format, if desired.

Thus, the invention provides, among other things, a desk top modeler for flexible transport solid imaging providing removable and replaceable consumable components of build material and transport film in a single container. The invention provides a desk top modeler that can make builds that require less post-build cleaning and curing and can produce a fully reacted, tack-free build. The invention also provides several subassemblies that can be adapted individually for use in connection with other solid imaging apparatus and methods.

The foregoing and other advantages and features of the invention and the manner in which the same are accomplished will be more readily apparent upon consideration of the following detailed description of the invention taken in conjunction with the accompanying drawings, which illustrate preferred and exemplary embodiments of a flexible transport desk top modeler of the invention.

BRIEF DESCRIPTION OF THE DRAWINGS

FIG. 23 is an overhead partial perspective view of the cartridge of FIG. 4 with the cover removed and illustrating the intra-layer cleaning assembly, a contact roller assembly for retracting the transport surface, and a coating roller assembly for applying build material to the transport surface;

FIG. 24 is a view similar to that of FIG. 23 illustrating the intra-layer cleaning assembly and transport surface partially extended from the cartridge;

FIG. 25 is a perspective view of an isolated component of FIGS. 23 and 24;

FIGS. 28 and 29 are transverse sectional plan sequence views through the cartridge of FIG. 10 illustrating, respectively, extension of the transport surface in the absence of coating with build material and retraction of the transport surface with scraping and recovery of build material from the transport surface;

FIGS. 30 and 30A are perspective views of a chassis assembly of the invention;

FIG. 37 is an overhead right-hand perspective view of one embodiment of the intra-layer cleaning assembly taken from the cartridge side of the assembly;

FIG. 38 is an overhead perspective view of another embodiment of the intra-layer cleaning assembly shown extending from a cartridge and over an image plane;

FIG. 49C is a view similar to that of FIG. 49B, illustrating in addition a build in contact with the build material on the film and held in place by a build platform assembly;

FIGS. 51 and 52 are front plan sequence views similar to that of FIGS. 50, 50A, and 50B and starting from the FIG. 50B position illustrating in addition in FIG. 51 a build and platform assembly engaging the build material on the transport film for curing and in FIG. 52, the build rising from the image plane for intra-layer cleaning by the intra-layer cleaning assembly;

Corresponding reference characters indicate corresponding parts throughout the several views of the drawings.

DETAILED DESCRIPTION

Figure 1:
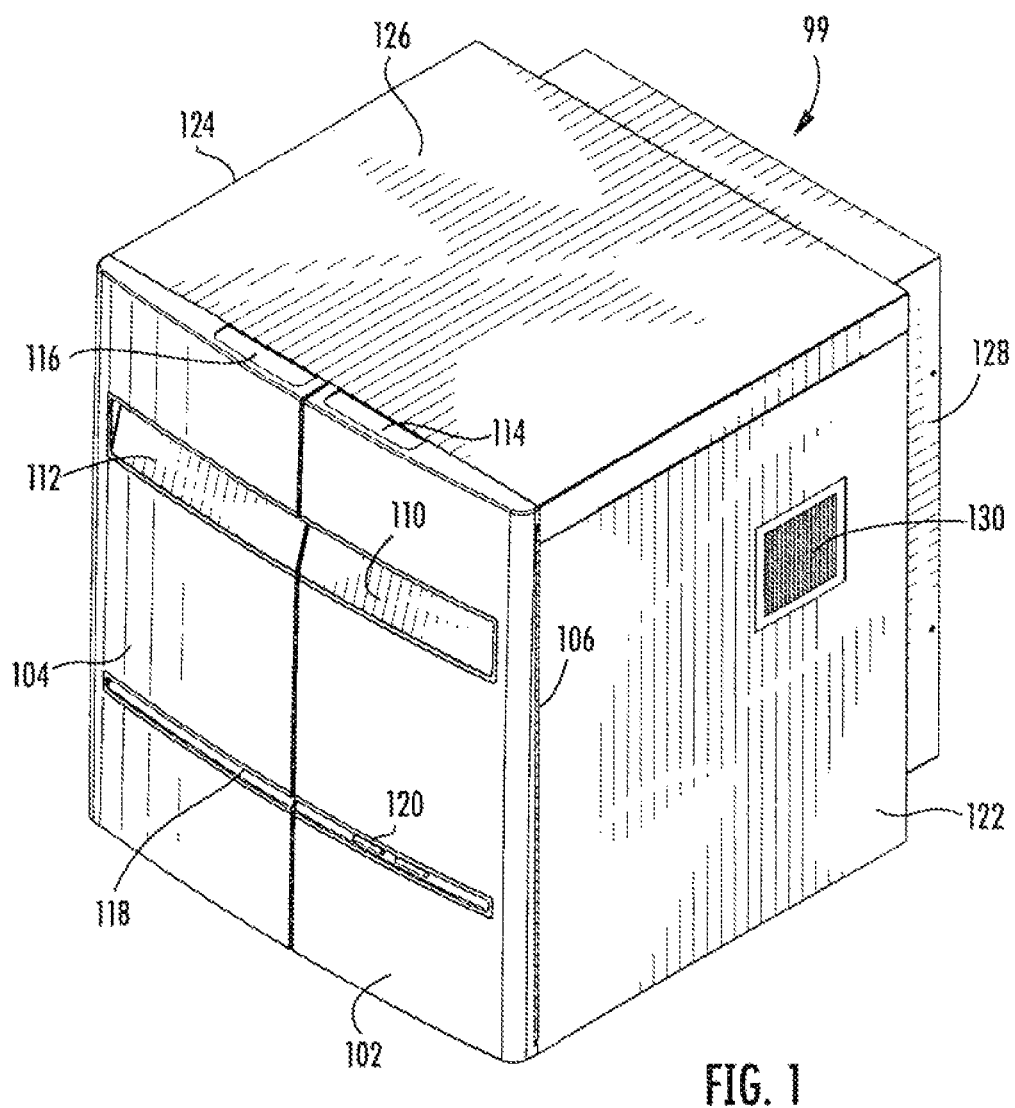
FIG. 1 is a perspective, view of a housing for the apparatus of the invention from the viewer's upper right-hand side.

This invention can best be understood with reference to specific embodiments that are illustrated in the drawings and the variations described herein below. While the invention will be so described, it should be recognized that the invention is not intended to be limited to the embodiments illustrated in the drawings. On the contrary, the invention includes all alternatives, modifications, and equivalents that may be included within the scope and spirit of the invention as defined by the appended claims.

FIG. 1 illustrates in a perspective view generally at 99 one embodiment of a housing for a desk top modeler of the invention. Housing 99 includes right and left hand hinged doors 102, 104. The hinge for door 102 can be viewed at 106. Door 102 is provided with handles 110, 114 and door 104 is provided with handles 112, 116 on the door face and top, respectively. It should be recognized that a wide variety of such arrangements profitably can be used, a primary requirement being that the housing, or at least the conditions under which the apparatus is used, does not permit light to enter during operation. A track 118 is provided on the doors, which track can contain signal lights, such as controller responsive light emitting diodes ("LED's") for indicating various operational stages of the apparatus, such as when a build is in progress or when a build is complete, or when a door is locked on unlocked to provide access.

Housing 99 also includes left and right exterior side panels 122, 124 and a top panel 126. An electrical control panel 128 is provided in the rear of the apparatus. The housing components typically are prepared from sheet metal, including stainless steel, although other materials should also be useful. One of numerous vents for forced air cooling is provided in right side panel 122 at 130. Vent 130 is one of two forced air vents for the imager for the apparatus, which may be viewed in subsequent figures.

Figure 2:
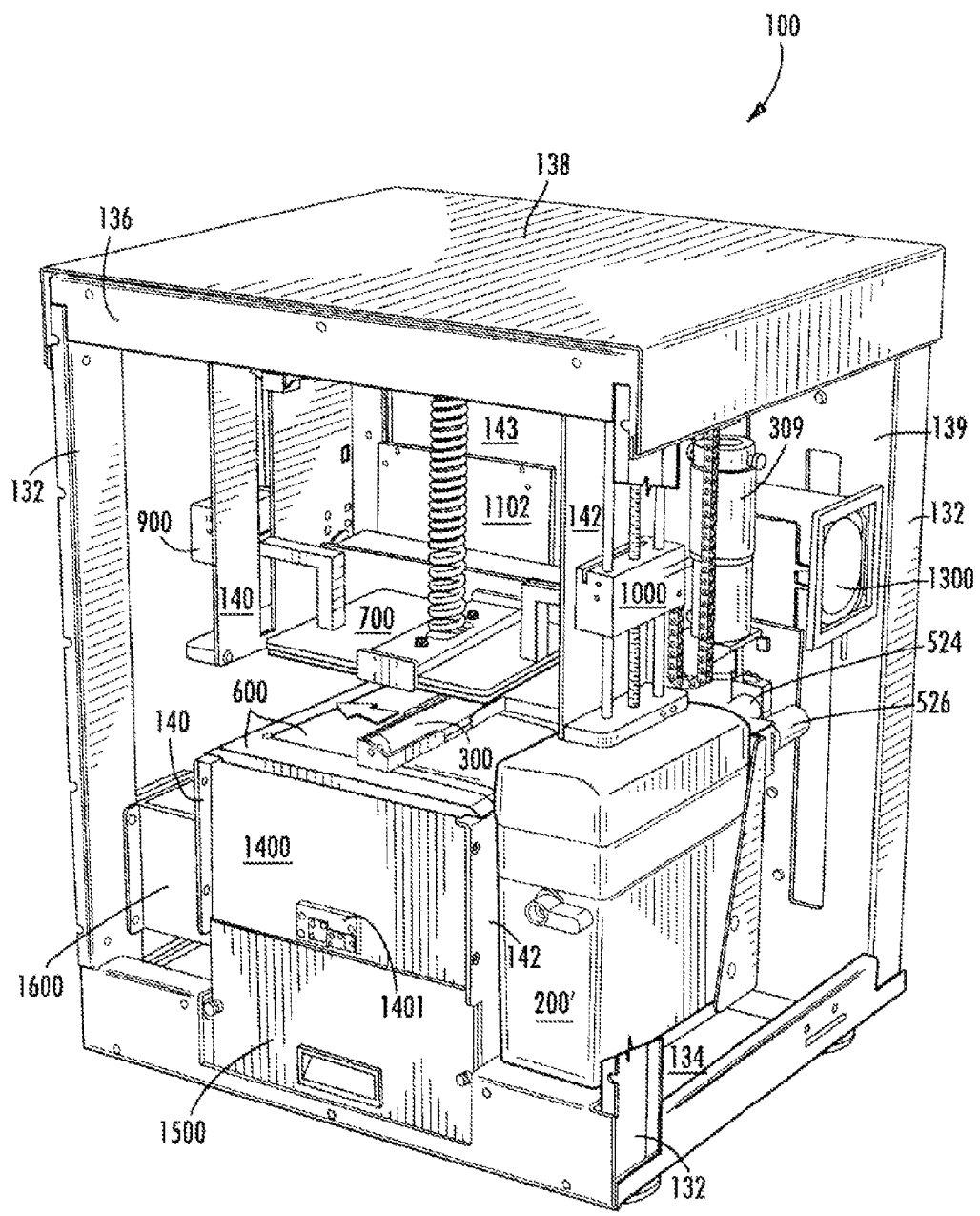
FIG. 2 is a perspective view of the apparatus of the invention having the external housing removed and illustrating internal component assemblies in relation mounted on internal supporting frame components.
Figure 2A:
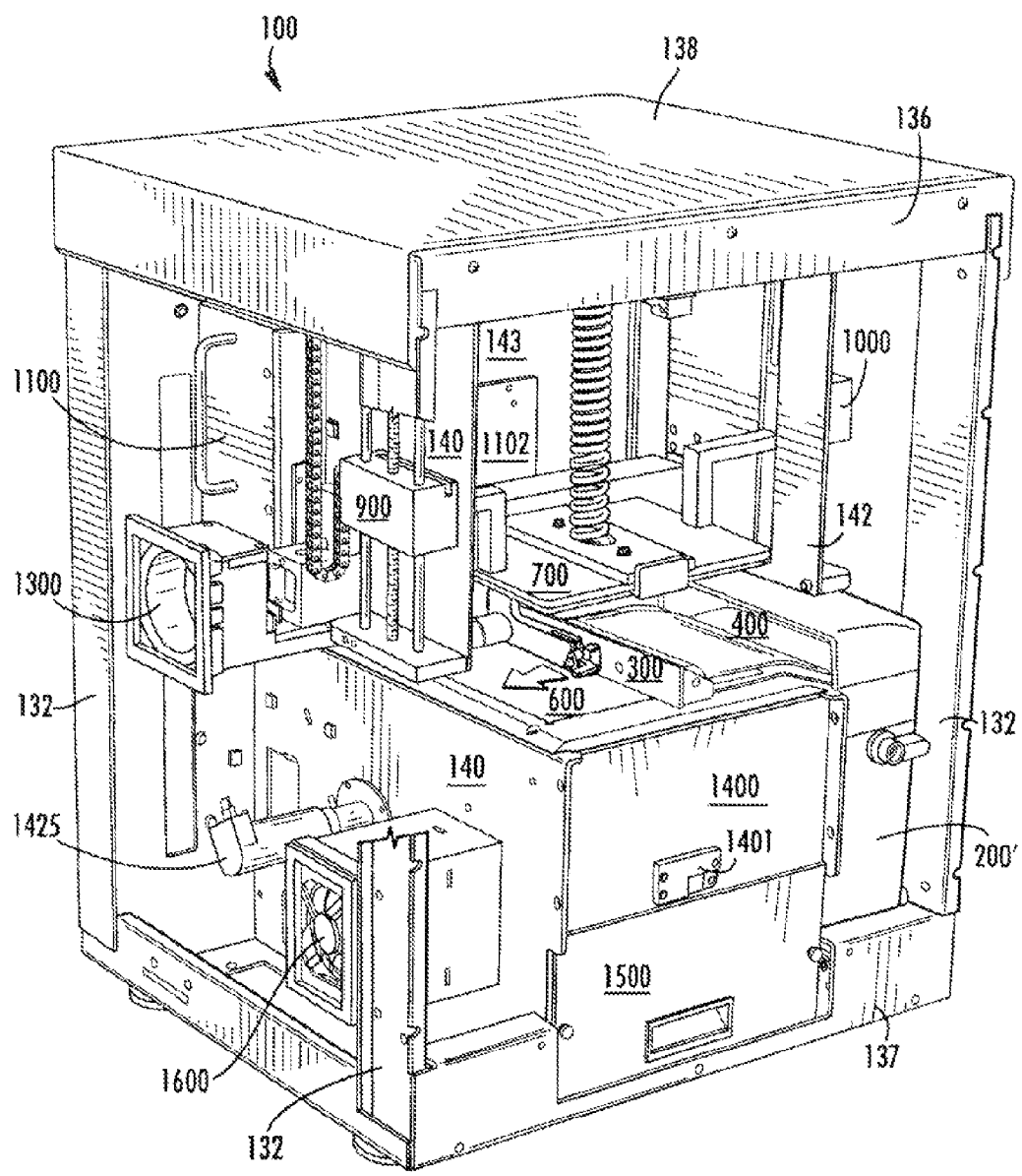
FIG. 2A is a perspective view of the apparatus of FIG. 2 rotated counterclockwise to provide a front view from the viewer's upper left-hand side.
Figure 3:
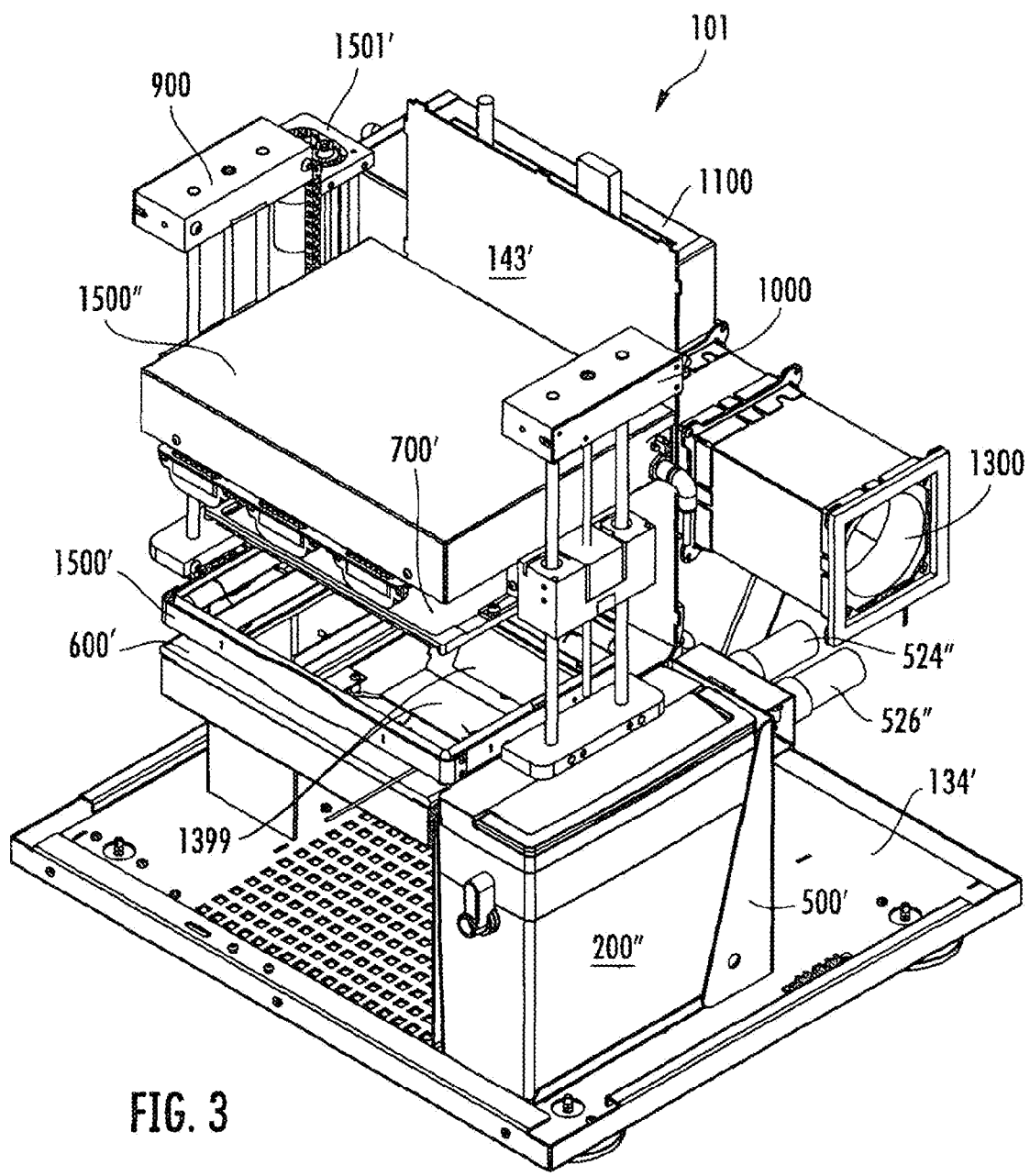
FIG. 3 is a perspective view of an alternative apparatus of the invention to that of FIG. 2.

FIGS. 2 and 2A illustrate generally at 100, and FIG. 3 illustrates generally at 101, perspective views of alternative embodiments of a solid imaging apparatus of the invention having selected housing components removed for viewing the interior. The views of FIGS. 2 and 3 are from the front of the apparatus from the viewer's upper right-hand side. The view of FIG. 2A is that of FIG. 2 rotated counterclockwise to provide a front view from the viewer's upper left-hand side. These apparatuses are desk-top modelers for flexible imaging and the views of the interiors illustrate internal component assemblies in relation mounted on supporting frame components. It should be recognized that while a flexible transport desk-top modeler is described and illustrated herein, the invention incorporates several features, components, and subassemblies having applicability apart from the desk top modeler as illustrated. This detailed description presents illustrations and descriptions of several subassemblies and additional aspects of the invention and various modifications and changes may be made without departing from the scope of the invention as set forth in the appended claims.

It should also be understood that the desk top modelers 100, 101 are computer controlled devices and that an operator's computer control station communicatingly connects to the modeler via an electrical panel for controlling its operation and that of the various subassemblies, neither of which is illustrated here.

FIGS. 2, 2A, and 3 illustrate several primary operational component subassemblies of embodiments of the modeler and these are numbered in FIGS. 2, 2A and 3 as subassemblies for convenience and ready location. It should be recognized that the individual component numbered in FIGS. 2, 2A, and 3 may be only one of several components of the subassembly, in which case that component may bear a different number in later drawings illustrating the subassembly in detail.

The subassemblies illustrated in FIGS. 2 and 2A include:

1) external frame components, including support columns 132, a floor 134, upper and lower horizontal supports 136 and 137, an upper cap 138, and a slotted rear wall 139 on which is mounted an electrical panel, which is not shown;

2) internal frame components for subassemblies of the invention, including vertical left and right walls 140 and 142 extending generally in a front-to-rear and ceiling to floor direction with several cut-out portions for forced air circulation and electrical passages and for supporting several subassemblies, and vertical wall 143 extending generally in a side-to-side direction that supports an imager 1100 (FIG. 2A);

3) a self-contained removable and replaceable cartridge assembly 200' providing a source of build material, an intra-layer cleaning assembly 300, and an extendible and retractable transport film 400 for transporting the build material, the cartridge assembly being mounted into a frame, including motor 524 for retracting the intra-layer cleaning assembly 300 and transport surface 400 and motor 526 for applying build material to the transport surface 400;

4) an image plane assembly 600 across which transport surface 400 extends to transmit build material for imaging and through which solid imaging and post-curing radiation reach a build surface;

5) a build platform and frame assembly 700;

6) an elevator assembly including a pair of left and right independently operated elevator arms 900 and 1000 for raising and lowering the build platform assembly 700 with respect to the image plane assembly 600;

7) an imager assembly 1100 for supplying radiation to the build for constructing the build and which is mounted to vertical internal structural wall 143 via a tongue and groove fit in a mounting bracket 1102;

8) one of multiple vent assemblies 1300 for the imager 1100, one on the right in FIG. 1 and one on the left in FIG. 2;

9) a mirror box 1400, 1402 (FIGS. 65, 66, and 67), formed by a UV shield 1400 and walls 1402 and containing a pair of mirrors and including in shield 1400 UV reference photo diodes 1401, the mirrors transmitting the image from the imager to the image plane, and including in FIG. 2A a motor 1425 for extending and retracting one of the mirrors;

10) a high-intensity ultra-violet light source, UV box 1500, for post curing the build layer-by-layer; and 11) one embodiment of multiple vent assemblies 1600 for the UV light source 1500.

The subassemblies or portions of subassemblies illustrated in the embodiment of FIG. 3 include:

1) a floor 134', which is an external frame component, the remainder of the external frame having been removed for clarity;

2) a vertical wall 143', which is an internal frame component extending generally in a side-to-side direction that supports an imager 1100 (FIG. 2), the remainder of the internal frame having been removed for clarity;

3) a self-contained removable and replaceable cartridge assembly 200" providing a source of build material, an intra-layer cleaning assembly (not shown in this view), and an extendible and retractable transport film (not shown in this view) for transporting the build material, the cartridge assembly being mounted into a frame 500', including motor 524" for retracting the intra-layer cleaning assembly and transport surface and motor 526" for applying build material to the transport surface;

4) an image plane assembly 600' across which the transport surface extends to transmit build material for imaging and through which solid imaging and post-curing radiation reach a build surface;

5) a build platform and frame assembly 700';

6) an elevator assembly including a pair of left and right independently operated elevator arms 900 and 1000 for raising and lowering the build platform assembly 700' with respect to the image plane assembly 600';

7) an imager assembly 1100 for supplying radiation to the build for constructing the build and which is mounted to vertical internal structural wall 143' via a tongue and groove fit in a mounting bracket 1102;

8) one of multiple vent assemblies 1300 for the imager 1100, one on the right in FIG. 1B and one on the left (not shown, and similar to that of FIG. 2 at 1300;

9) a fixed mirror assembly 1399 for transmitting the image from the imager to the image plane, the mirrors oriented with respect to the image plane; and 10) ultra-violet light sources, a halo assembly 1500' mounted to an elevator 1501' and a hood assembly 1500" for post-curing the build layer-by-layer.

The build materials described below in connection with the practice of the invention respond to actinic radiation in the visible and ultraviolet regions. The term "solid imaging radiation" is used herein to refer to any actinic radiation which causes a photocurable liquid to react to produce a solid, whether a visible or UV source or other source. The imagers described below provide solid imaging radiation for initially curing the build material image onto a build surface in both the visible an ultraviolet ranges. These imagers have been modified to provide both visible and UV light, within the limits of the device to do so, including a modified commercial digital light processing projector ("DLP" projector) for which specific embodiments are illustrated and discussed. The modified DLP projector used for the imager produces more visible than UV light and the build materials can be tailored to receive the maximum benefit from the particular projector used. It should be recognized that imagers can also be created based on UV sources or other sources of actinic solid imaging radiation that do not include visible light and build materials tailored for these sources.

The actinic light sources for solid imaging radiation used for post curing operations, to provide a more fully or completely reacted build after the intial image, do not typically provide visible light, but only ultraviolet. These UV sources are also described in more detail below.

Figure 4:
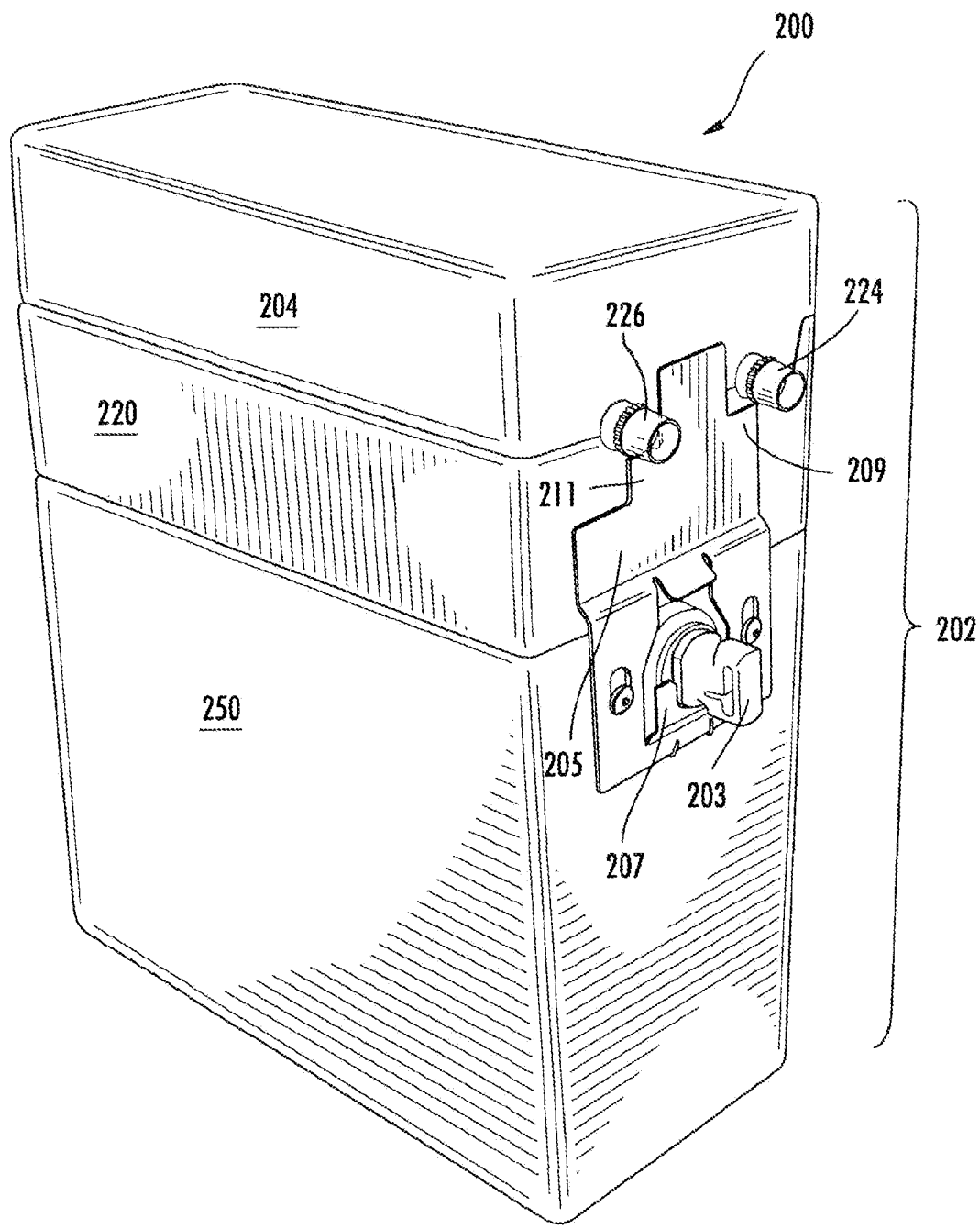
FIG. 4 is a perspective view of one embodiment of a cartridge of the invention from the right rear and showing a locking mechanism.
Figure 4A:
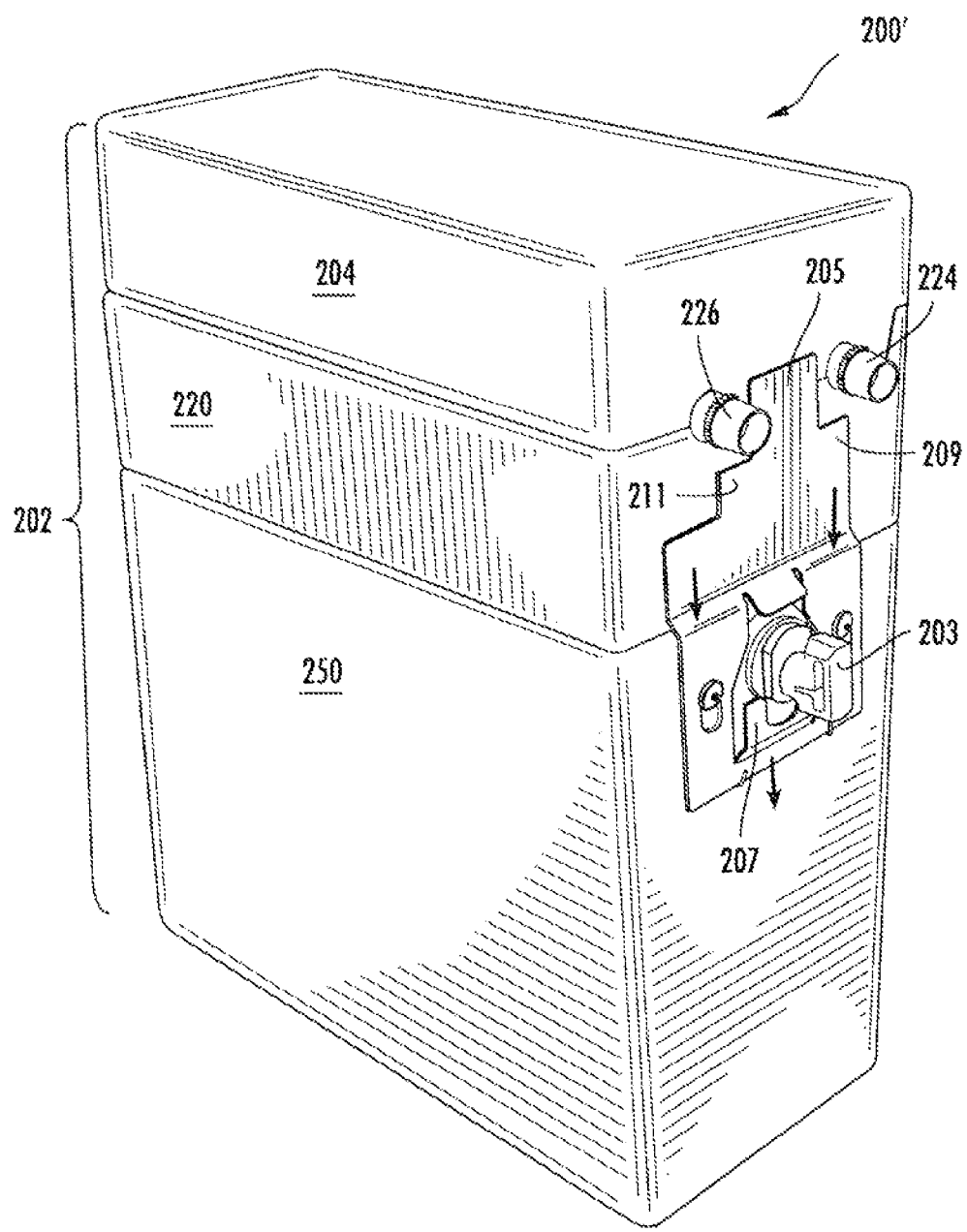
FIG. 4A is a perspective view of the cartridge of FIG. 4 illustrating opening of the lock.

Turning now to a discussion of the cartridge, FIGS. 4 and 4A illustrate generally at 200 one embodiment of the cartridge of the invention in a perspective view from the rear. The cartridge includes flexible couplings 224 and 226, which may be, for example, ball drive and hex shaft couplings, extending from spaces between the lid 204 and upper section 220 for engaging corresponding motors 524 and 526 mounted on the cartridge frame (FIGS. 2 and 2A). The couplings and motors cooperate to retract a cleaning assembly 300 and transport surface 400 and (FIGS. 2 and 2A) into the cartridge and to coat the transport surface with fresh build material. The end of a rotary valve 203 for controlling build material flow in the cartridge interior extends exteriorly of the cartridge from an orifice adjacent the top of lower section 250, where the build material is stored. Valve 203 is shown in an upright and closed position, secured by spring locking plate 205.

The cartridge 200" illustrated in the embodiment of FIG. 3 is of somewhat similar design in its interaction of ball hex drive couplings with motors 524" and 526" and has similar internal components, as described further below with respect to the cartridge interior. Cartridge 200" does not include a cleaning assembly 300 and operates instead in a manner described below to use the transport surface to remove excess uncured build material from the build surface. Cartridge 200" is also illustrated with an optional handle, which is not present in the cartridge 200 of FIGS. 4 and 4A.

As shown in FIGS. 4 and 4A, the cartridge in one embodiment may include a spring locking plate 205 having a fitting 207 that engages valve 203 to preclude rotation of the valve to a build material flow position until the plate is disengaged. The plate has corner fittings 209 and 211 that engage toothed couplings 224 and 226, respectively, to preclude either retraction of the transport film or coating until the spring locking plate is disengaged. The spring locking plate is disengaged by pushing downwardly on the plate, as illustrated by the directional arrows in FIG. 4A.

Figures 5, 6:
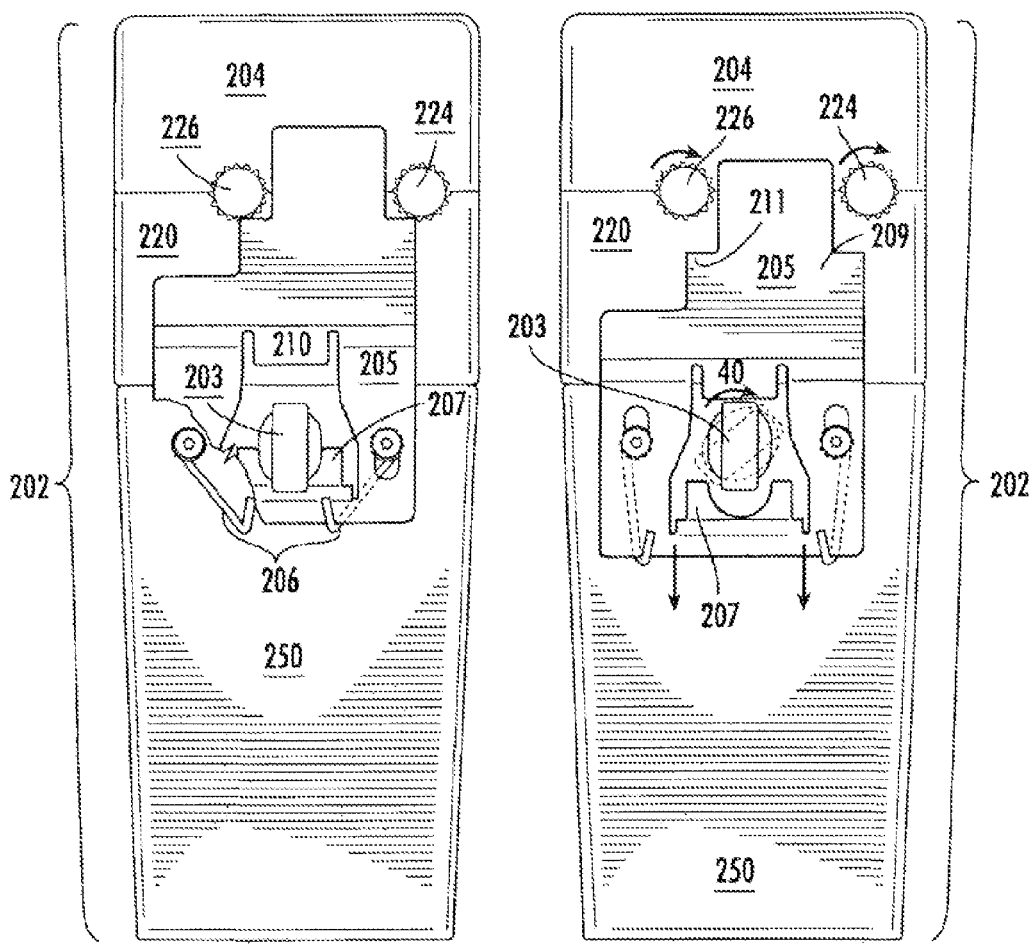
FIG. 5 is a rear plan view of the cartridge of FIG. 4.
FIG. 6 is a rear plan view of the cartridge of FIG. 4 illustrating in addition rotation of a rotary valve to a flow position for build material and of couplings for application of build material to the transport surface and retraction of the transport surface.

FIGS. 5 and 6 are sequence plan views of the rear of the cartridge and illustrate disengagement of the locking plate, which is biased to a locked position in engagement with couplings 224, 226 and valve 205 by torsion springs 206 mounted on standoffs extending from the cartridge housing.

Figures 7, 8:
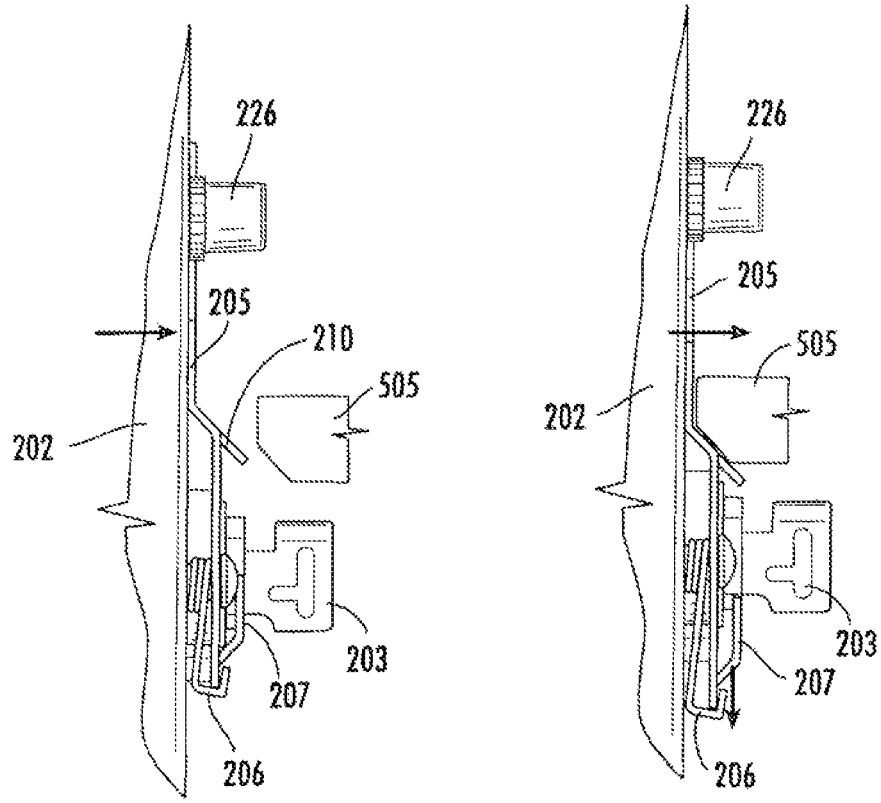
FIGS. 7 and 8 are partial plan views from the side of the rear wall of the cartridge of FIG. 4.
Figure 9:
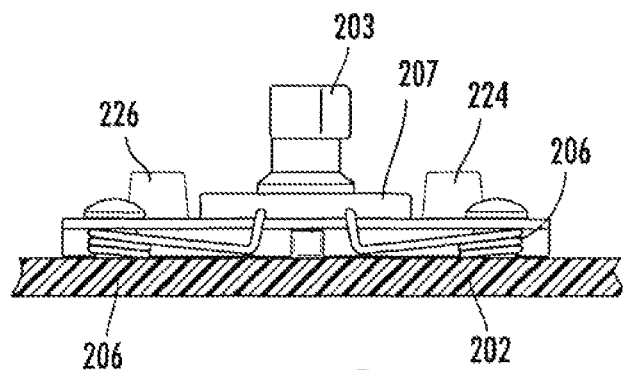
FIG. 9 is a sectional view of the rear wall of the cartridge of FIG. 4 taken from underneath the spring bracket lock and viewing upwardly.

FIGS. 7, 8 and 9 provide more detailed side views of the locking plate, illustrating its interaction with the cartridge activating and unlocking element 505 on the cartridge frame. Member 505 on the frame engages corresponding sloped surface 205 on the locking plate to push the locking plate downward as the cartridge is inserted fully into the cartridge frame. By the time the cartridge is fully inserted, the rotary valve and couplings on the cartridge are fully rotational. This feature can also be used in connection with the cartridge embodiment of FIG. 3 and provides for secure transport and storage of the cartridge until ready for use, without spilling build material. The cartridge is fully sealed against light intrusion to protect the build material, as well, for both storage and when in use in the apparatus of the invention.

Figure 10:
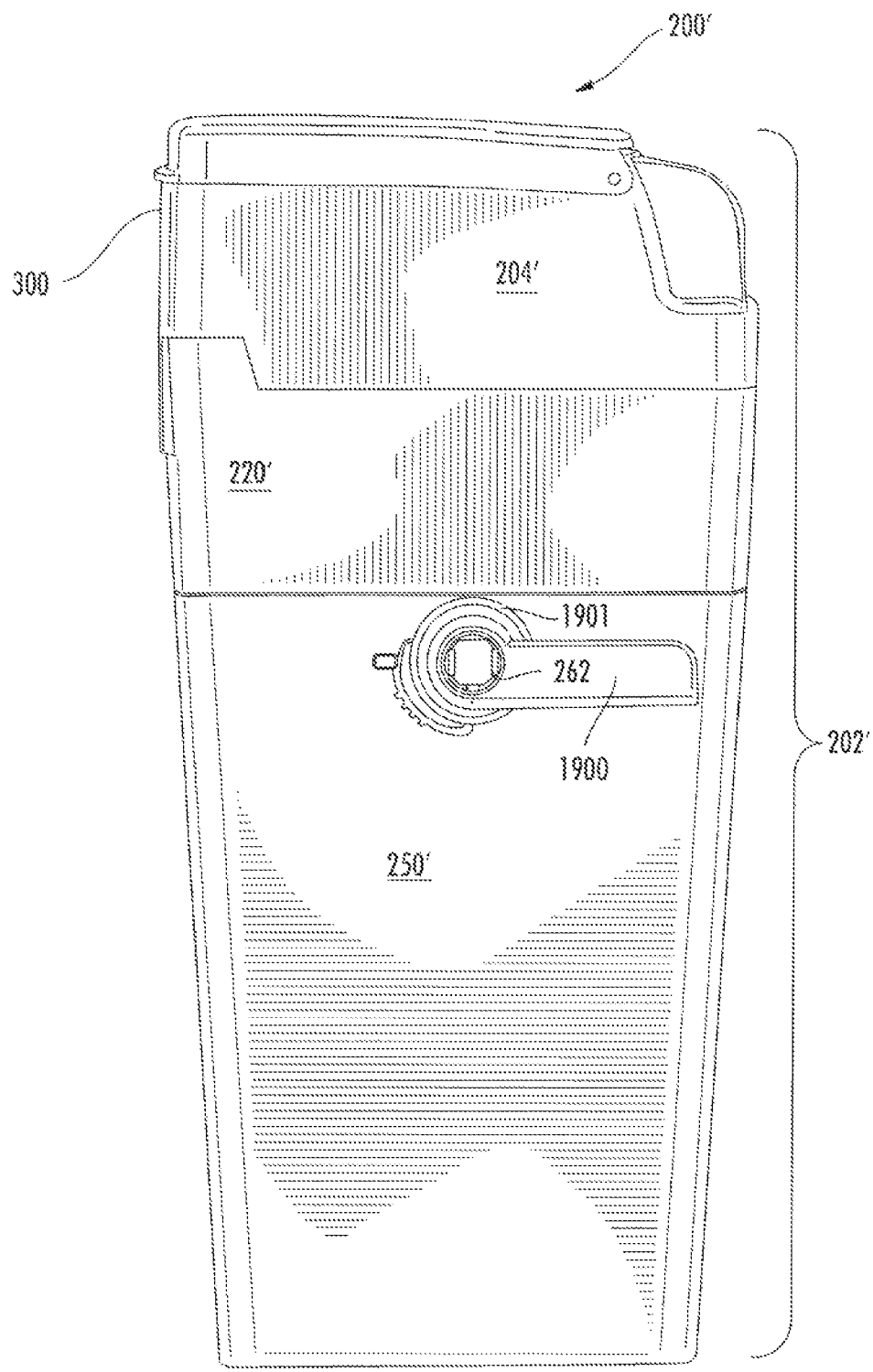
FIG. 10 is a front plan view of an alternative cartridge and locking mechanism to that of FIG. 4.
Figure 11:
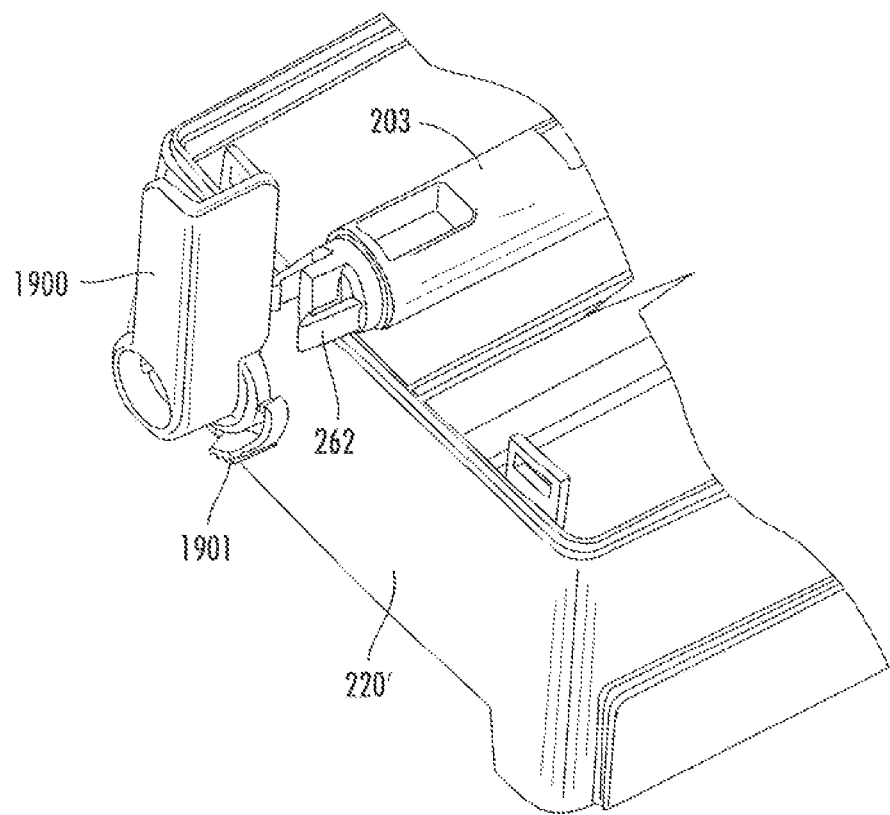
FIG. 11 is a partial perspective view of a portion of the apparatus of FIG. 10.
Figure 12:
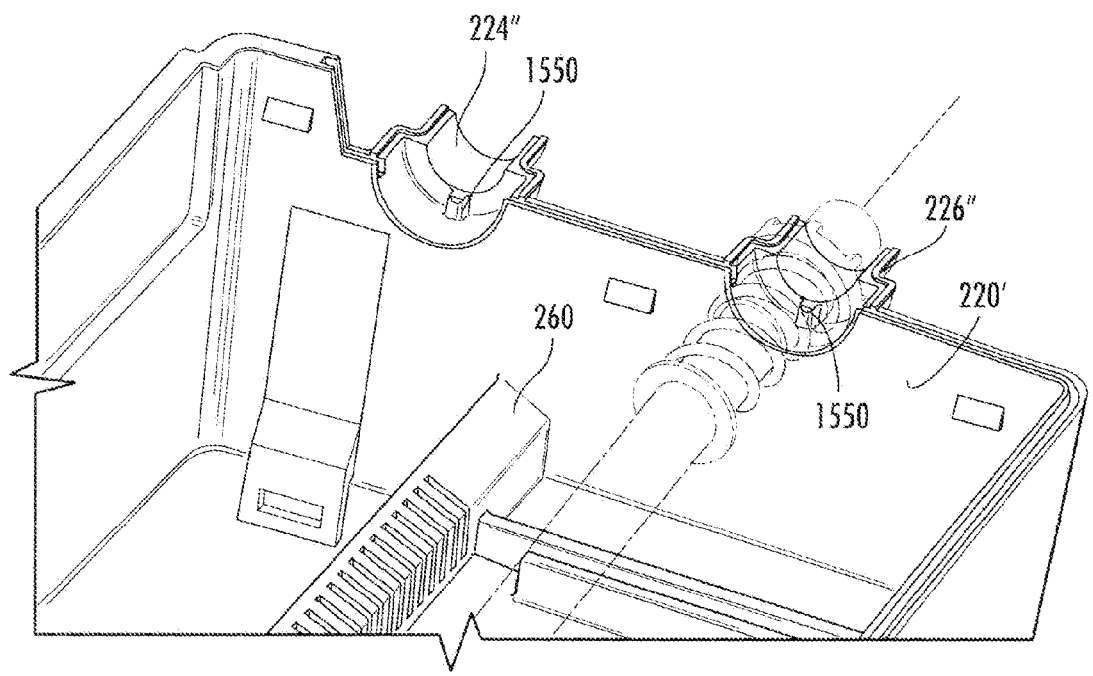
FIG. 12 is a partial perspective view of a rear portion of the apparatus of FIG. 10.
Figure 13:
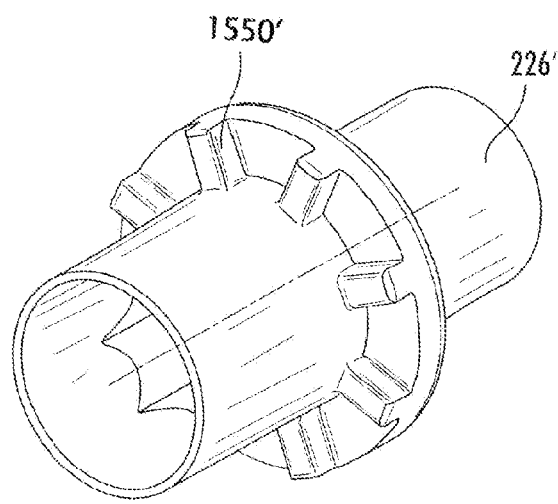
FIG. 13 is a perspective view of a portion of the apparatus illustrated in FIG. 12.
Figure 14:
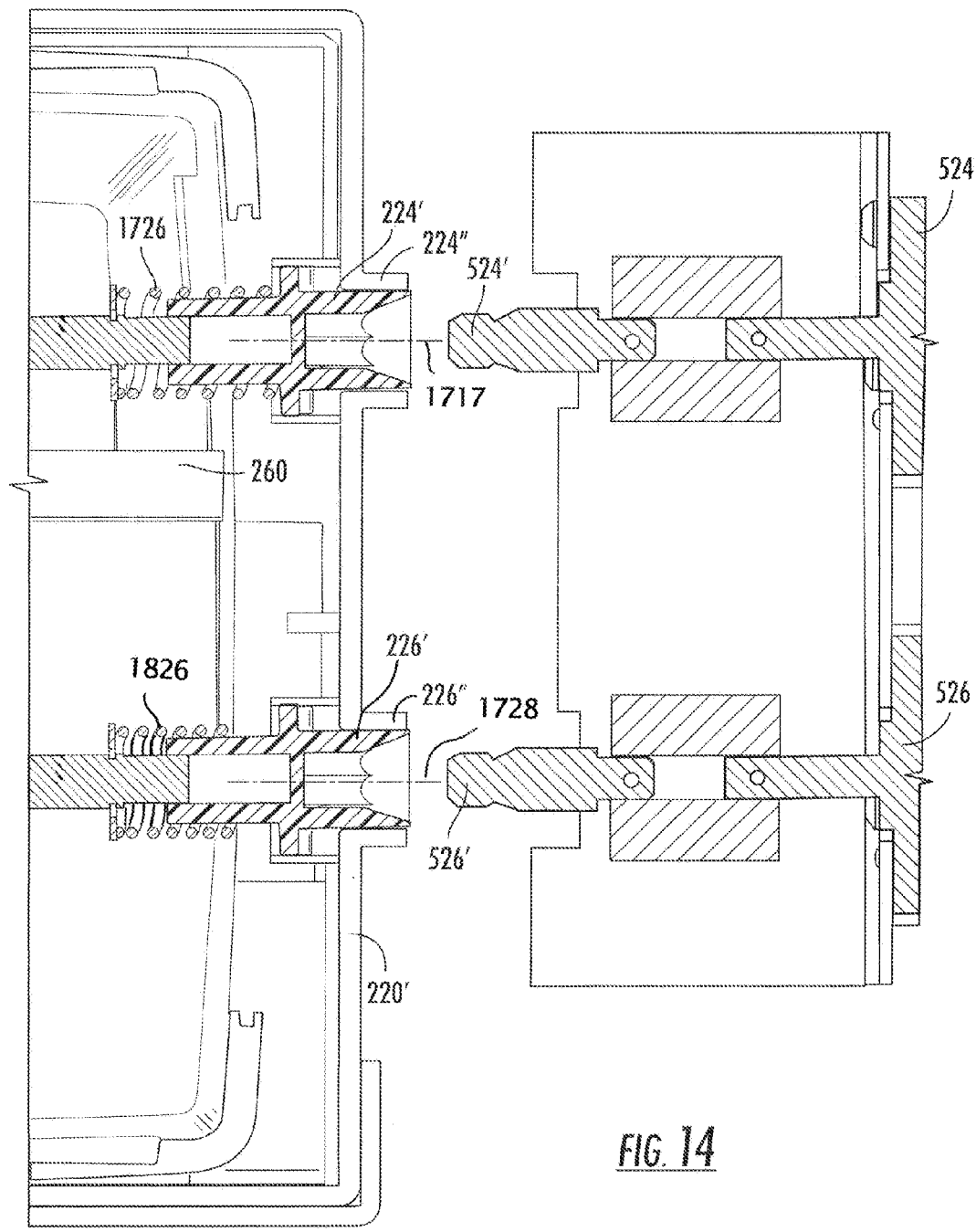
FIGS. 14 and 15 are sequence sectional plan views of the relation of the apparatus illustrated in FIG. 12 to additional portion of the apparatus.

FIGS. 10 and 11 illustrate an alternative way to lock the rotary valve 203 (FIG. 11) from the front of the cartridge rather than the rear. A handle 1900 mounted on a snap 262 at the end of the rotary valve engages a toothed member 1901 that precludes the valve from turning until an operator positively grasps the handle and lifts it to bypass the teeth to turn the valve to an open position, thus eliminating the spring bracket locking member of the embodiments discussed above.

FIGS. 10 and 11 also illustrate a housing 202' having the same basic features of a lid and upper and lower sections, 250', 220', and 204', respectively, corresponding to those of FIGS. 4 and 4A at 250, 220, and 204, and having a more rounded and pleasing appearance. These features are all discussed in detail below in connection with the cartridge interior and operation of the cartridge.

Figure 15:
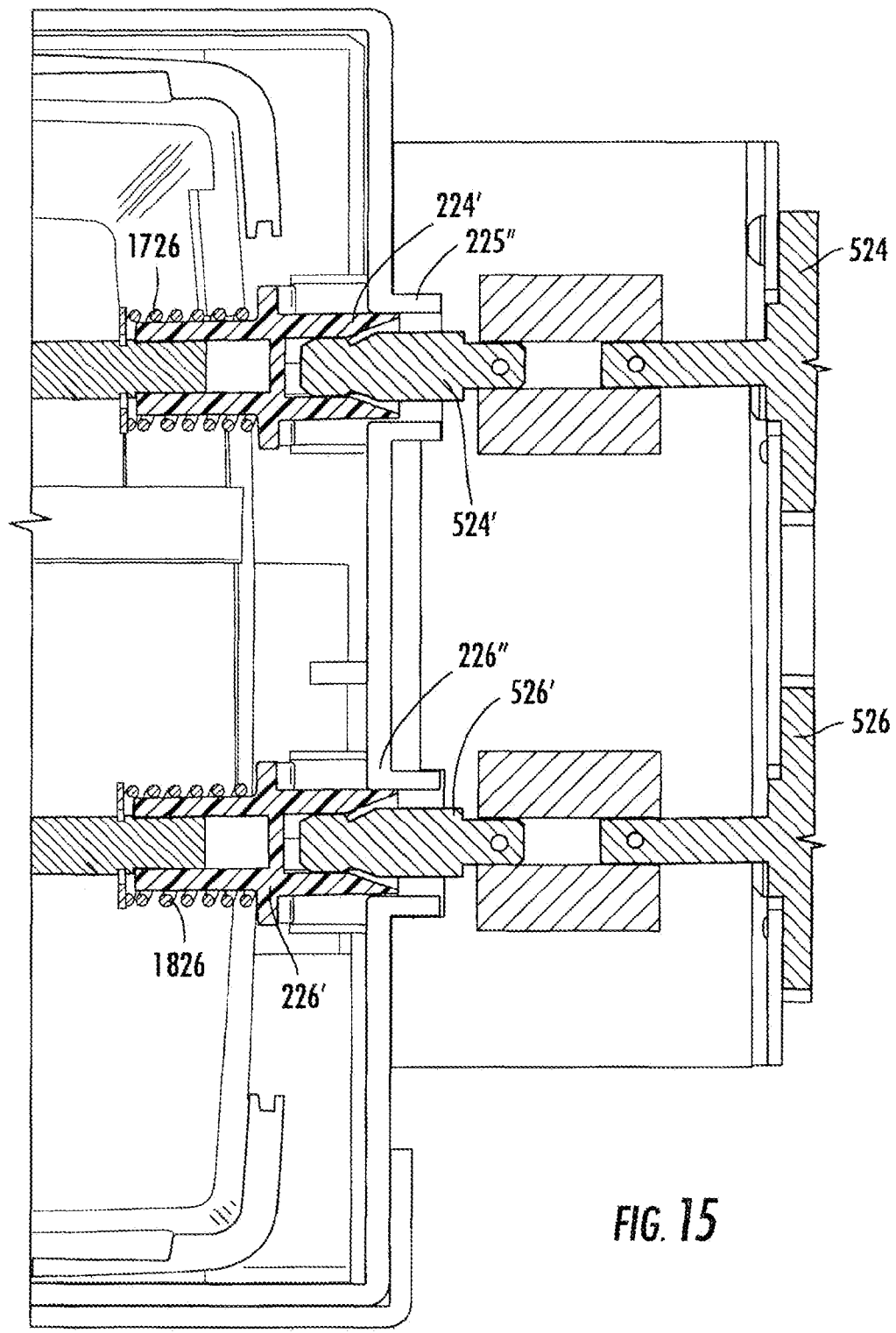

FIGS. 12 through 15 illustrate an alternative arrangement for mounting ball hex flexible couplings and securing the cartridge against operation until inserted fully into the frame 500, 500' (FIGS. 2 and 3) for the cartridge on the desk top modeler. Brackets 224" and 226" in the upper housing section 220' and corresponding brackets in the lower housing have internal notches 1550 corresponding to teeth 1550' (FIG. 13) on the hex portion 224' and 226' of the flexible coupling contained in the cartridge. The hex coupling is biased by a spring (1726, 1826 in FIG. 14) to have the teeth 1550' inserted into the corresponding notches 1550 to preclude the axes 1717, 1728 of the contact roller and coating roller, respectively, from turning. When the corresponding ball 524', 526' inserts into the hex coupling, the hex coupling is pushed out of contact with the notches against the spring and is released for rotation (FIG. 15). One advantage of this embodiment is that the hex couplings are internal to the cartridge housing.

Figure 16:
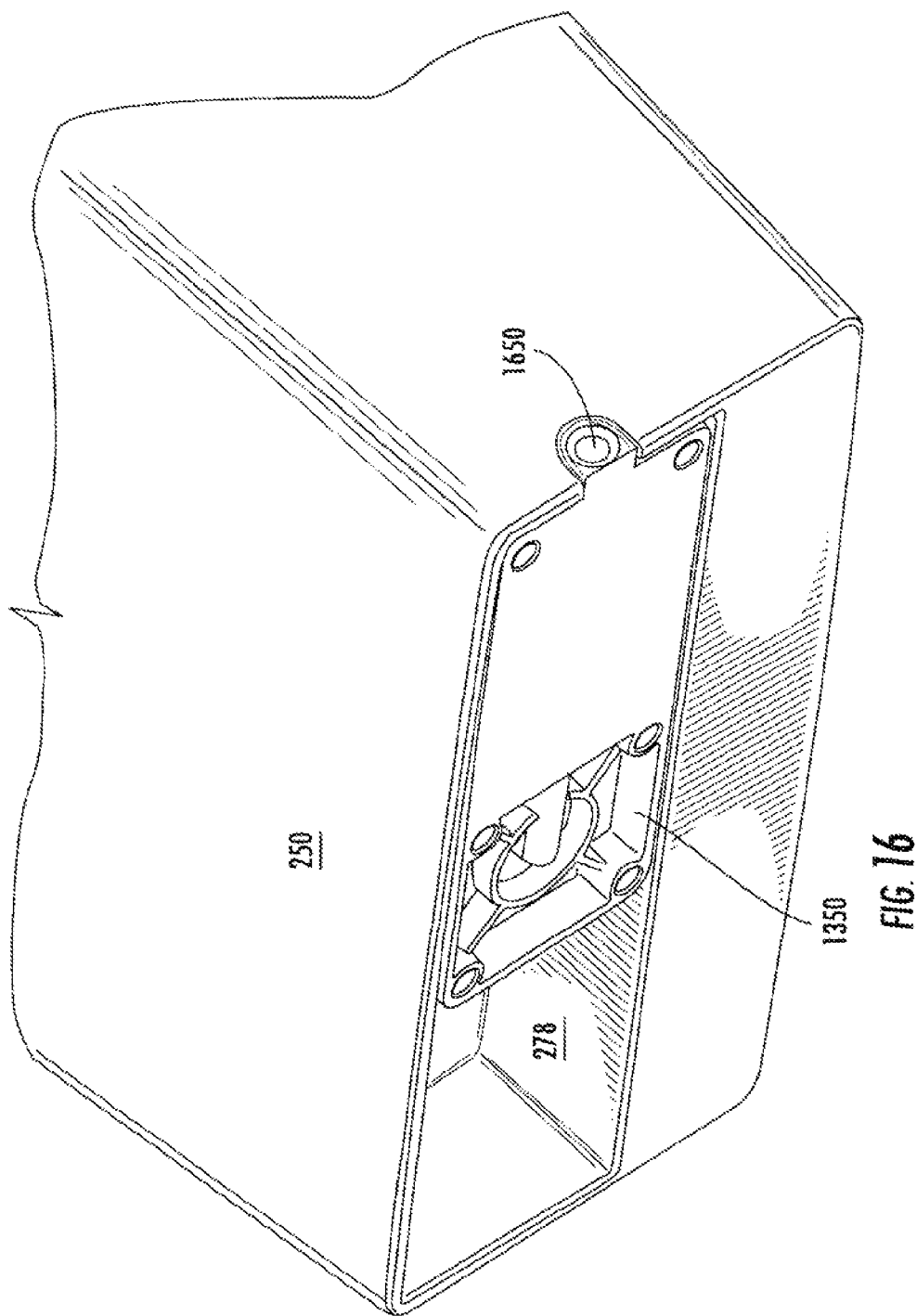
FIG. 16 is a partial perspective view of the underside of a cartridge of the invention from the lower right.

FIG. 16 illustrates the bottom 250 of the cartridge housing from a lower right-hand perspective from the rear and illustrates one embodiment for connection of the cartridge to an air source at internal air flow path 1650 for operating a diaphragm pump for circulating build material within the cartridge and for conveying build material to the transport surface. The diaphragm pump is located at 1350 in a chamber provided and its features and operation are described in detail below.

Figure 17:
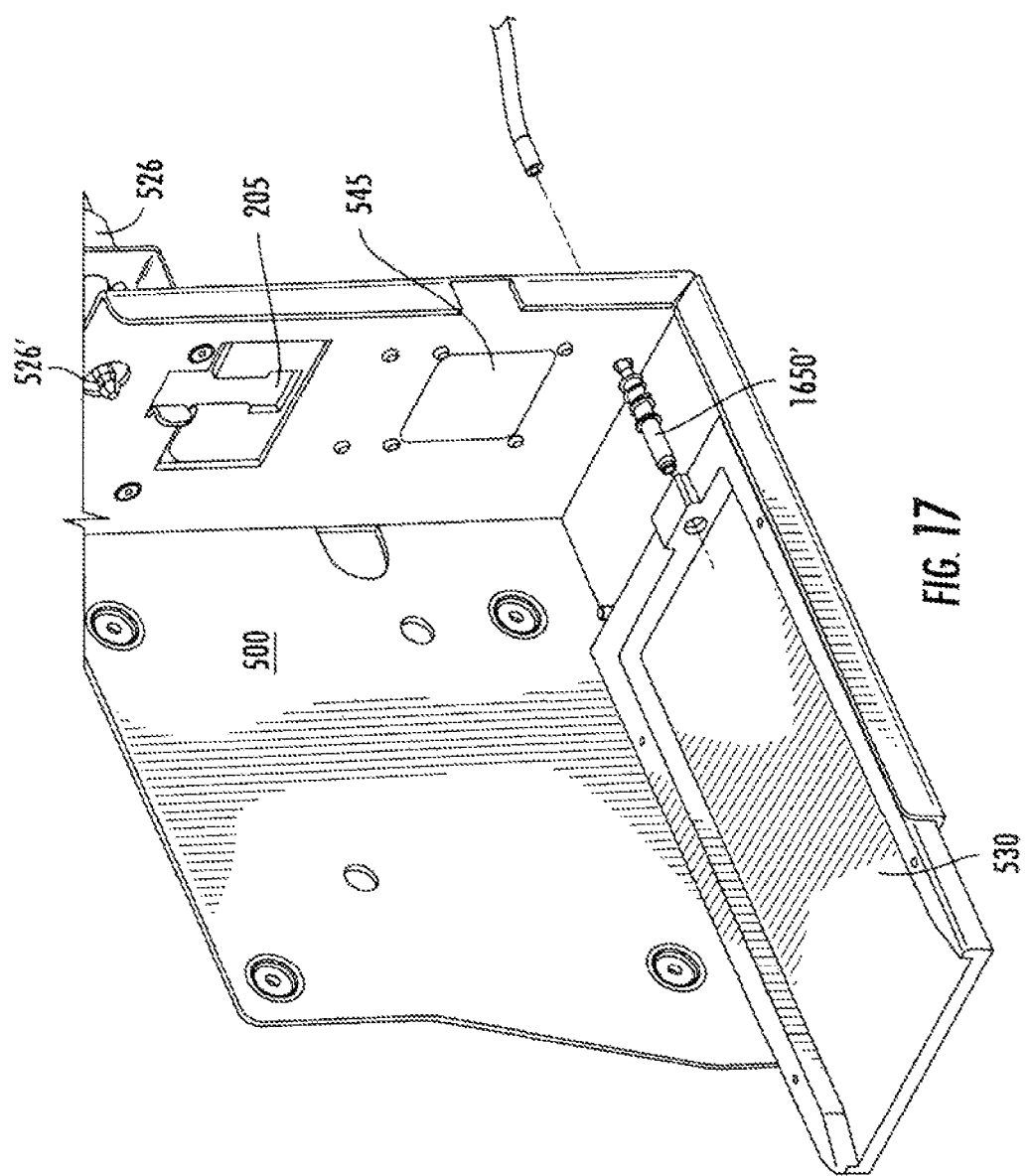
FIG. 17 is a partial perspective view of a frame into which selected embodiments of the cartridge of the invention may be inserted.
Figure 18:
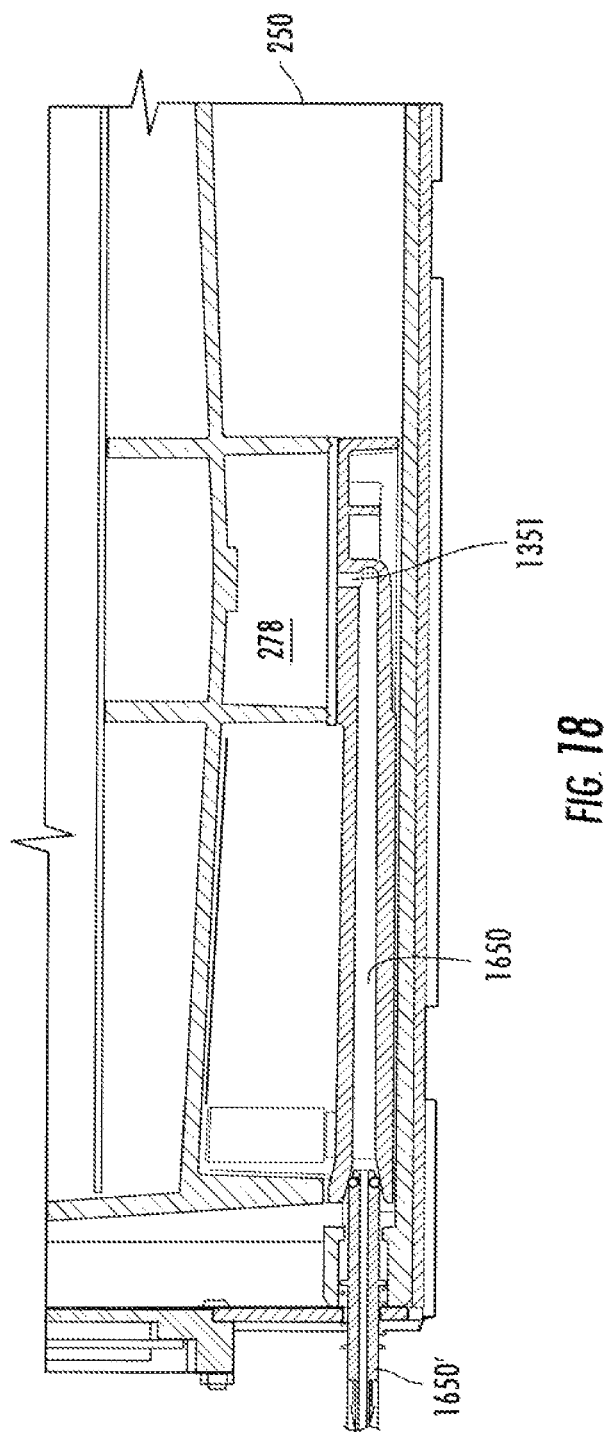
FIG. 18 is a partial side sectional view of the apparatus of FIG. 17.
Figure 19:
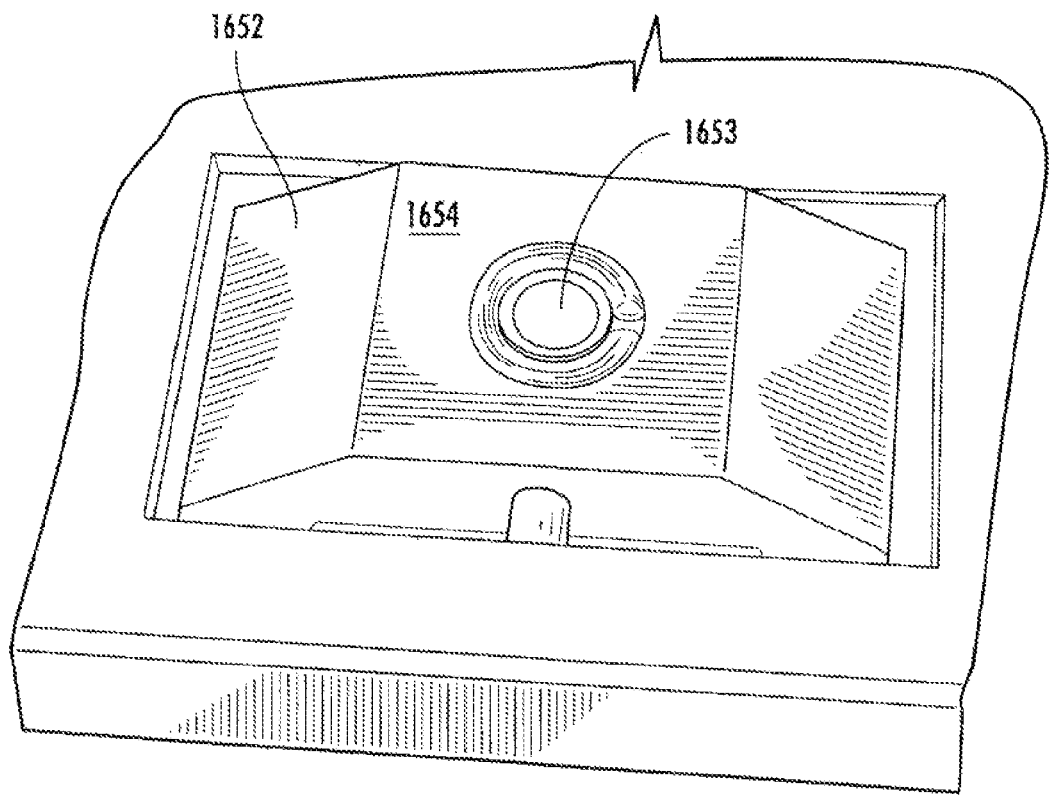
FIG. 19 is an overhead partial perspective view of the floor of a frame, illustrated in FIG. 3, supporting the cartridge and illustrating an articulating housing for a seal for engaging the cartridge floor and securing a pneumatic connection to the cartridge.
Figure 20:
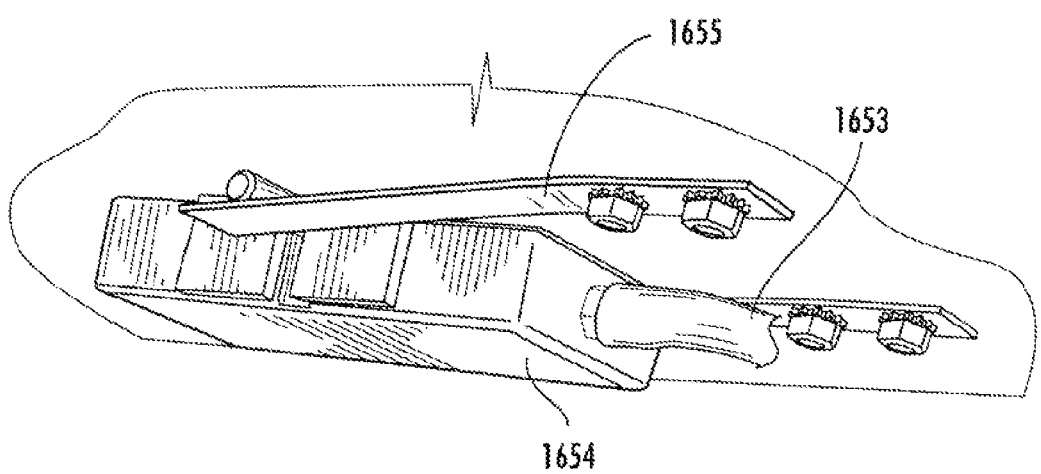
FIG. 20 is an underside partial perspective view of the articulating seal housing illustrated in FIG. 19 taken from below the floor of the cartridge frame illustrated in FIG. 3 and illustrating leaf springs attached to the underside of the cartridge frame engaging the housing.

FIGS. 17 and 18 illustrate air supply to the diaphragm pump through the air flow path 1650 of FIG. 16. A corresponding air probe 1650' connected to an air pump in the desk top modeler, which generally is located in the electrical panel 128 (FIG. 1), inserts into the path 1650 when the cartridge is inserted into its frame 500 (FIG. 17; 550' as illustrated in FIG. 3). The air flow path connects through orifice 1351 with the diaphragm pump chamber 278 in the lower portion of the cartridge housing 250 (FIG. 18; 250' in FIG. 10).

The frame 500 (500' in FIG. 3) is well illustrated in FIG. 17 for the embodiment having an air probe connection to the diaphragm pump. The air probe inserts through orifices in the rear wall of the frame and frame floor 530 and is secured in the floor of the frame for engagement of the air flow path 1650 (FIG. 16) when the cartridge is inserted into the frame. The cartridge may also include a radio frequency identification tag on the housing mounted beneath the flexible drive motor couplings corresponding to a reader 545 on the frame to identify the build material and to ensure compatibility.

Figure 21:
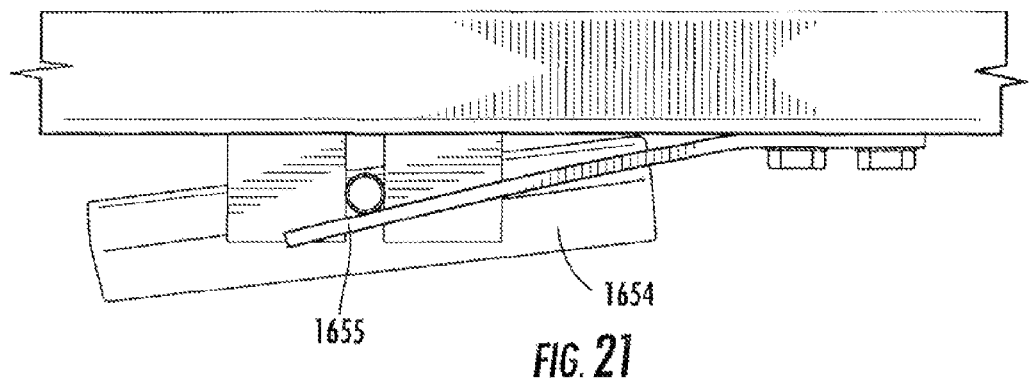
FIGS. 21 and 22 are partial plan views from the side of the cartridge frame floor, leaf spring and articulating seal housing of FIG. 20 illustrating in FIG. 21 the seal housing as it engages the cartridge on insertion into the frame and in FIG. 22 the housing in position when the cartridge is fully inserted.
Figure 22:
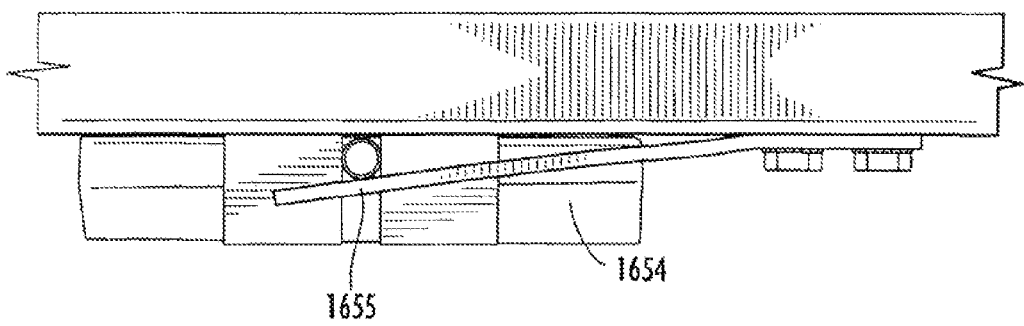

FIGS. 19 through 22 illustrate another embodiment of an air supply for the diaphragm pump. A flexible air supply conduit 1653 (FIGS. 19 and 20) receives air supply from an air source (not shown) contained in an electronics component panel 128 (FIG. 1) at the back of the modeler. Air supply conduit 1653 travels below the floor 530 of the frame 500 (FIG. 17; 500' in FIG. 3). When an operator inserts a cartridge into the cartridge frame, the cartridge engages the spring-biased ramped surface 1652 of a lever arm actuator 1654 located in the frame floor to push the air supply conduit into communication with an air receiving orifice 1352 on the diaphragm pump (FIG. 36) (FIGS. 21 and 22). Springs 1655 mounted on the underside of the frame floor supporting the cartridge keep the air conduit, which travels through the actuator 1654, in air supplying contact with the cartridge (FIG. 22).

Proceeding now to a detailed discussion of the interior of the cartridge, the reader should recognize that while the internal components are discussed with reference to the housing embodiment of FIG. 4, the features are generally similar to the internal components of FIGS. 3 and 10, with the exceptions that the embodiment of FIG. 3 does not include a separate cleaning assembly and alternatives are presented below for the cleaning assembly.

FIGS. 23 and 24 illustrate the cartridge housing 202 with the lid 204 removed and exposing the internal components in the upper section 220 of the housing, including the intra-layer cleaning assembly having a roller brush 314 rotatably mounted in a housing 320 for removal of excess uncured build material. Excess uncured build material can be removed by spinning the brush for cleaning or using a squeeze roller to recover excess uncured build material for reuse, as explained in detail below in connection with detailed drawings of the cleaning assembly. The excess uncured build material removed from the build surface, along with excess uncured build material remaining on the film, can be passed into a lower section 250 of the cartridge and through a filter 267 (FIGS. 28 and 29) to remove particles for reuse until the cartridge is spent and replaced.

A contact roller 230 contacts the film for extension and retraction and is rotatingly coupled to coupling 224 for driven retraction of the film by motor 524 (FIGS. 2 and 3). Coating gravure roller 240 applies build material to the film. Coating roller 240 is activated for coating the film by a rod 245 driven by coupling 226 connected to motor 526 (FIGS. 2 and 3). A tray reservoir, not seen in this view, is disposed just below the coating roller to apply a thickness of build material 410 to the coating roller. As illustrated in FIG. 23, the film is fully retracted and the cleaning assembly is fully retracted into the housing. As illustrated in FIG. 24, the film is being extended and coated.

FIG. 25 presents a detailed view of the isolated coating roller to illustrate control of the thickness of build material applied to the film. As shown in FIG. 25, the thickness of build material is determined by the distance between the contact roller 230 and hard plastic stop discs on the ends of the coating roller, 242' and 243'. Adjacent ends 242 and 243 are made of the same elastomeric material as the coating roller 240, typically a silicone rubber, but are of a slightly larger diameter for an interference fit with the film on the contact roller, acting as drive tires to rotate the coating roller against the extension of the film. The ends 242 and 243 are resilient and compress to the diameter of the hard plastic stops 242' and 243' to control the thickness of the build material applied to the film.

Figure 26:
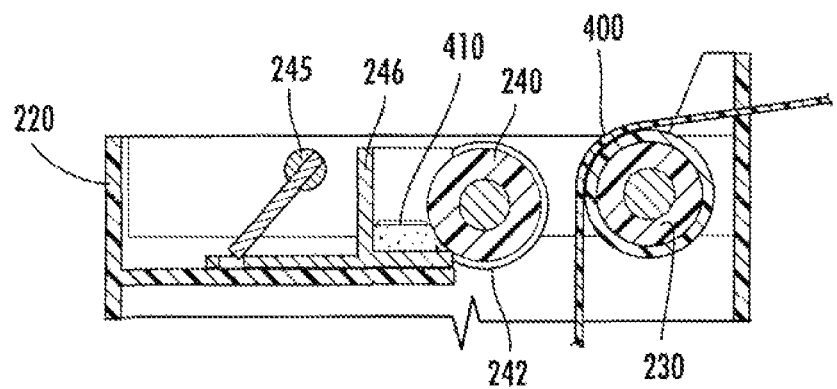
FIGS. 26 and 27 are partial sectional side-plan view of an upper section of the cartridge of FIGS. 23 and 24, respectively.
Figure 27:
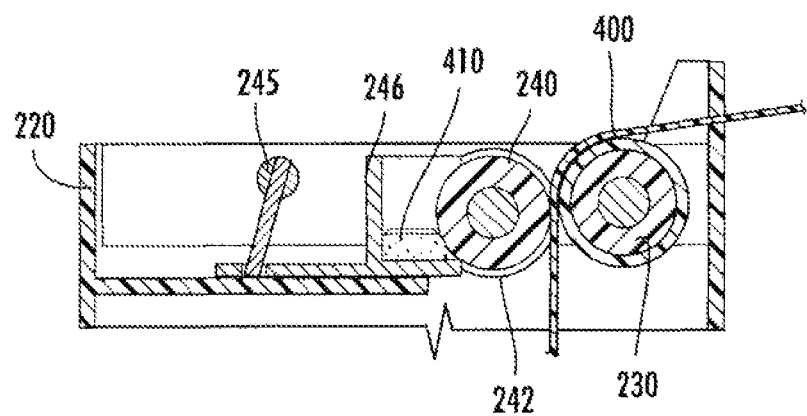

Sectional views of FIGS. 26 and 27 further illustrate how the coating roller engages the contact roller. Actuator rod 245 is connected as a lever to tray reservoir 246 containing build material 410 and coating roller 240. As shown in FIG. 26, unless the actuator rod 245 is activated, the coating roller does not contact the film and no build material can be applied. When the rod is pushed forward, as in FIG. 27, the reservoir and coating roller engage the film 400 on the contact roller 230 to coat the film as the film is extended.

The layer of build material applied to the film should have a substantially uniform depth as applied across the film, although that depth can vary in each layer between certain upper and lower limits. The thickness of build material on the transport film should be at least as thick as the layer of the corresponding cross-section being formed during the build process. If the layer of build material applied to the film is too thick, then the build cannot displace sufficient build material to form the part layer with the desired layer thickness. If the layer of build material applied to the film is too thin, then the cross-section formed on the build will be less than the desired thickness, potentially ruining the build. Generally speaking, the depth of the layer applied to the film will range from about 0.0045 to 0.0055 inches thick. In the production of hearing aid shells, thinner layers of from about 0.002 to 0.0025 inches thick are typical.

The thickness of the layer of build material applied to the build during the build process contributes to the resolution of the build object produced. The depth of the individual layers may vary from layer-to-layer depending upon the part being built or the stage of production. Initial layers of build material for support structures sometimes are somewhat thicker while layers for delicate thin build structures may be somewhat thinner.

Two primary factors determine thickness of the build material layer as applied to the build: the thickness of the transport film and the thickness of the initial and subsequent layers applied to the transport film during the build process. The film normally is slightly thicker than the build material layer thickness, typically by from about 0.0005 to 0.0015 inch. Film thickness can vary somewhat across its span, although a substantially uniform film thickness is desirable.

Turning now to a discussion of the internal components of the cartridge as these components are arranged in the three sections of the cartridge housing, FIGS. 28 and 29 illustrate sectional views through the cartridge assembly 200 to show the film extending (FIG. 28) and retracted and stored (FIG. 29). While a cleaning assembly 300 is shown, it should be recognized that this feature is absent from the embodiment of FIG. 3 and as further illustrated below, and that the operation and location of the remaining components is substantially the same.

FIGS. 28 and 29 show the intra-layer cleaning assembly 300 attached to the film 400 in the lid 204 of the cartridge housing. FIG. 28 illustrates the film extending from an opening in the lid 204 adjacent the upper section 220 of the housing, and seals 280 that are formed between the lid and the upper section of the cartridge housing and between the upper and lower sections of the housing. The seals, including that for the fully retracted intra-layer cleaning assembly, preclude loss of build material or contamination by light, including UV light.

A gravure reservoir 246 in the upper section of the cartridge housing receives build material 410 from a storage reservoir 290 in the lower section of the housing, from which the build material is conveyed to coating roller 242 for coating the transport film in the manner described above in connection with FIGS. 24 through 27.

The lower housing includes a first wetted chamber 290, which is the reservoir for build material, separated by an internal wall 291 defining a second dry chamber for accommodating chassis legs 276 and storing the retracted film when the cartridge is assembled, and a third chamber 278 for a diaphragm pump 1350 (FIG. 36) for conveying build material from the reservoir 290 to the upper section 220 for application to the transport film 400 by the coating roller 242. When assembled, the chassis legs 276 extend through the upper section of the housing into the dry chamber in the lower housing, while the coating and contact rollers 242, 230 respectively, are located in the upper housing. The entire chassis is shown in perspective in FIGS. 30 and 30A generally at 275.

FIGS. 28 and 29 also show a scraper 260 defined by a sharp upper edge of internal wall 291 of the cartridge housing. The scraper contacts the film when it is being retracted and removes resin from the film so that a clean film will result.

Figure 31:
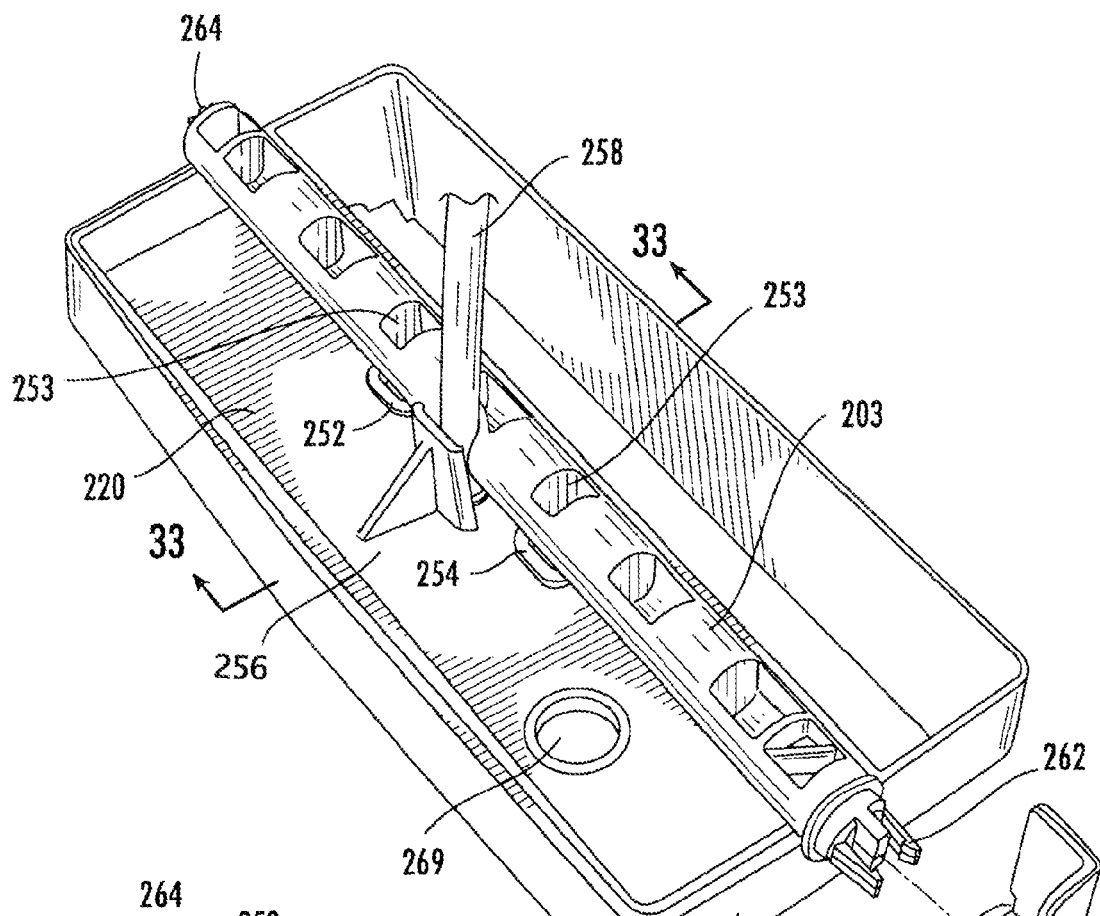
FIGS. 31 and 32 are overhead left-hand sequence views of the underside of a section of the cartridge of FIG. 25 taken from the front of the cartridge as the cartridge faces the front of the apparatus of FIG. 2 and illustrating a rotary valve for controlling flow of build material in an open position in FIG. 31 and rotated to a closed position in FIG. 32.
Figure 32:
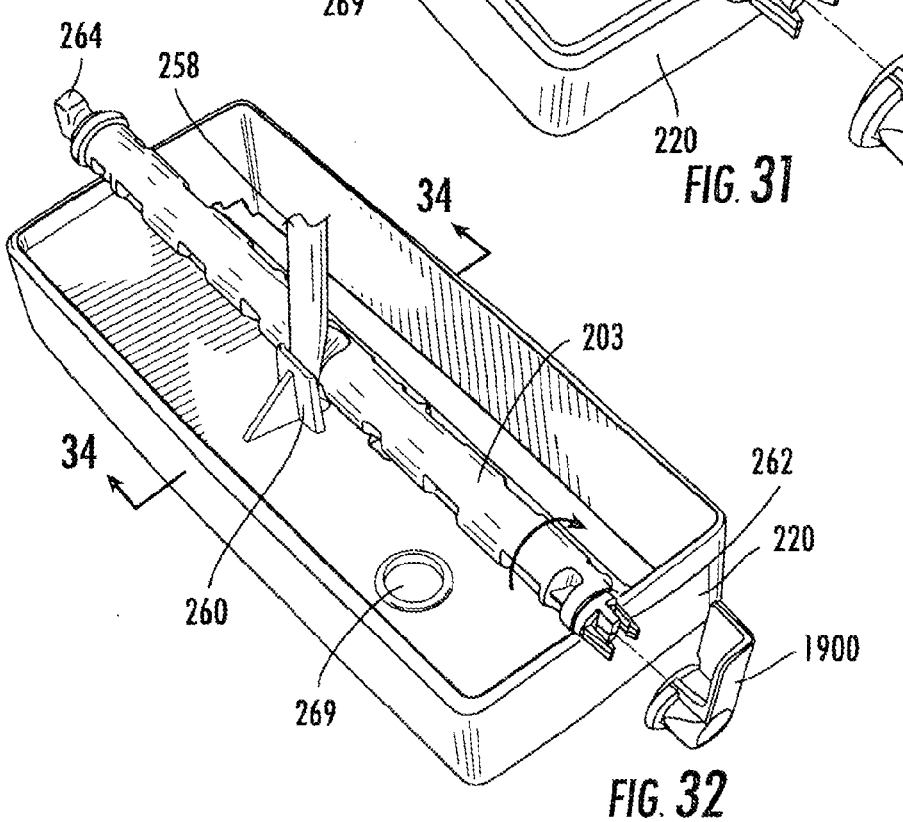
Figure 33:
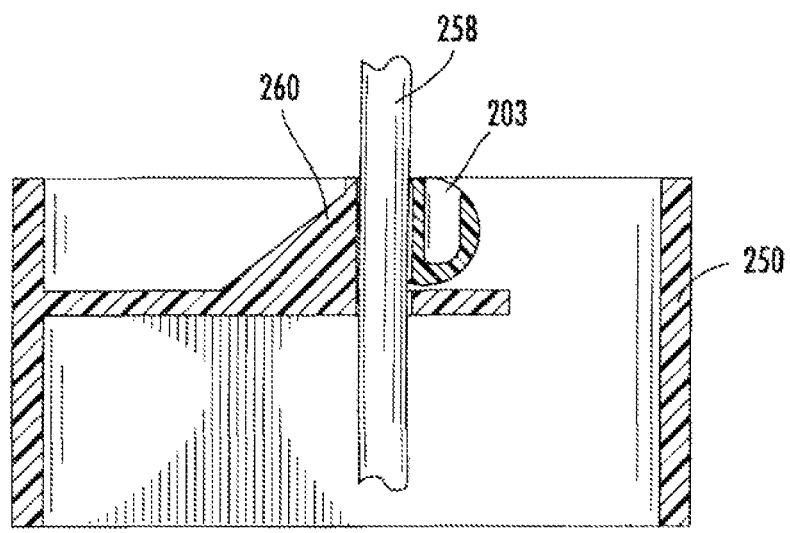
FIGS. 33 and 34 are sectional plan sequence views taken along lines 33-33 of FIG. 31 and 34-34 of FIG. 32, respectively.
Figure 34:
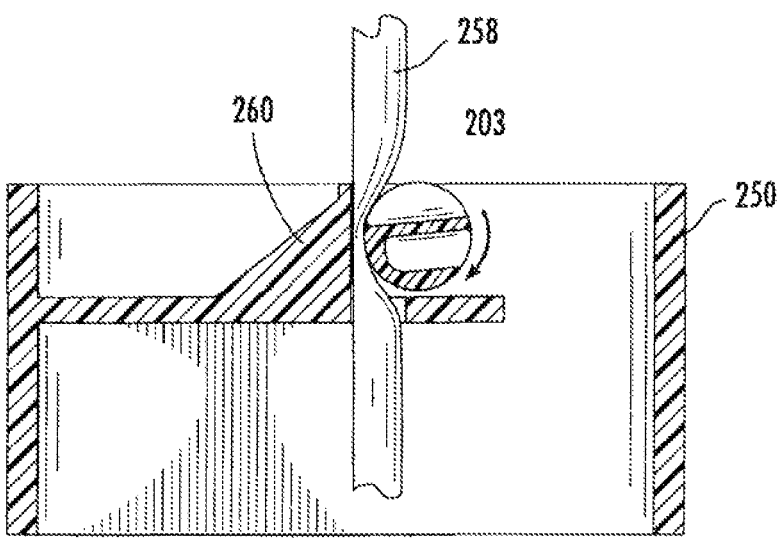

The floor 221 of the upper section of the housing 220 directs excess uncured build material removed from the film and obtained from the intra-layer cleaning assembly through elastomeric fittings 252 and 254 (FIG. 31) to the open rotary valve 203, which passes the recovered build material through to the build material reservoir 290 of the lower section of the cartridge.

The build material is drawn through a filter 267 to remove solids by a diaphragm pump located in the lower section of the housing in a third pump chamber at 278 beneath the build material reservoir to remove solids. The diaphragm pump continuously circulates the build material during use to maintain homogeneity.

FIGS. 30 and 30A show the film chassis 275 in perspective upon which are mounted the contact roller 230, the coating roller 242, and the gravure reservoir 246 (FIGS. 28 and 29). The chassis has elongated legs 276 and an elongate longitudinal slot 276' in each leg providing a track for a follower rod 265 about which the film travels to its termination adjacent the contact roller. The follower rod provides tension to the film when it is extending or retracting. The retractor motor 524 (FIG. 2) causes take-up straps 277 located on the exterior of each leg 276 and attached to an idler rod 279 to pull the follower rod 265 down the slot to retract the film.

FIGS. 31 through 34 illustrate operation of the rotary valve 203, viewing the valve from the underside, looking upward to the bottom of the upper section 220 of the cartridge. The ends of valve 203 protrude through openings in the lower housing section 250 (FIG. 4; 250' in FIG. 10, one end 262 extending to engage a valve handle (see FIGS. 2, 3, and component 1900 in FIG. 10) and the opposite end 264 extending, in the embodiment of FIG. 4, to engage spring locking bracket 205 (no locking bracket is needed in the embodiment of FIG. 10, which relies instead on a locking valve handle).

The valve 203 in its open position establishes flow communication with the build material reservoir in the lower section (not shown in this view) for return of unused build material. In its closed position, the valve seals against flow of build material into or out of the lower wetted section. The unused build material comes both from the build, by removal with the cleaning assembly 300 or film, and from the retracted film itself on which unused build material remains. The unused build material travels via through-openings 253 to elastomeric fittings 252, 254 fitted into a floor 256 between the valve and the upper section of the cartridge.

A conduit 258 is provided for supplying build material from the reservoir to the gravure tray 246 in the upper section (not shown in this view). The valve is shown in flow communication in FIGS. 31 and 33. When the valve is in a closed position, as in FIGS. 32 and 34, the conduit is pinched against supporting member 260, which extends from the upper section underside, and seals against elastomeric members 252 and 254 to preclude flow either to or from the reservoir in the lower section.

It should be noted that the cartridge assembly is filled with build material from the top, with the lid removed, through opening 253. Alternatively, an orifice 269 could be provided, as illustrated, through which the build material may be filled and then sealed with a cap.

Figure 35:
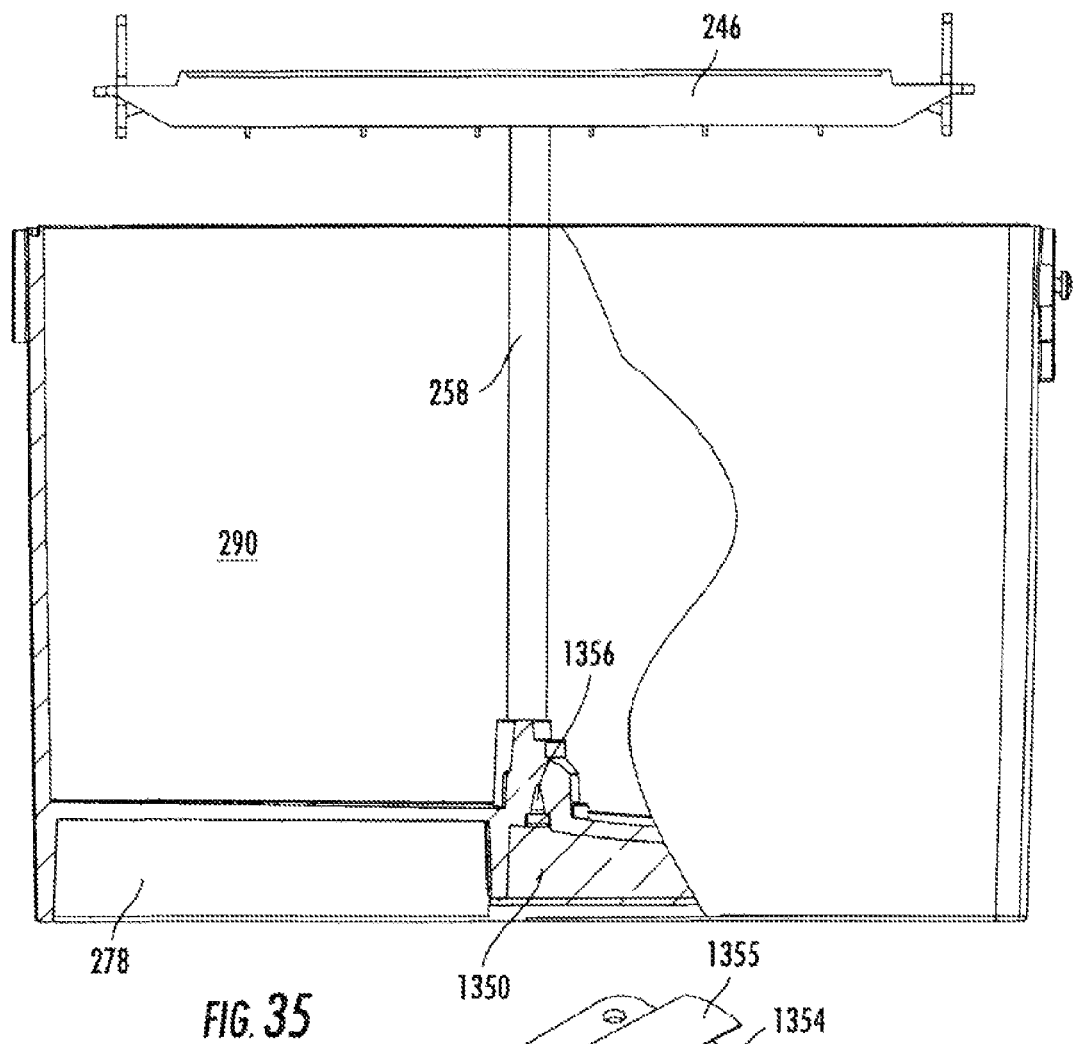
FIG. 35 is a partially broken away, partially sectional view of the lower section of the cartridge of FIG. 4 illustrating a main build material reservoir, a diaphragm pump for build material, and a conduit supply to a tray reservoir for the build material located above the lower section.
Figure 36:
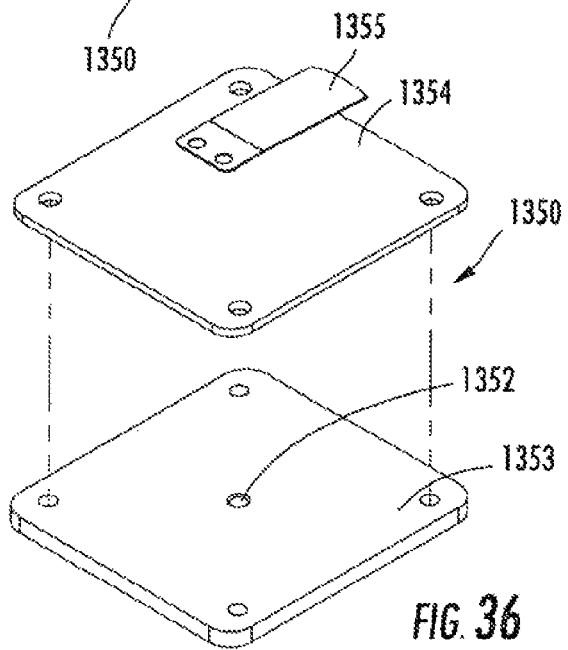
FIG. 36 is a perspective view of a diaphragm pump and reed valve for controlling build material flow to the pump.

FIGS. 35 and 36 illustrate a diaphragm pump 1350 in greater detail. The diaphragm pump pumps the build material 410 (FIGS. 28 and 29) from the first wetted chamber 290 of the housing 200 to the coating reservoir 246. The pump resides in a third chamber 278 beneath the build material reservoir (first wetted chamber 290) so as to use gravity to make the build material flow to the pump and thus ensure that all build material contained in the wetted section can be consumed before the cartridge is replaced or discarded.

The diaphragm pump has an air inlet 1352 (FIG. 36) for actuating the diaphragm retract 1354 to push build material in the pump through the conduit 258 and into the gravure reservoir 246. When air is off, the weight of the build material pushes through a slot in the bottom of the wetted chamber (not shown) against reed valve 1355 to fill the pump cavity with build material and flatten the diaphragm against the pump cover. The reed valve allows build material to flow from the wetted chamber to the pump but does not allow flow back into the wetted chamber. Likewise, a ball check valve 1356 provided in the build material outlet in the conduit to the coating reservoir allows flow from the pump through the conduit to the coating reservoir but prevents flow back into the pump.

To activate the diaphragm for pumping, air is supplied though orifice 1352 and strikes the diaphragm 1354 to push the diaphragm upward and to force the build material through the build material conduit 258 to the coating assembly reservoir 246 in the upper section. Pulsing the air on and off continually fills and empties the pump cavity to convey build material to the reservoir.

When the cartridge is delivered to a user, the diaphragm pump would be filled with build material and the rotary valve handle would be in the closed position. The rotary valve openings for build material flow would be turned to the side, pinching the flow conduit and precluding flow through the conduit to the upper section of the housing. The valve handle is ineffective to turn the rotary valve until either unlocked (FIG. 10), or the cartridge assembly is fully inserted into the desk top modeler and the spring clip engages the fitting on the rear wall of the cartridge frame (FIG. 4A). These features, along with other sealing features relating to the cleaning assembly and joinder of the housing sections, discussed below, substantially reduce the possibility of build material leakage from the cartridge.

When rotated to the off position, the valve pinches the conduit from the diaphragm pump to the coating reservoir and precludes fluid entering the reservoir, even if it could negotiate the inactive diaphragm pump's reed valve and check valve, which is highly unlikely. When actuated, the diaphragm pump is supplied with air, the rotary valve releases the fluid conduit, and the valve provides a recycling passageway from the scraper and filter to the main reservoir. This recycling passageway is closed until the valve is turned when the cartridge is fully inserted into the modeler.

Figure 47:
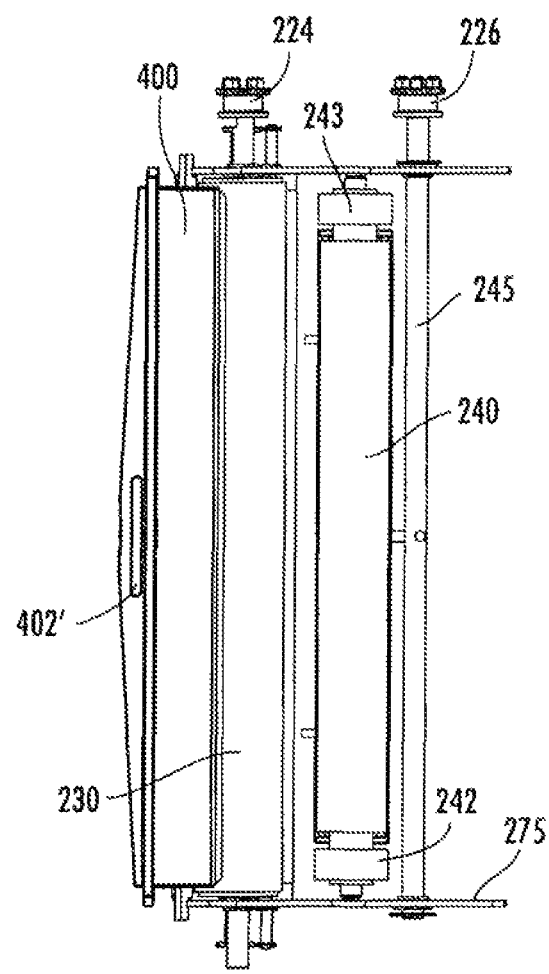
FIG. 47 is an overhead plan view of an alternative embodiment of the invention corresponding to FIG. 3.

Turning now to a discussion of the extension of the film and intra-layer cleaning assembly from the cartridge, FIGS. 37 through 46 illustrate various intra-layer cleaning assemblies and FIGS. 47 and 47A illustrate embodiments including that of the apparatus of FIG. 3 in which no cleaning assembly is attached to the film.

Figure 37A:
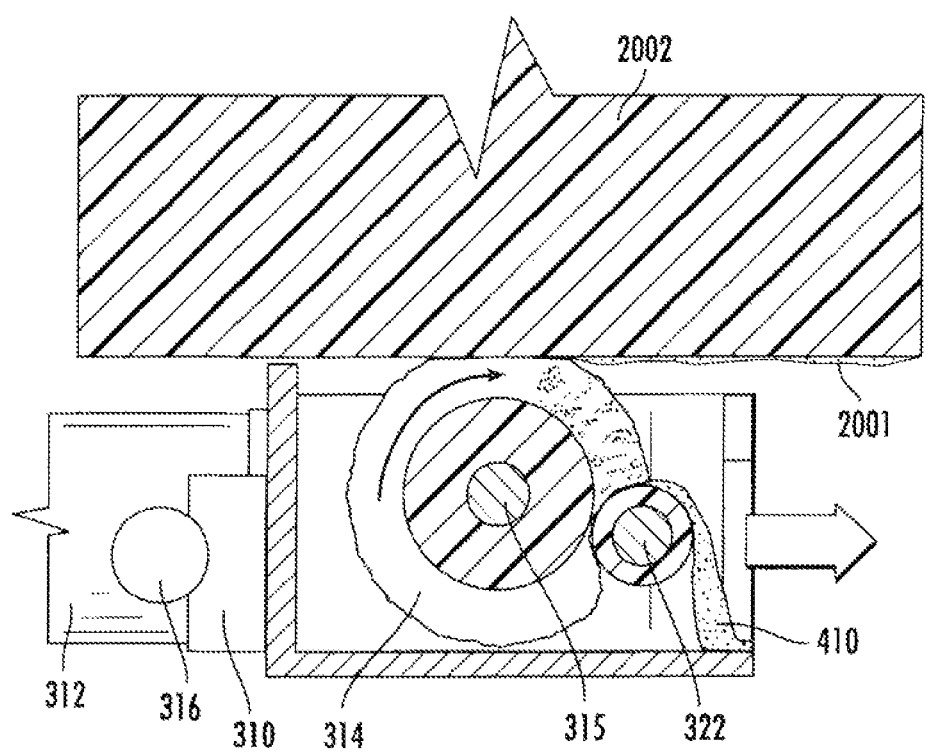
FIG. 37A is partial transverse sectional view of the intra-layer cleaning assembly of FIG. 37 illustrating in addition a section through a build as excess uncured build material is removed and collected for reuse.

FIGS. 37 and 37A illustrate the components and operation of one embodiment of the intra-layer cleaning assembly. Brush roller 314 is axially mounted for rotation within housing 320 about axis 315. Axis 315 is rotatingly connected to drive motor 312 through motor driven arm 310. Motor driven arm 310 is separately driven, in a manner described below, to extend the cleaning assembly and film.

A suitable roller brush 314 includes synthetic mohair brushes used for rollers for applying adhesives or paint. These roller brushes have a soft pile and short fibers of about 3/16ths inch length that do not damage the build and readily remove uncured build material.

The roller brush is extended with the film and, upon retraction in the direction of the arrow of FIG. 37A, contacts the surface of the build to remove excess uncured build material. The rotating brush rotates in contact with the surface of the build at a suitable rate to remove excess uncured build material, which normally is in the range of about 360 rpm's (revolutions per minute) in a clockwise direction. In the embodiment illustrated, a squeeze roller 322 is provided for removing excess uncured build material from the cleaning roller brush 314. The squeeze roller, held against the cleaning brush under the tension of springs 322', continuously squeezes the fibers of the cleaning brush to remove the build material (FIG. 37A) for return to the cartridge.

The excess uncured build material travels out of the housing 320 via opening 321 in the housing and onto the film and into the cartridge for recovery. When the assembly returns to the cartridge, it is sealed against UV exposure as described below in connection with the embodiment of FIGS. 39 through 40E.

Figure 38A:
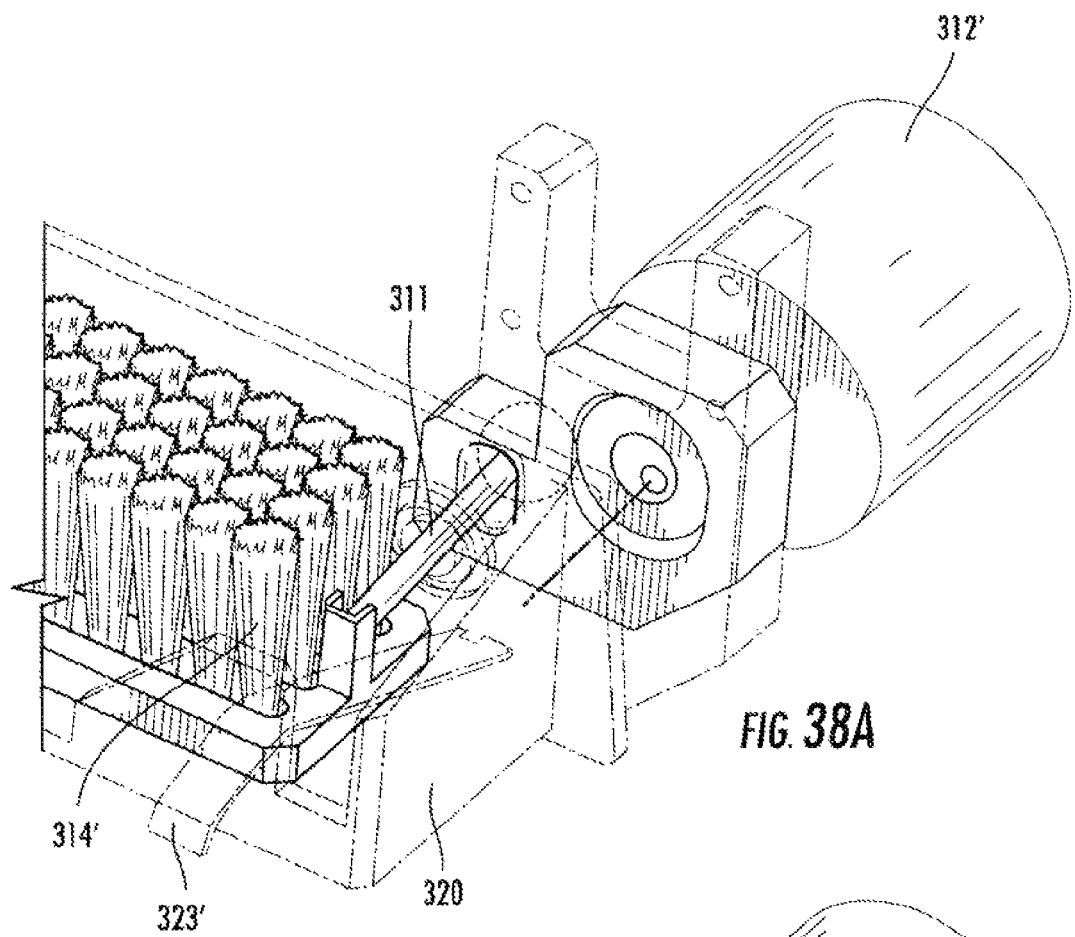
FIGS. 38A and 38B are partial perspective views of a portion of the apparatus of FIG. 38.
Figure 38B:
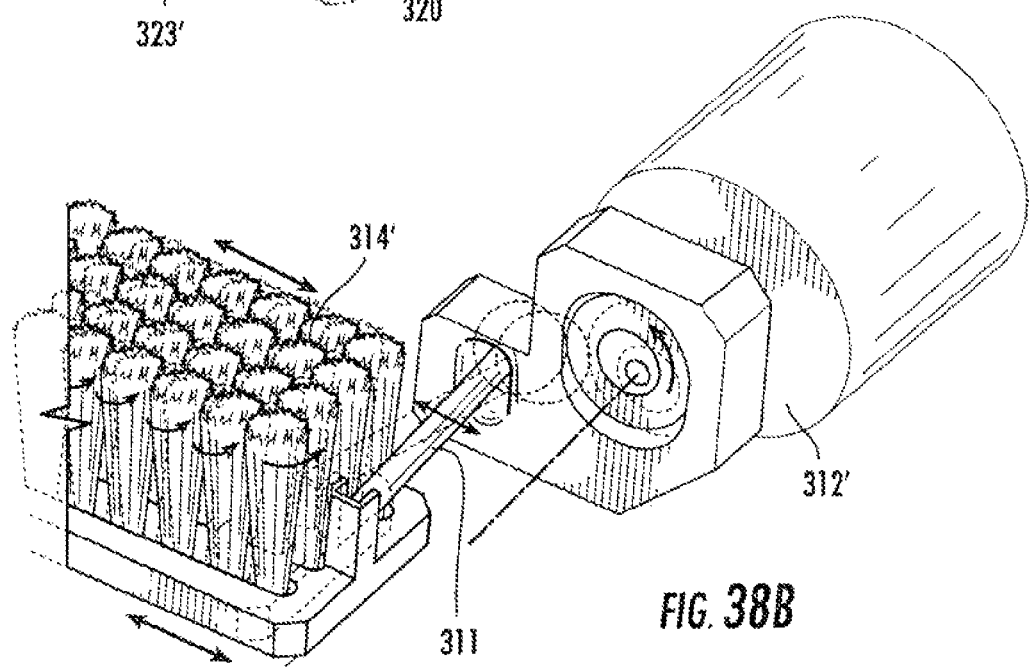

FIGS. 38 through 38B illustrate an alternative to the roller brush 314 of the previous FIGS. 37 and 37A. The cleaning assembly of FIGS. 38 through 38B is an oscillating linear brush 314', oscillated on an eccentric arm 311 by a motor 312'. A leaf spring 323' is provided to assist in securing the cleaning assembly housing 320 and oscillating linear brush 314' in the cartridge 202. FIG. 38 illustrates the cleaning assembly and film extended out of the cartridge and traveling in the direction of the arrow across the image plane 605 and frame 610 for imaging. FIGS. 38A and 38B illustrate the eccentric arm in relation to the motor 312' and linear brush 314'.

Figure 39:
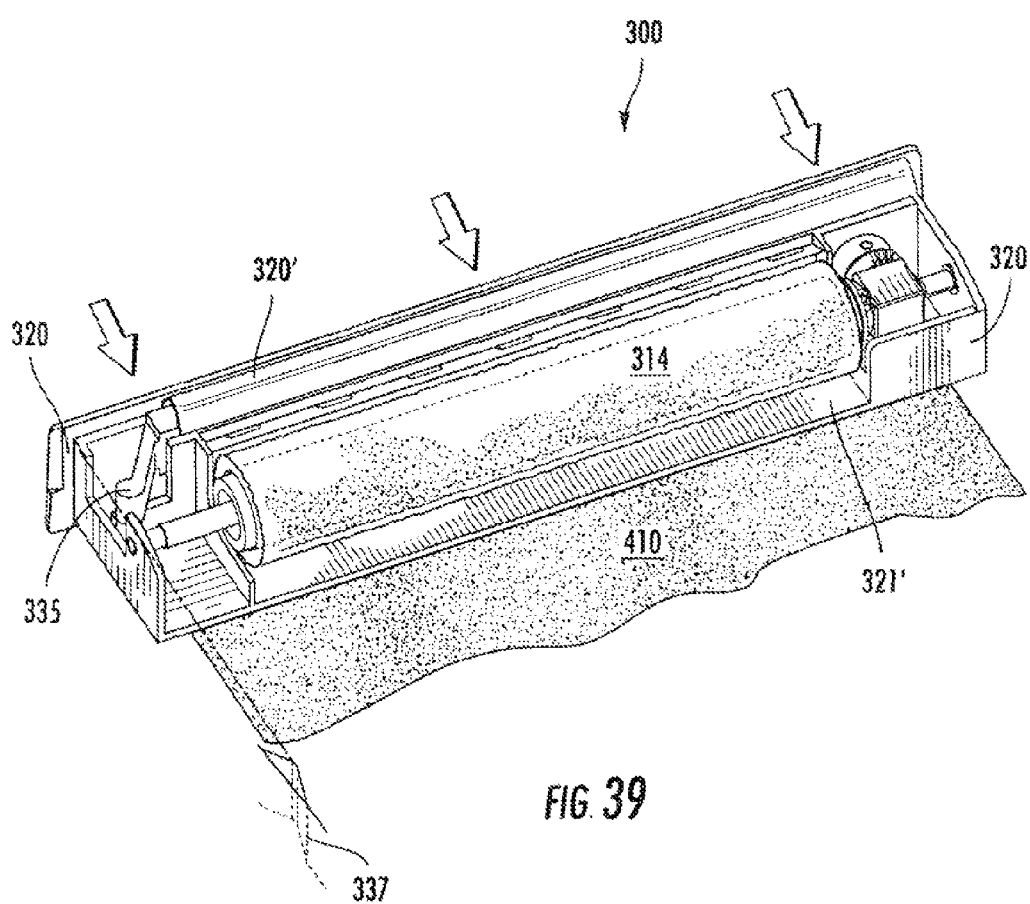
FIG. 39 is an overhead perspective view of yet another embodiment of the intra-layer cleaning assembly of the invention shown extending with the transport film.
Figure 40A:
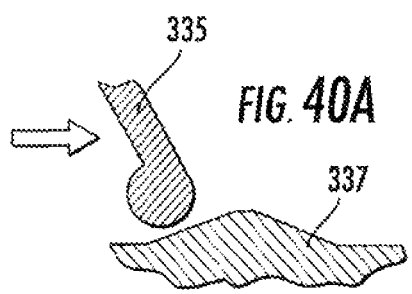
FIGS. 40 through 40E are a sequence of sectional and plan views illustrating the sealing of the intra-layer cleaning assembly of FIG. 39 in a cartridge of the invention.
FIGS. 40F and 40G schematically illustrate the intra-layer cleaning assembly of FIGS. 40 through 40E in positions for clearing build material from a component of the assembly and for clearing build material from the assembly itself, respectively.
Figure 40B:
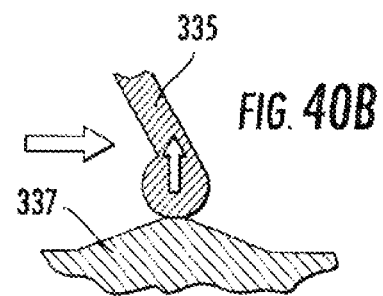
Figure 40C:
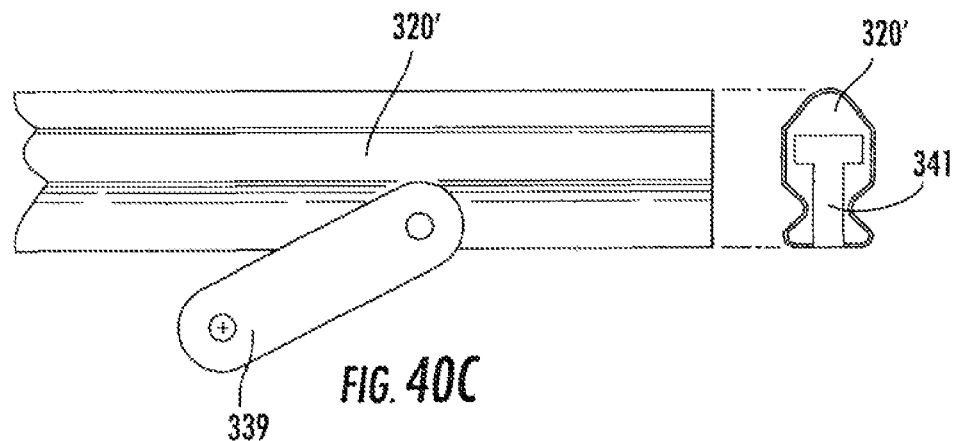
Figure 40D:
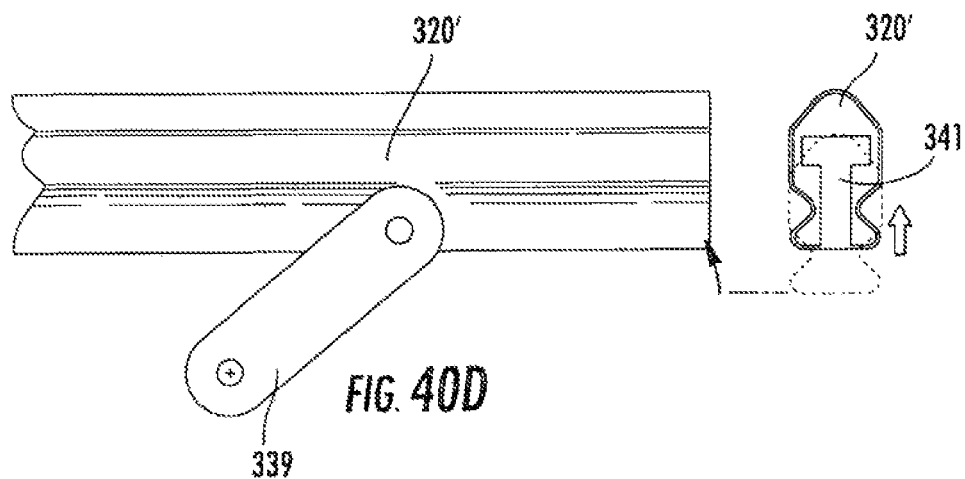
Figure 40E:
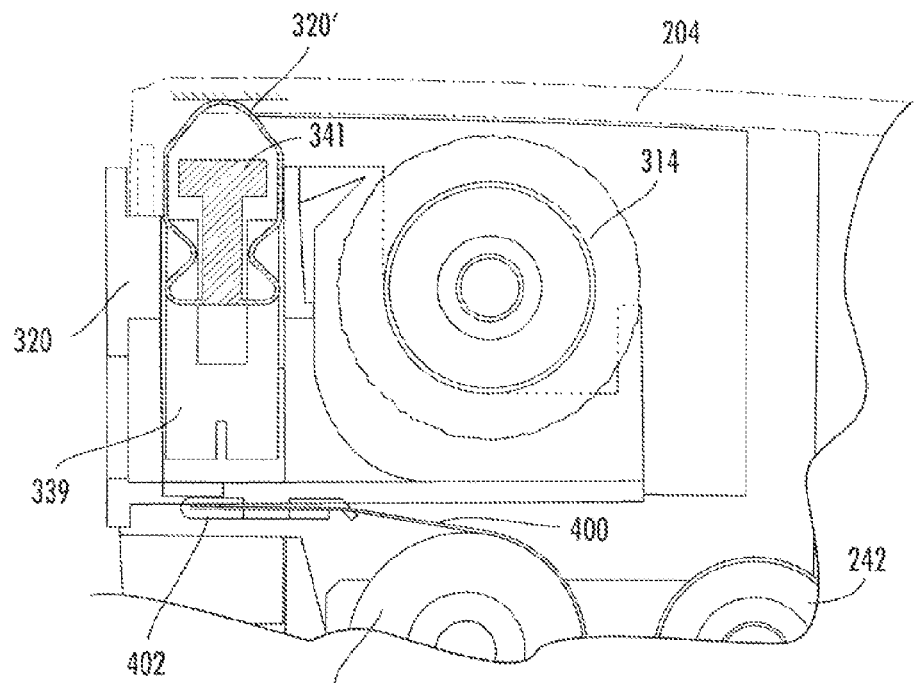
Figures 40F, 40G:
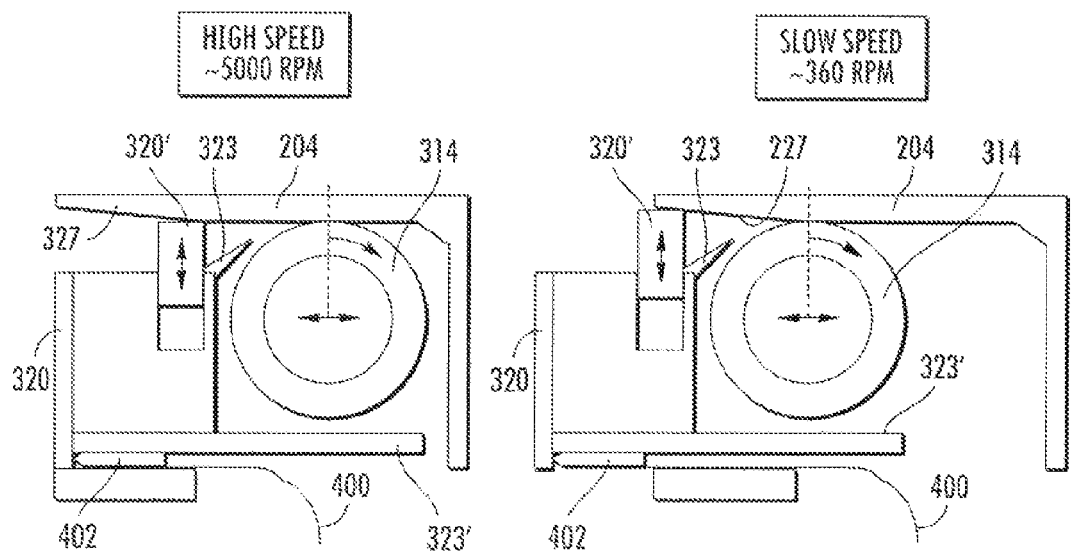
Figure 41:
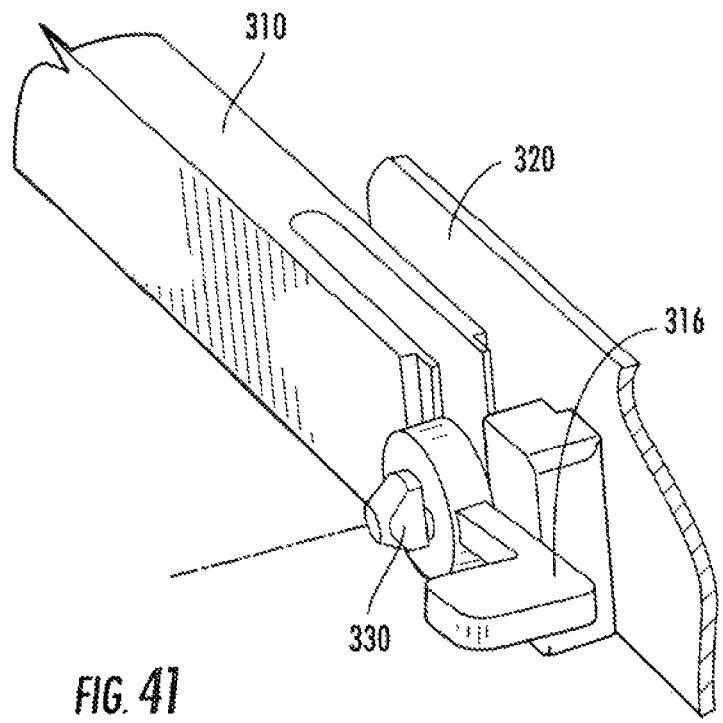
FIG. 41 is a partial overhead perspective view from the side opposite the intra-layer cleaning assembly of an assembly for securing the intra-layer cleaning assembly for extension of the transport film.
Figure 42:
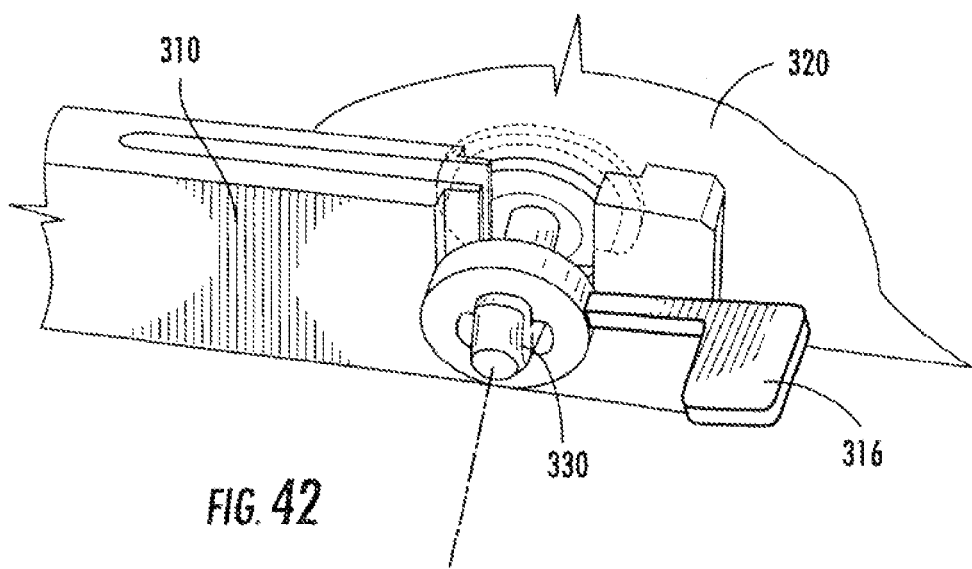
FIG. 42 is view similar to that of FIG. 41 rotated counter clockwise to illustrate securing of the intra-layer cleaning assembly to the tractor motor assembly.
Figures 43, 44:
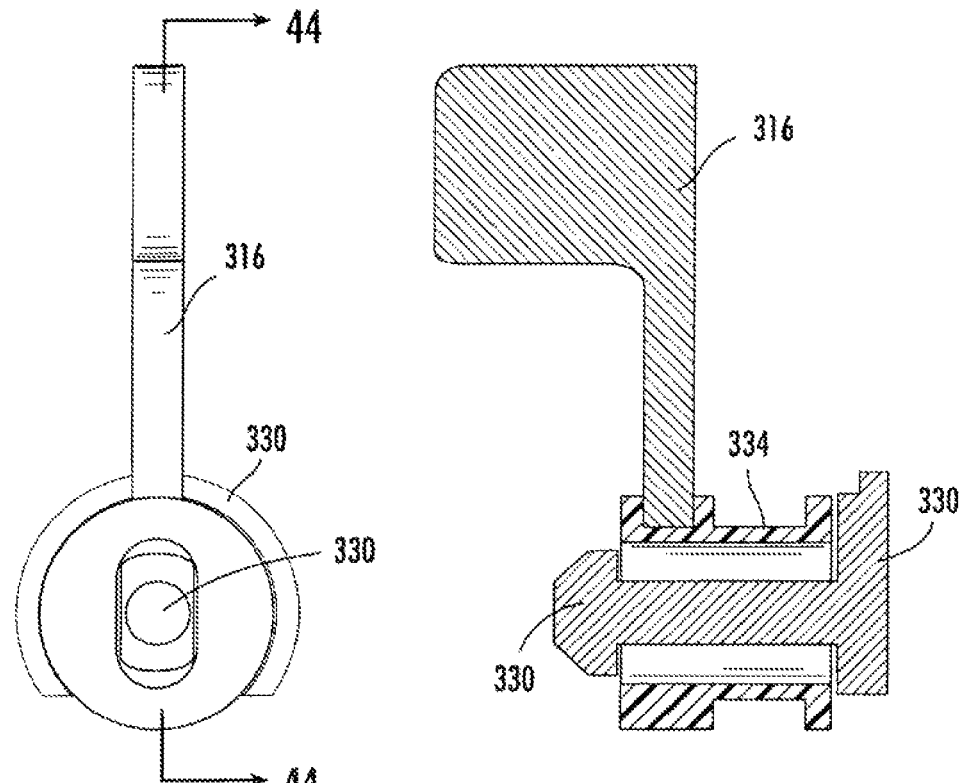
FIG. 43 is a front plan view of a lever arm of the motor assembly taken from FIG. 41 in an upright, non-secured position for securing the intra-layer cleaning assembly.
FIG. 44 is a side sectional plan view of the lever arm of FIG. 43 taken along line 44-44 of FIG. 43.
Figures 45, 46:
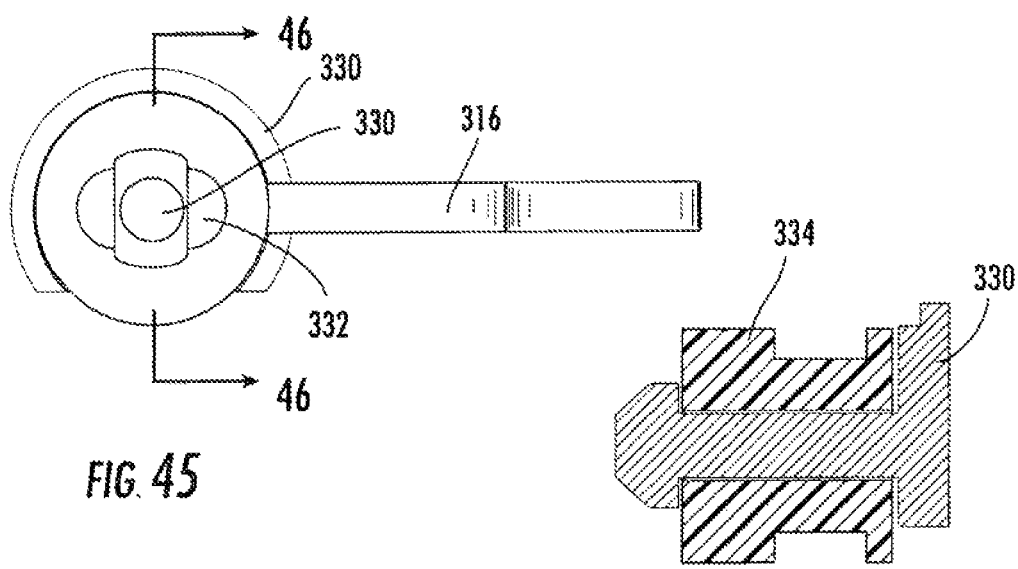
FIG. 45 is a front plan view similar to that of FIG. 43 illustrating the lever arm rotated to a secured position.
FIG. 46 is a side sectional plan view of the lever arm of FIG. 45 taken along line 46-46 of FIG. 45.

FIGS. 39 through 40G illustrate yet another embodiment of the cleaning assembly 300 of the invention, in which a rotating brush 314 removes excess uncured build material as in the manner of the roller brush of FIG. 37. Instead of using a squeeze roller to remove the excess uncured build material from the brush, the embodiment of FIGS. 39 through 40 spins the roller brush 314 at a high rate of about 5,000 rpm's clockwise once the roller brush and housing 320 are fully retracted into the cartridge housing and sealed. The roller brush spins at sufficiently high rpm's, from about 3,000 to 6,000 rpm's or more, normally about 5,000 pm's, to propel the excess uncured build material from the brush. The housing provides suitable splash guards 323, 323' (FIGS. 40F and 40G) for the intra-layer cleaning assembly and the opening 321' (FIG. 39) in the housing for excess uncured build material to return to the cartridge for filtration and circulation has been somewhat extended as compared to that of FIG. 37.

The housing 320 in all of these embodiments is sealed about its periphery against light intrusion and to preclude build material removed from the brush from contaminating the area outside the cartridge. FIG. 39 illustrates an elastomeric seal 320' for sealing against light intrusion that is actuated by a lever arm 335 as it engages a cam surface 337 on the interior of the cartridge housing. A spray shield 323 (FIG. 40F) protects the seal 320' from build material propelled from the brush. Material is propelled from the brush at an angle of about 45 degrees.

FIGS. 40A and 40B illustrate the lever arm striking the cam surface. FIGS. 40C and 40D illustrate a pivot hinge 339 actuated by the movement of the lever arm 335 across the cam to raise the seal 320' on support 341 to engage the cartridge housing to provide a light seal. It should be noted that the surface of the lid 204 is tapered adjacent the entrance slot at 327 (FIG. 40F) for the cleaning assembly so that the brush does not hit and wet the lid when the brush enters the cartridge, else the UV source would cure the material on the wetted lid. The brush is located vertically so that it touches the lid 204 once the brush is beyond the seal 320' and inserted fully into the cartridge. This arrangement mean that the brush continually removes material deposited on the lid as the brush spins, thereby ensuring the uncured build material clearing the brush does not remain on the lid.

FIGS. 40E and 40F show the cleaning assembly retracted into the cartridge housing at the high speed spinning position. When build material accumulates, the rotation speed is reduced to stop propelling build material and the brush is moved back and forth at least once to clear the build material propelled from the brush, which collects in the opening to the right provided by the spray shield 323' (FIG. 40G). As indicated with reference to FIG. 40G, the build material drips into the cartridge housing upper section to flow through the valve and into the build material wetted chamber in the lower section along with excess uncured build material scraped from the transport film. Pivot hinge 339 engages the seal support on both sides of the "T" to raise the seal into engagement with the cartridge housing lid portion 204 and, as shown in FIG. 40G, the seal remains against the lid as the brush housing moves left to clear the build material propelled from the brush.

FIGS. 41 through 46 illustrate attachment of the cleaning assembly 300 to the motor arm 310 (FIGS. 37 through 40). When the cartridge is inserted into the desk top modeler, the operator connects the intra-layer cleaning assembly to the motor driven arm via rotatable mechanical lever arm 316. Lever arm 316 provides a handle for rotation of the lever about an axis 330. Axis 330 extends from housing 320 and inserts into the opening in the lever arm. When the lever arm is rotated about the axis, an elastomeric fitting 334 in the lever arm surrounding the axis snugs housing 320 tight to the motorized arm.

There are several factors impacting operation of the brush. Regardless of whether a linear or rotating brush is selected, the brush should stroke the surface of the build a sufficient number of times to remove sufficient excess uncured build material and the brush should be cleared of the build material so as not to redeposit the material on the build surface and so as not to contaminate the cartridge. It is desirable to provide strokes as rapidly as possible to remove material from the build without, at the same time and prior to a separate clearing step, propelling the material from the brush. The rapidity of the strokes is empirically determined. The force holding the material on the brush is proportional to the surface energy of that material on the fibers comprising the brush. For higher surface energies, stroke speed typically is somewhat higher than for lower surface energies.

For a rotating brush, the centrifugal force on the resin is also a function of the angular speed in rpm's and the brush diameter. For a nylon bristle brush of 1.25 inches in diameter and a build material as described herein, 360 rpm has been demonstrated to be a suitable spinning speed for cleaning: not too fast to avoid propelling material from the brush, and not too slow to clean inefficiently.

Multiple sweeps of the brush across the build surface are typical, in both directions, left and right. When moving to the right, as illustrated in the figures, a rotating brush rotates clockwise. When moving to the left, re-extending the cleaning assembly, a rotating brush moves counter clockwise. Thus, the rotating brush moves counter to the direction in which it would rotate freely simply by contacting the build surface.

The rate at which the brush assembly is extended and retracted across the surface of the build may vary within certain limits, although a faster rate generally improves cycle time while a slower rate provides more cleaning. A suitable combination of sweeps and rates is from about 1 to 5 sweeps at from about 1 to 9 inches per second.

Brush penetration, which is the amount of interference between the tips of the bristles and the build surface, also contributes to removing excess uncured build material from the build surface. Higher penetration is more effective, but too much can damage delicate build surfaces. The embodiments illustrated contemplate about 0.080 inch of penetration.

It should be noted that the parameters discussed above vary somewhat depending on the stage of the build. For example, when building supports, clean side (vertical) walls are not as important and the brush can be applied more slowly to sop up large amounts of uncured material from the horizontal surfaces. A rotating brush can be rotated in the same direction and at the same speed as it freely would rotate.

To clear the brush of build material inside the cartridge, the faster the better. The material removal rate increases with the square of the rpm. Three thousand rpm clears a 1.5 inch brush and 5,000 rpm will clear the same brush faster. A smaller brush typically will require somewhat higher rpm, and speeds above 6,000 rpm can be achieved provided the mechanical rotational apparatus is sufficient. If there is a large amount of excess material to be cleared from the brush, then the brush is retracted into the cartridge and cleared between sweeps. If there is only a small amount of material, then the sweeps can be completed for a cleaning cycle and the brush retracted and cleared at that time while a UV lamp exposure takes place.

Figure 48:
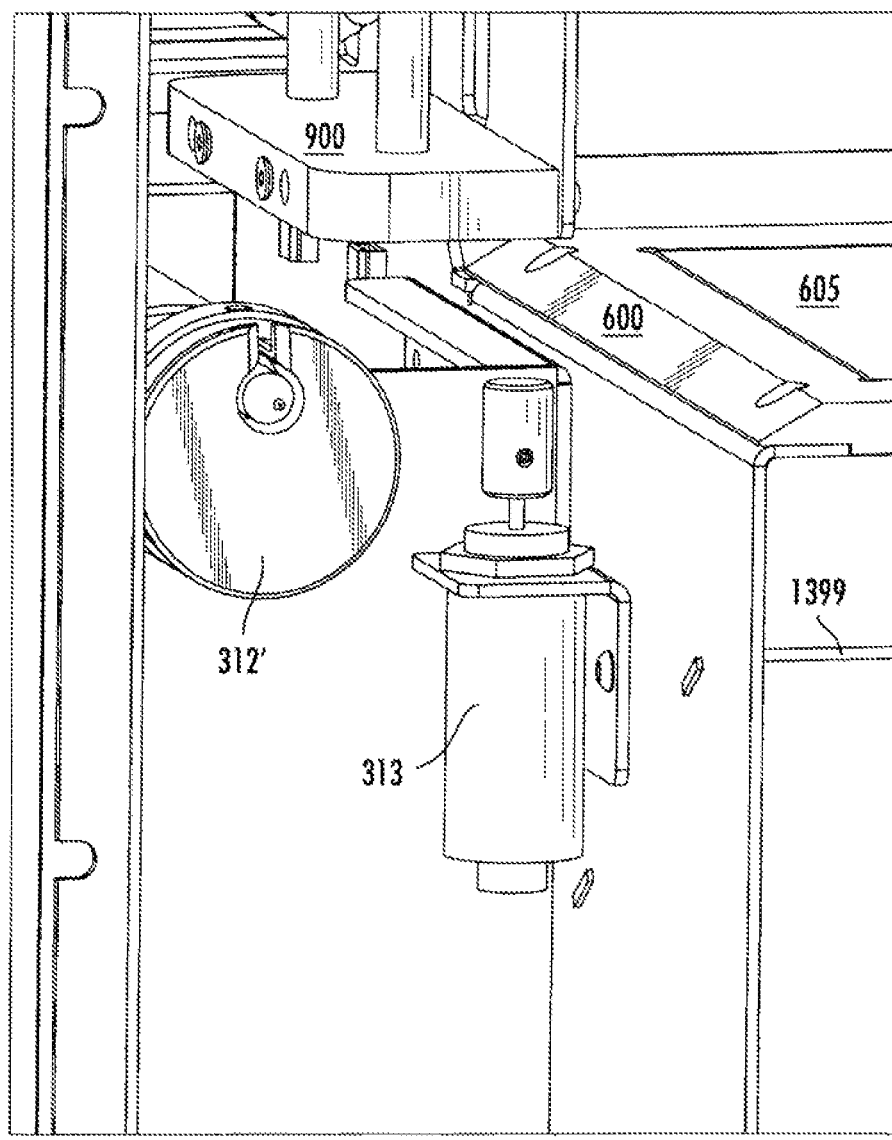
FIG. 48 is a partial perspective of a portion of the apparatus of the invention associated with the embodiments of FIGS. 3 and 47.

FIGS. 47 and 48 illustrate an alternative arrangement in which no separate cleaning assembly is provided on the transport film and the transport film itself is used for intra-layer removal of excess uncured build material. The arrangement illustrated in FIGS. 47 and 48 may be used, for example, with the embodiment of FIG. 3. FIG. 48 illustrates a tractor motor 312' for extending a transport film across the image plane assembly and a solenoid poppet 313 for releasing vacuum and shear forces by which the transport film is held in place on the image plane 605'. The transport film is mounted to a pull strap (not shown) instead of cleaning assembly 300 (FIG. 2) and the pull strap is secured in the tractor motor by the operator when the cartridge is installed. Since the pull strap extends across the image plane when the transport surface is fully retracted into the cartridge, this embodiment may produce builds having artifacts of strap image if the option of a post-curing operation is also selected. The end of the transport film 402' to which a pull strap is connected instead of a cleaning assembly can be viewed in FIG. 47.

In operation, in the embodiment of FIGS. 47 and 48, the transport film is extended by the tractor motor to transport the build material from the cartridge to the image plane. Vacuum is applied to secure the film to the image plane, in a manner described below, and the layer of build material is imaged onto the build surface. The vacuum is released and the solenoid poppet pushes the edge of the film upwardly to assist in releasing the film from the image plane for retraction. The film is retracted into the cartridge, whereupon the cartridge scrapes build material from the film. The film can then be extended multiple times as needed between layers or at various stages of the build process and in the absence of build material for dabbing the build surface to remove excess uncured build material and return the excess build material to the cartridge.

Figure 49:
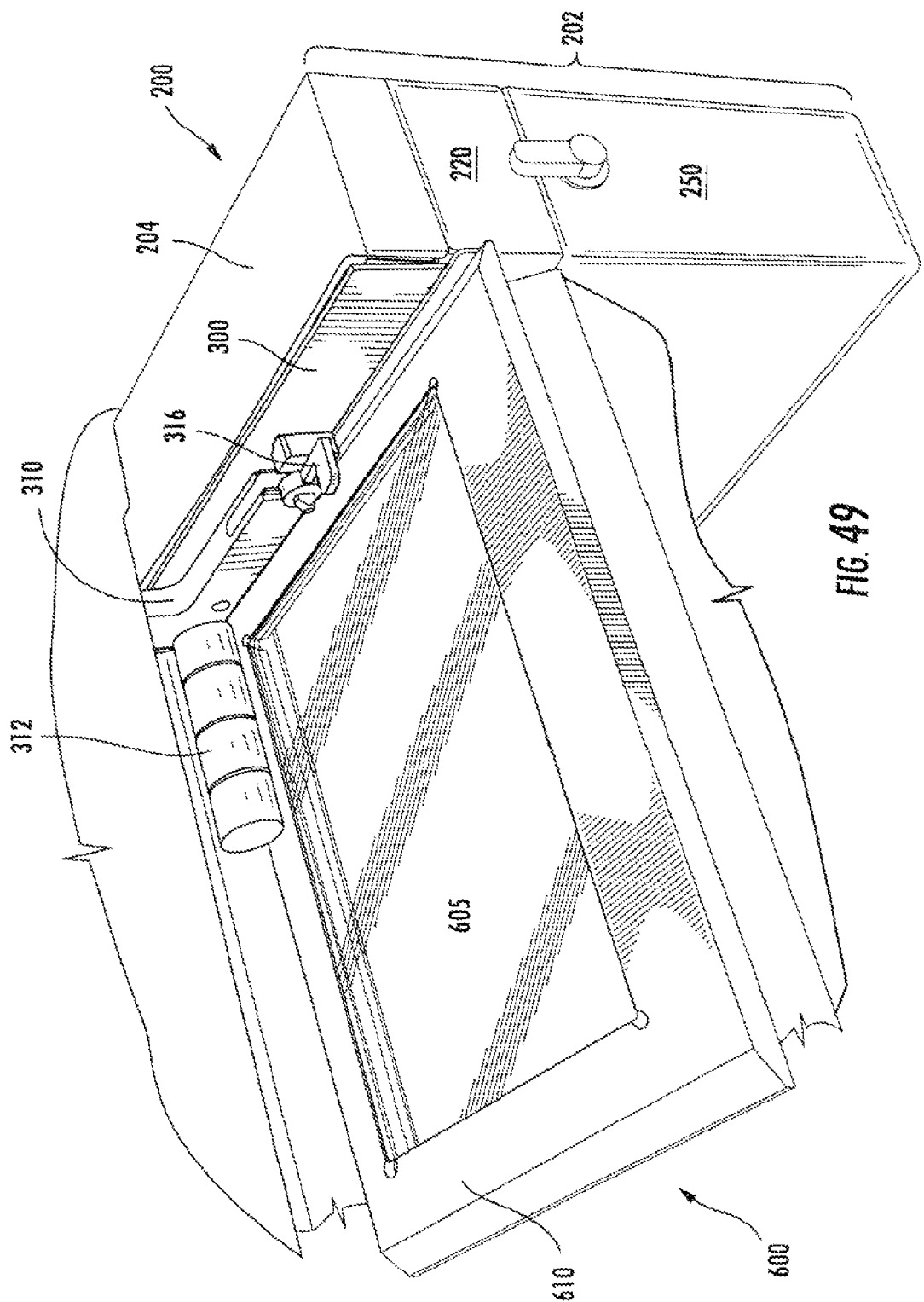
FIG. 49 is an overhead perspective view of an isolated image plane, image plane supporting frame, and cartridge of the apparatus of the invention, taken from FIG. 2, and viewed from the upper left-hand side.

Turning now to a discussion of the image plane assembly and the interaction of the cleaning assembly and transport film with the image plane, FIGS. 49 through 55D provide isolated views directed to these features. FIG. 49 provides an overhead perspective view from the upper left-hand side of an image plane assembly of the invention generally at 600 and a cartridge generally at 200. The cartridge assembly 200 includes a housing 202 having a lid 204, an upper section 220 and a lower section 250. The image plane assembly 600 includes an image plane 605 and a frame 610 for containing and supporting the image plane. Radiation-transparent glass typically constitutes the image plane. The image plane can be prepared from any material sufficiently strong and transmissive to the selected solid imaging and curing radiation to enable the apparatus to operate for its intended purpose, including various plastics.

Also illustrated in FIG. 49 is a motorized arm 310 for withdrawing the intra-layer cleaning assembly 300 from the cartridge. It should be recognized that this cleaning assembly is not present in the embodiment of FIG. 3, and that a pull strap would be used to attach to a tractor motor for this purpose, as described in connection with FIGS. 47 and 48 above.

Motorized arm 310 has a roller brush or linear brush motor 312 mounted thereto and in contact with the brush (not shown in this view) forming part of the intra-layer cleaning assembly 300. Motorized arm 310 also mounts a mechanical lever arm 316 by which the intra-layer cleaning assembly 300 is mounted to the motorized arm.

Figure 49A:
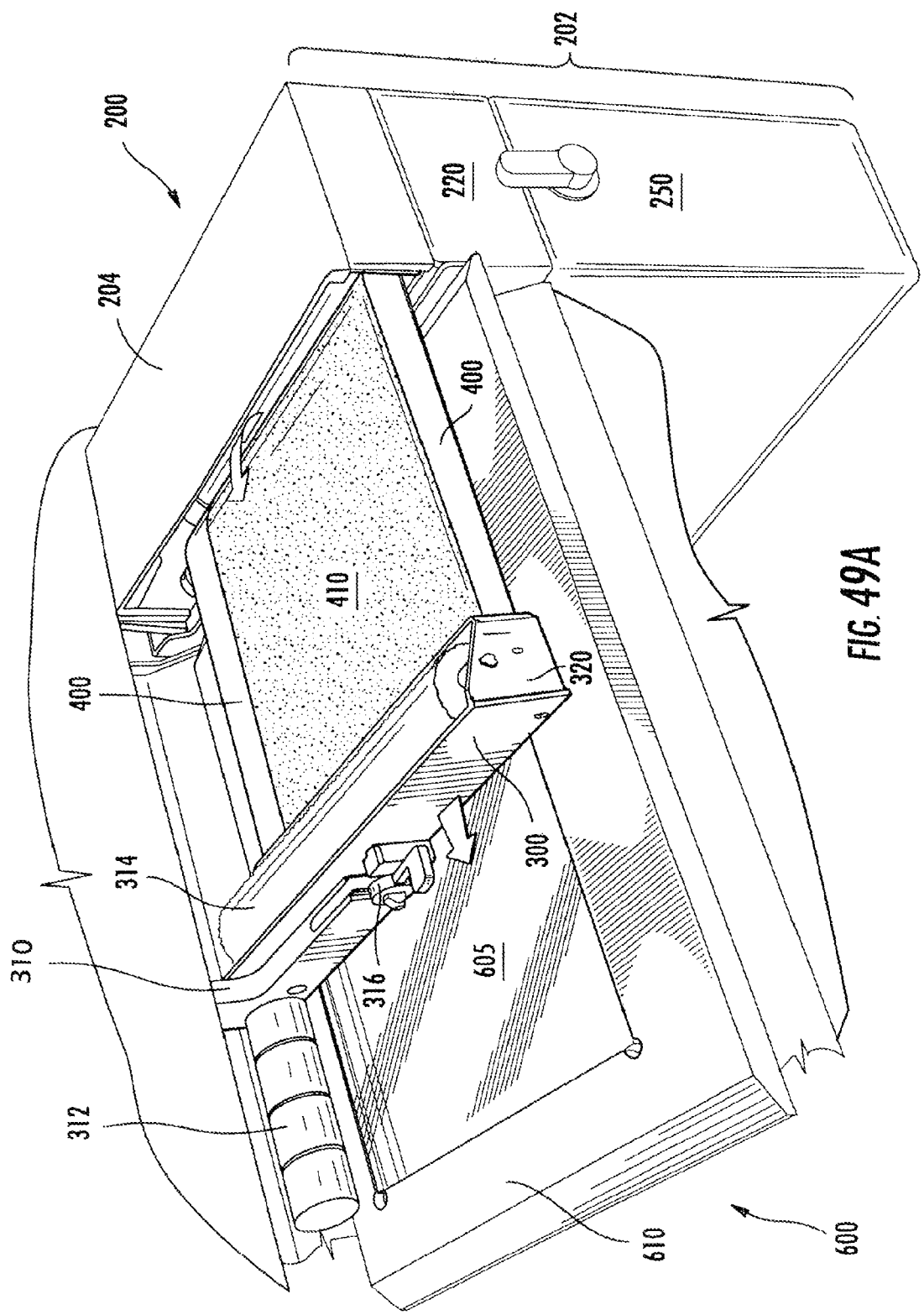
FIG. 49A is a view similar to that of FIG. 49, illustrating in addition extending the intra-layer cleaning assembly and the attached transport film coated with build material.

FIG. 49A is a view similar to that of FIG. 49 and illustrates the motorized arm 310 extending the intra-layer cleaning assembly 300 and attached film 400, coated with build material 410, from the cartridge 200 and across the image plane 605. The intra-layer cleaning assembly in this embodiment included a generally rectangular and open housing 320 having three sides, the left-hand side of which is secured by mechanical arm 316 to motorized arm 310. Housing 320 contains a rotatable roller brush 314 in brush-spinning contact with roller-brush spinning motor 312. Brush 314 contacts a build after a layer of build material has been cured thereon to remove the excess uncured build material by spinning contact with the excess, which is uncured material that may remain on the build surface after illumination and UV curing and potentially interfere with the build's precision.

The roller brush housing 320 mounts opposite the mechanical lever arm 316 a transport surface for build material, which is a radiation transparent flexible film 400. FIG. 49A illustrates film 400 having build material applied thereto on the upwardly facing surface opposite the image plane 605.

The alternately extendable and retractable transport surface 400 is a flexible film typically composed of one or more fluoropolymer resins, such as poly(propylene), poly(carbonate), fluorinated ethylene propylene, and mixtures and co-polymers thereof. Polytetrafluoroethylene (PTFE) films including Teflon brand films are useful, in part because they release hardened resin well to the build surface. Typically, the film is non-elastic. Regardless of the material used, the alternately extendable and retractable surface should be at least somewhat transparent such that it transmits sufficient radiation for solid imaging. As used herein, the term "transparent" as used in this context means any suitable material that allows the passage of sufficient radiation (such as UV or visible light) to pass through to effect the photopolymerization reaction that solidifies the build material. Because these transparent materials may be very thin, the term also includes translucent or partially transparent materials.

The build material 410 can be any of a number of suitable compound materials for solid imaging, commonly referred to as "resins," with the primary requirement being that the build material is flowable. The build material must be capable of being pumped from the lower section 250 of the cartridge assembly 200 for application to the film 400 surface in a layer of suitable thickness. The build material must be solidified upon exposure to solid imaging radiation of a preselected wavelength, should have good adherence to the build object and ready release from the transport film when solidified. The build material contains both UV and visible light radiation photoinitiators so that it cures upon exposure to both forms of radiation, predominately being cured in its initial liquid state by visible light radiation and in the green state thereafter predominately being cured by UV radiation. Suitable resins for use as build materials in the practice of the invention include those described in U.S. patent application Ser. No. 11/096,739 filed Apr. 1, 2005 and entitled "Radiation Curable Compositions Useful In Image Projection Systems," the contents of which are incorporated herein by reference in their entirety.

Figure 49B:
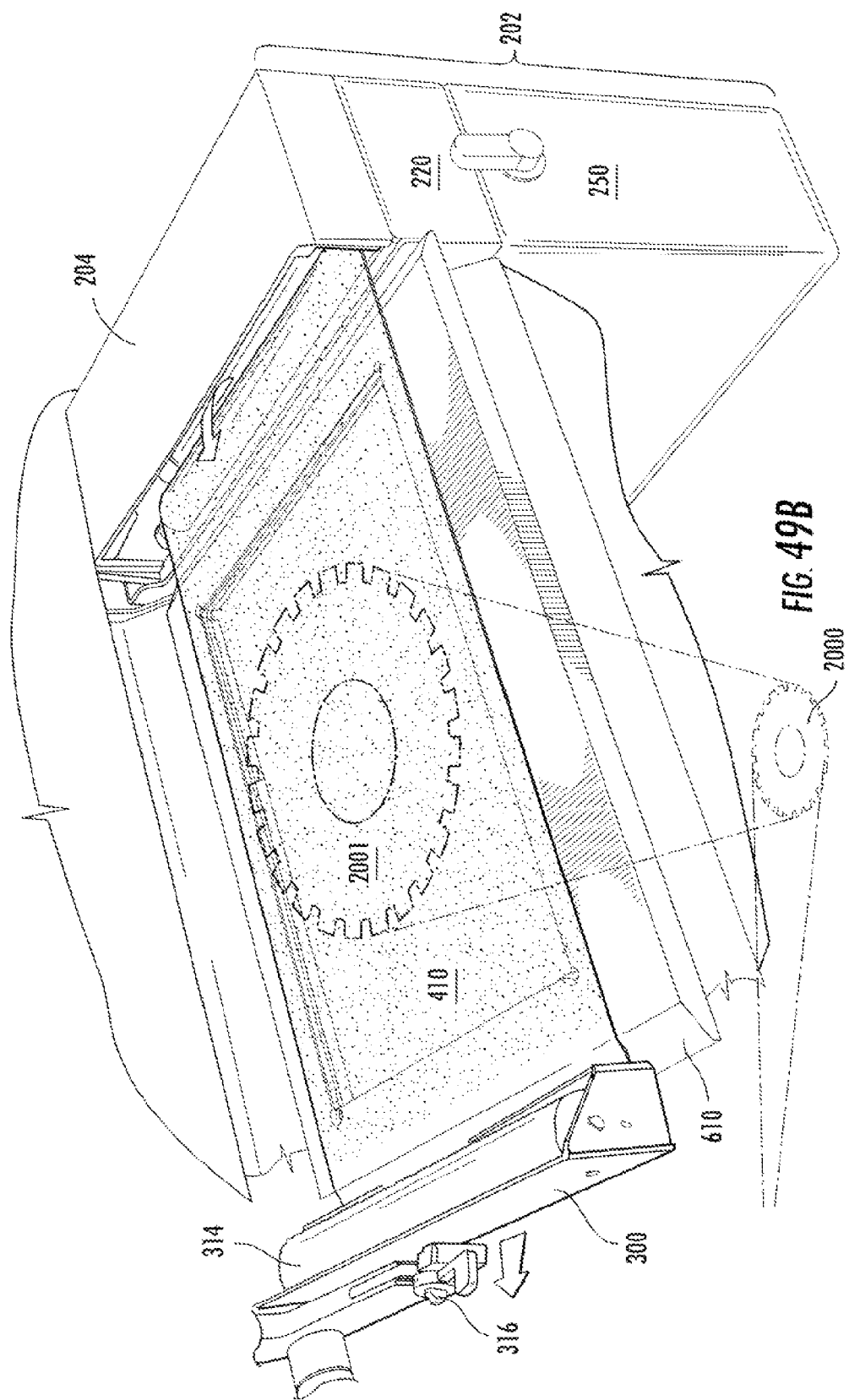
FIG. 49B is a view similar to that of FIGS. 49 and 49A, illustrating in addition the fully extended intra-layer cleaning assembly, fully extended coated transport film, and imaging from the underside of a layer of build material on the film.

FIG. 49B is a view similar to that of FIG. 49A and illustrates the intra-layer cleaning assembly 300 and attached build material transport film, coated with build material, fully extended from the cartridge housing 202 across the image plane 605 (FIG. 49), which is obscured by the build material 410 in this view. A two-dimensional image of a layer of a gear wheel 2000 is received from an imager and reflected upwardly through the image plane 605, through the transport film 400 (FIG. 49), and to the build material layer 410 on the upper surface of the transport film. The image cures the build material in the shape 2001 of the two dimensional image onto the wetted surface of the build.

FIG. 49C adds the build platform assembly 700 with a build 2002 mounted thereto to the view of FIG. 49B. The build platform assembly 700 lowers the build in the direction indicated by the arrows into contact with the build material layer 410 on the transport surface 400. When the image 2001 is irradiated in the fresh build material, the image is cured on the build surface, thereby adding another layer and building eventually a three-dimensional object.

Figure 49D:
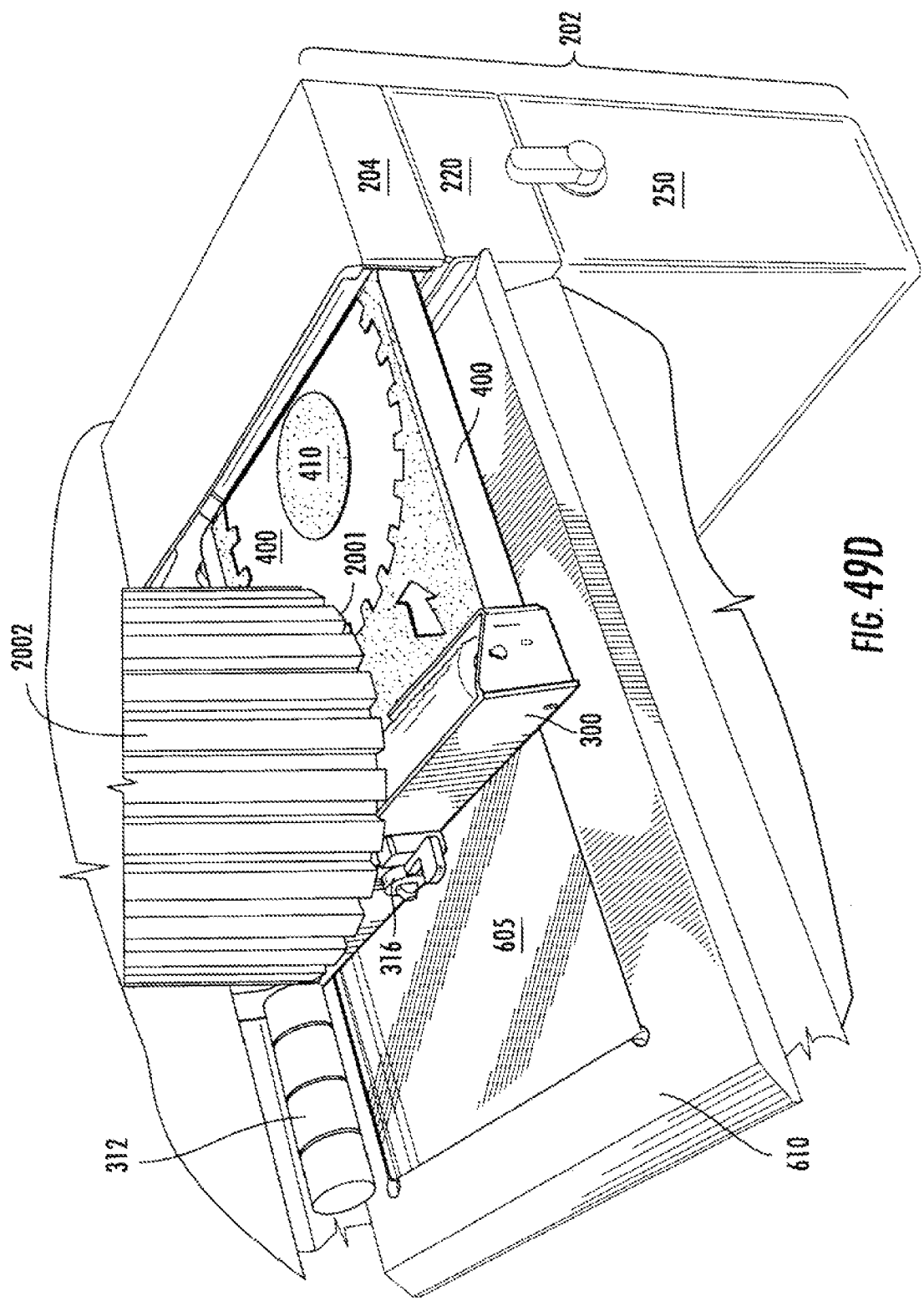
FIG. 49D is a perspective view similar to that of FIG. 5, illustrating retracting the transport film and intra-layer cleaning assembly into the cartridge after imaging of the build material layer on the transport film.

FIG. 49D illustrates the build 2002 raised out of contact with the transport surface 400, the image 2001 having been cured onto the build surface from the area of the film 400 containing build material in that image, and retraction of the transport surface 400 and excess uncured build material 410 along with the intra-layer cleaning assembly 300. The computer-controlled build platform (FIG. 49C) raises the build to a level of about one inch for contact of the image surface 2001 with the roller brush 314. Motor 312 spins the brush in contact with the build 2002 at the image surface 2001 to remove any uncured build material.

Figure 50:
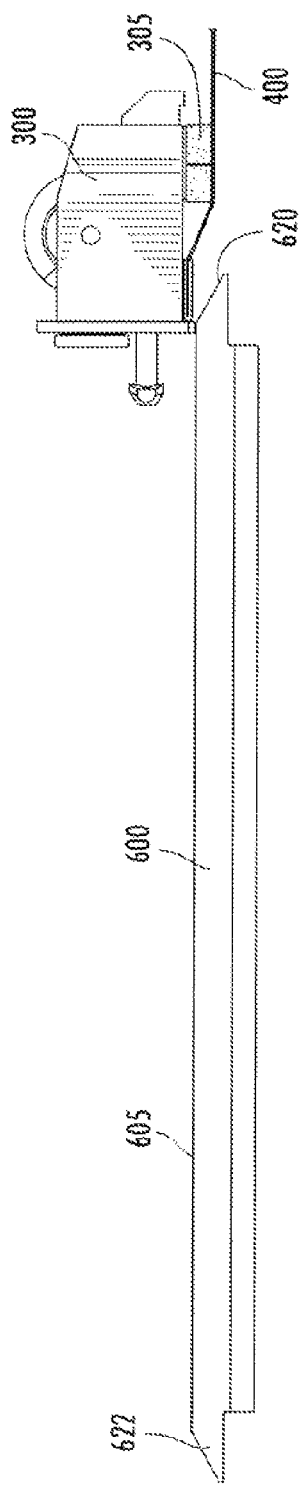
FIGS. 50, 50A, and 50B are front plan sequence views of the image plane, image plane support frame, transport film, and intra-layer cleaning assembly illustrating extension from the cartridge and over the image plane.
Figure 50A:
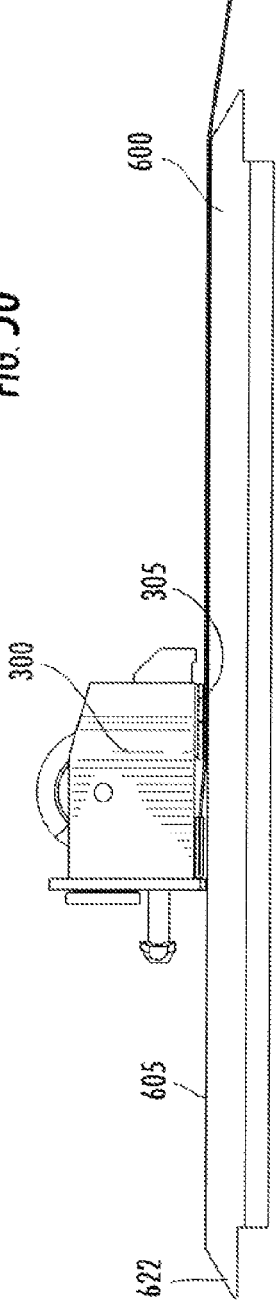
Figure 50B:
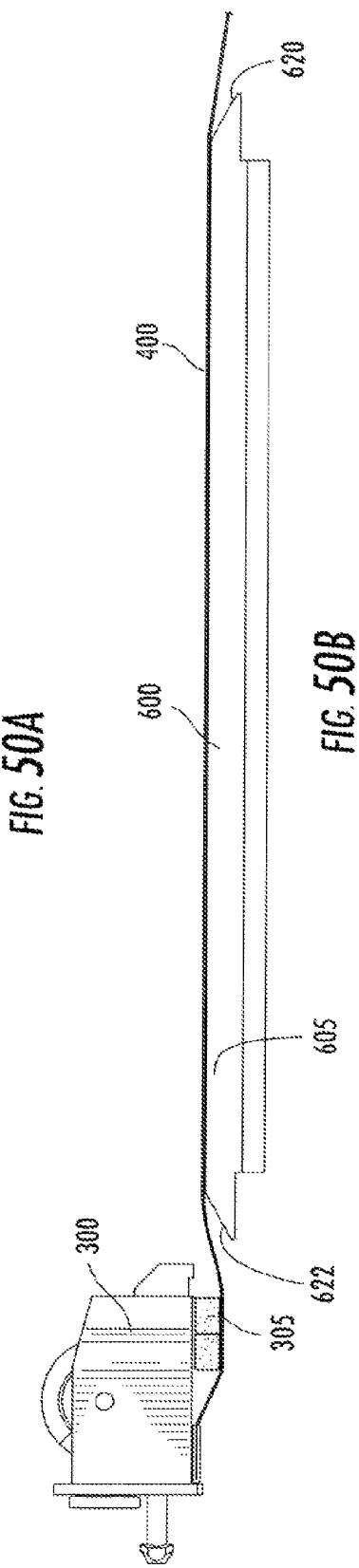

FIGS. 50, 50A, and 50B are sequence views illustrating travel of the intra-layer cleaning assembly 300 and transport film 400 from their origin in the cartridge (FIG. 50) over the image plane assembly 600 (FIG. 50B) and to the opposite end to suspend the film over the image plane (FIG. 50C). It should be noted that the opposite ends of the image plane frame 610 (FIG. 49) are angled to form downwardly sloping surfaces 620 and 622 (FIGS. 50, 50A, and 50C).

Intra-layer cleaning assembly 300 has resilient foam blocks 305 placed between its lower surface and the film as illustrated so that when extended to encounter the image plane frame, the foam engages the angled surface 620 and compresses upwardly to press the film against the image plane 605. After full extension over the image plane, the foam blocks expand over the sloped surface 622 to push the film down slightly below the surface of the image plane, traveling downwardly on slope 622. The effect is analogous to that of tightening a drum head and, along with application of vacuum to the film as described below, ensures a secure fit of the transport film to the image plane.

The motorized arm 310 (FIG. 49) for the cleaning assembly 300 is driven by a motor 309 (FIG. 2). Motor 309 is a DC planetary gear motor that can withstand relatively large torque in drive and reverse without slowing down. The motor drives a reciprocating carriage for the arm 310 mounted on guides extending across the length of the image plane frame (not shown). At the end of travel, when the film and intra-layer cleaning assembly are situated over the left-most downwardly sloped edge of the image plane support frame, the motor releases the arm for application of vacuum and for a tight fit.

The motor 309 does not retract the film and cleaning assembly, which is accomplished instead by a retracting contact roller 230 in the cartridge (FIG. 23) and a retractor motor 524 on the cartridge frame (FIG. 2). Nevertheless a small electromotive force applied by the motor 309 on retraction assists in overcoming friction forces resisting retraction.

FIGS. 51 and 52 are sequence views similar to FIGS. 50B and 50A, respectively, and illustrate the build platform assembly 700 and build 2002 lowered into position on the fully extended and coated transport film 400 for irradiation (FIG. 49C) and then raised for intra-layer cleaning and retraction and recoating of the transport film (FIG. 49D). The build platform assembly includes a removable and replaceable build pad 710 with a plurality of discrete discontinuous raised surfaces 715 for build supports for securing a build 2002 and a build platform supporting and securing frame 750 for securing the build platform, discussed in more detail below. Independently operated elevator brackets 901, 1001 are attached to elevator assemblies 900, 1000 (FIG. 2), respectively, for raising and lowering the build platform. Again, but for the absence of the cleaning assembly 300 and features related thereto, the features of the embodiment of FIG. 3, including the build platform, pad, and elevators can be substantially similar in certain embodiments.

Figure 53:
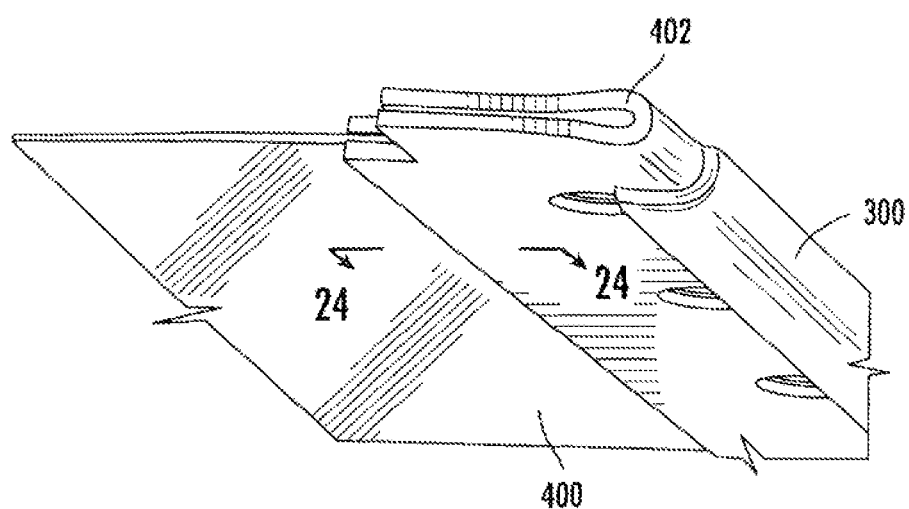
FIG. 53 is a partial perspective view illustrating one end of the transport film mounted in a bracket.
Figure 54:
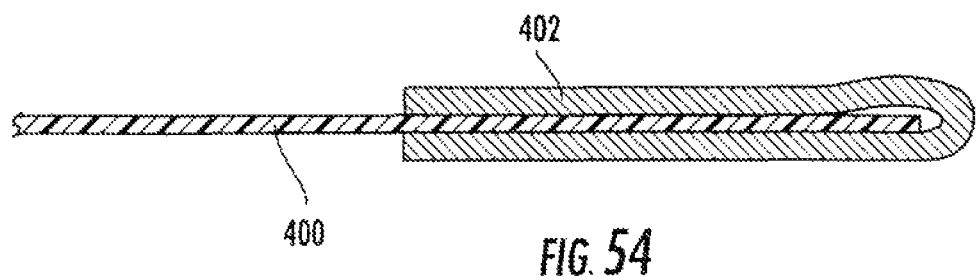
FIG. 54 is a sectional plan view taken along line 54-54 of FIG. 53.

FIGS. 53 and 54 illustrate one embodiment of the attachment of the transport film 400 to the intra-layer cleaning assembly 300. The film is inserted into a thin sheet-metal clamp fitting 402 by which the film is attached to the intra-layer cleaning assembly. The clamp fitting may be bent downwardly adjacent the film portion extending from the clip to push the film into contact with the image plane, if desired, to reduce the possibility of air entrainment between the film and plane. This bend should be unnecessary with the embodiment illustrated in FIGS. 50 through 50B since the resilient members 305 serve this purpose.

Figure 55:
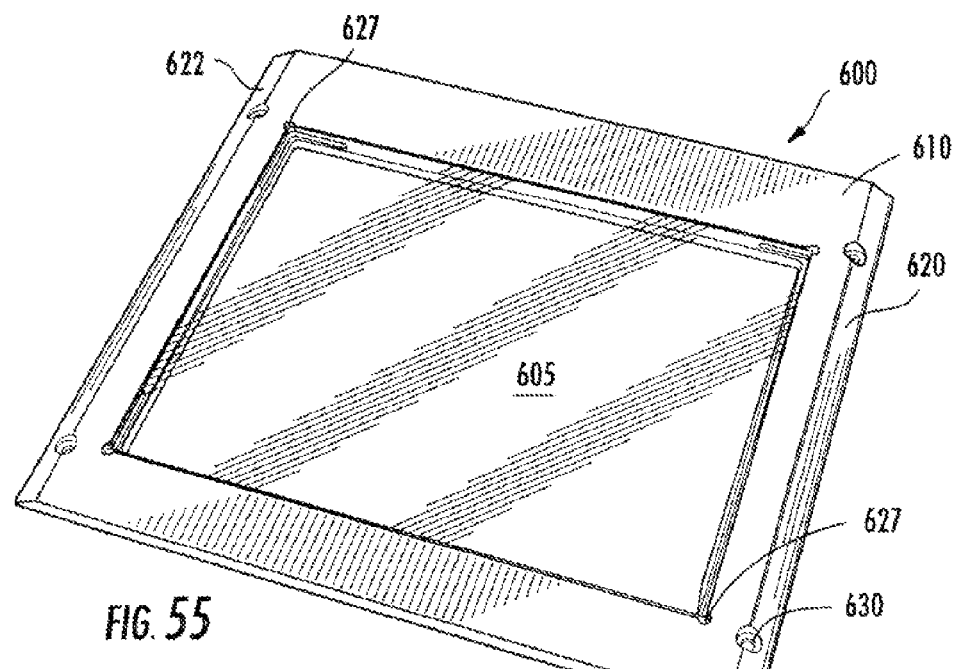
FIG. 55 is an overhead right-hand front-perspective view of the image plane and image plane supporting frame.
Figure 55A:
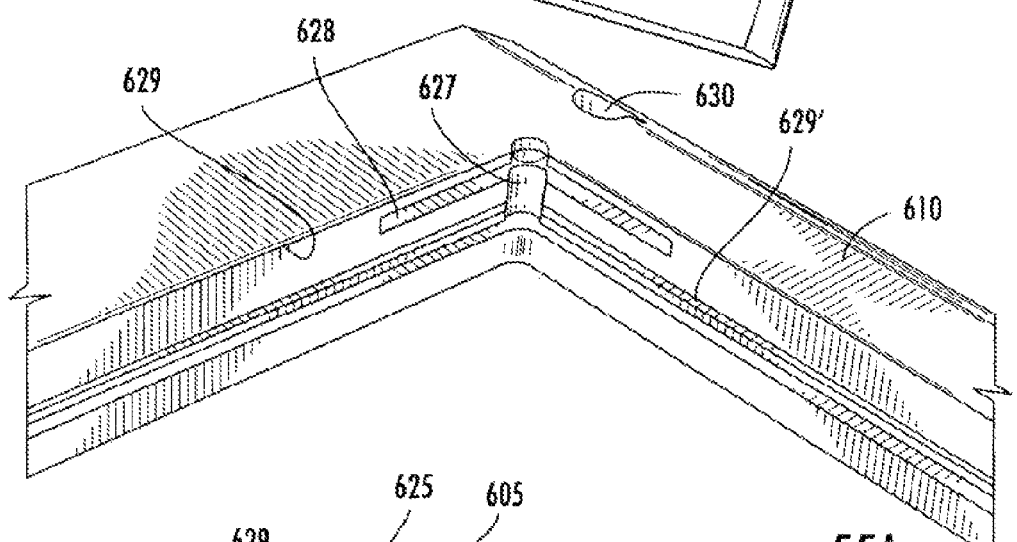
FIG. 55A is a partial overhead perspective view of one corner of the image plane supporting frame illustrating a vacuum channel.
Figure 55B:
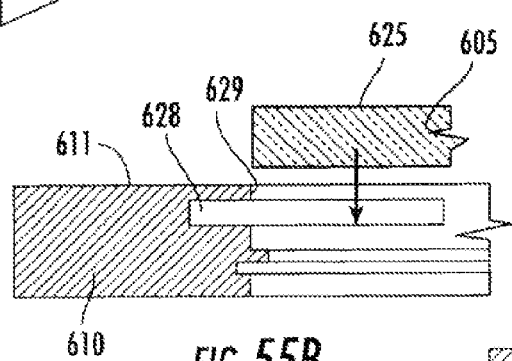
FIGS. 55B and 55C are schematic and sectional partial-plan sequence views illustrating placement of the radiation transparent image plane in the supporting frame for the image plane.
Figure 55C:
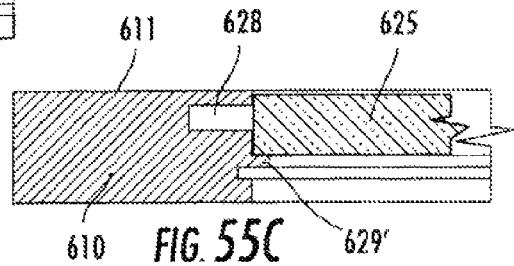
Figure 55D:
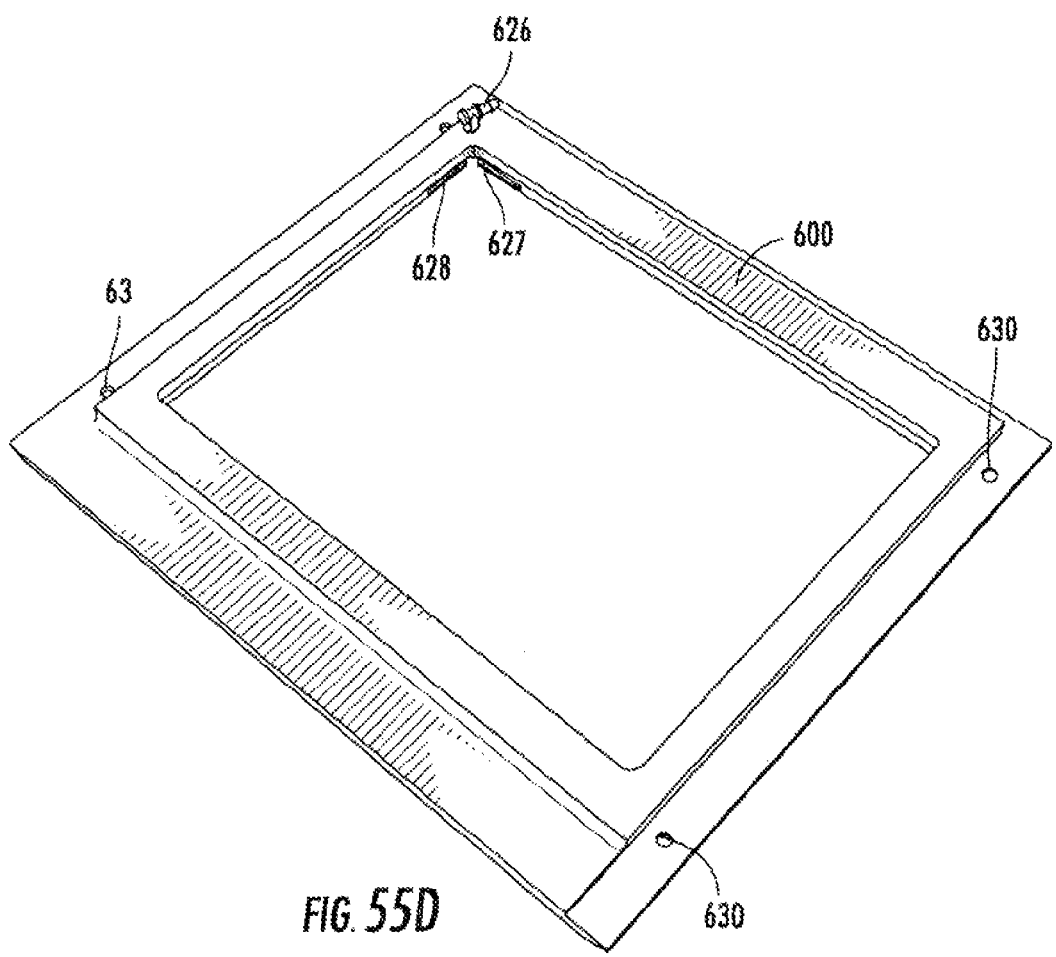
FIG. 55D is a partial right-hand perspective view from underneath and from the front of the apparatus as illustrated in FIG. 2, illustrating mounting of one end of the transport film in a bracket and attachment to the intra-layer cleaning assembly of the invention.

The image plane assembly 600 (FIGS. 2 and 3) is more fully illustrated in FIGS. 55 through 55D for the purpose of showing application of vacuum to the transport film (not shown in these views). FIG. 55 shows the image plane 605 seated in frame 610 with orifices 630 for mounting the image plane. Frame 610 provides channels 627 at each interior corner for clearance of the image plane corners. Channels 628 provide for application of vacuum to the top surface 625 of the image plane (FIGS. 55A, 55B, and 55C) to eliminate air and to retain the transport film in place during imaging and when lifting the imaged build off the transport surface. There is a small gap between the upper surface 611 of the vertical wall 629 of the image plane frame and the upper surface 625 of the image plane 605 for a vacuum path.

FIGS. 55A through 55C illustrate the vacuum channel in more detail in cutaway perspective (FIG. 55A) and in cross section (FIGS. 55B and 55C), showing channels 628 cut into the wall 629 against which the image plane is placed. A horizontally extended edge 629' supports the image plane so that the plane does not block the vacuum path between it and wall 629. The edge 629' supports the image plane to create a small offset gap between the top of the image plane 625 and the top of the frame 611 of from about 0.001 to 0.005 inch so that vacuum drawn through orifice 626 (FIG. 55D) runs through the channels 628 and under the transport film to draw the transport film down into the gap between top of the image plane and the top of the frame. Too large a gap and the film will warp at the edges creating a leak path between the film edges and the frame and reducing the vacuum. Too small a gap and the film may not adhere sufficiently to the image plane when the build is lifted.

Drawing a vacuum assist on the film removes air that otherwise might be trapped between the transport surface and the planar sheet so that the transport surface and the build material layer on the transport surface are as flat as possible. Drawing a vacuum assist also secures the transport surface to the planar sheet during imaging and when the build lifts off the transport film surface. Thereafter, the vacuum can be released so that the transfer surface can overcome the shear forces at the plane for retraction, either by using the solenoid poppet of FIG. 48 in the embodiment of FIG. 3 or retraction of the cleaning assembly 300 (FIG. 2).

Nipple 626 located on the underside of the image plane support frame (FIG. 55D) provides a point of connection to the vacuum channel 628 for a conduit to a suitable vacuum pump, neither of which conduit and pump is illustrated. Typically the vacuum pump will be located in an electrical housing mounted to the modeler, also not shown. The vacuum can be released simply by providing a vacuum bleed, although it may be desirable to take additional steps to overcome the shear forces that may develop between the film and the rigid planar sheet at the image plane. Positive airflow may be provided by reversing the vacuum pump to assist in overcoming shear forces.

Figure 56:
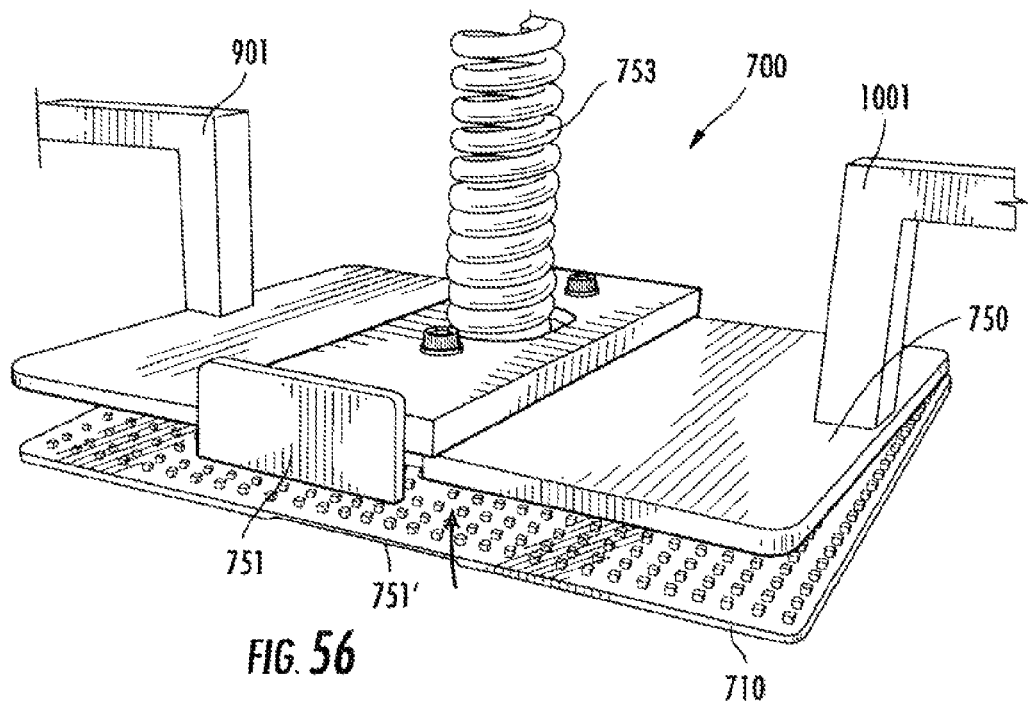
FIG. 56 is a partial perspective view from the right front of the apparatus of FIG. 2 illustrating a build platform being inserted into a build platform assembly, including in addition to the build platform, a supporting frame, a pair of independent elevator brackets, and a vacuum supply for securely attaching the build platform to the assembly.
Figure 57:
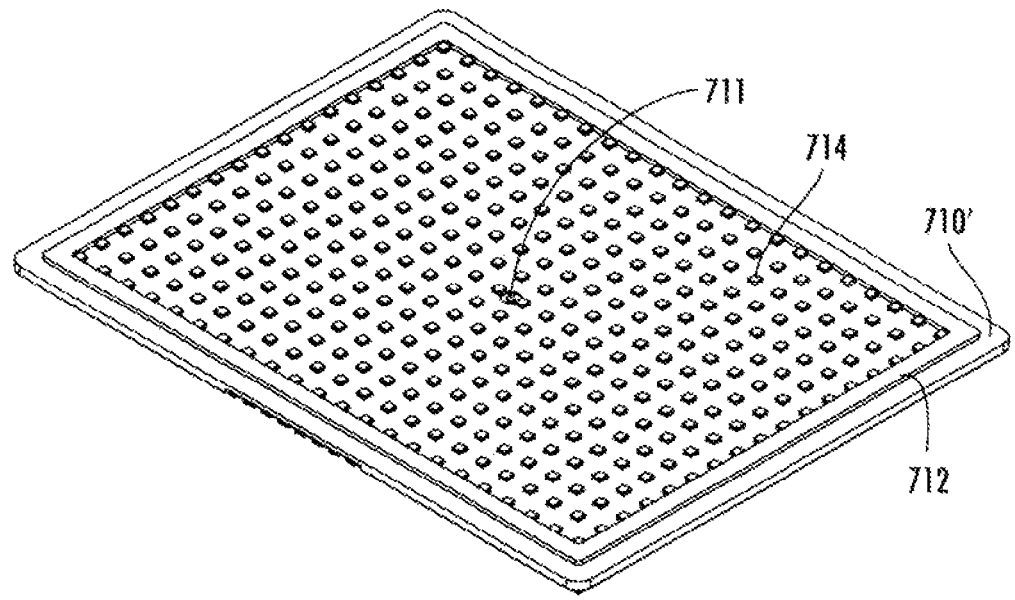
FIGS. 57 and 57A are perspective views of the upper and lower surfaces, respectively, of an alternative embodiment of a build pad of the invention.
Figure 58:
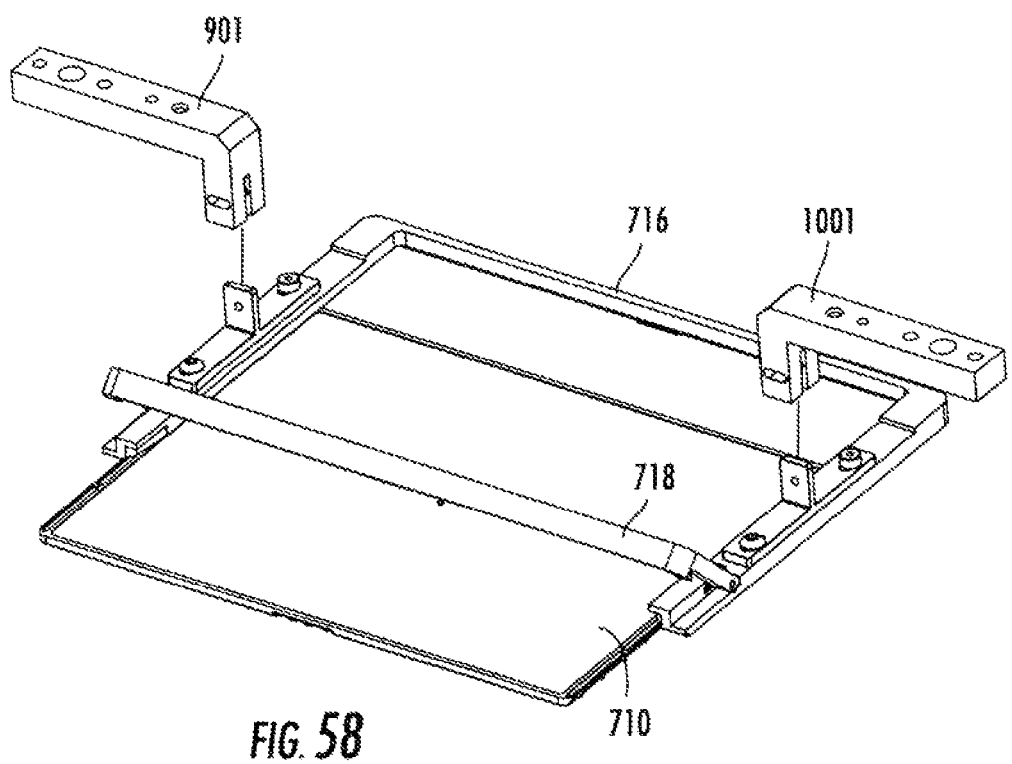
FIG. 58 is a perspective view if an alternative build platform of the invention.

Turning now to the build pad and build pad platform and frame assembly illustrated at 700 in FIGS. 56 through 58, the build pad 710 is a surface to which a build object or part can be attached. The build pad should have a surface that is adherent to initial build support layers. To facilitate the adhesion of the build material supports to the build pad, the build pad may include a plurality of structures 715 extending from the planar surface of the build pad, which define a plurality of discontinuous discrete planar surfaces. In the embodiment of the build pads depicted in FIGS. 56 through 58, these structures extending from the build pad take the form of truncated pyramids having a flat surface parallel to the surface of the build pad, but the structures may be in the shape of the tops of cylinders, rectangles, squares, ellipsoids, or any other shape that can extend from the planar surface of the build pad to provide support to the build part. In the case that the build pad is constructed from injection molded plastic, the structures may be shaped such that they extend from the surface of the build pad at a non-perpendicular angle sufficient for ready release from the injection mold. A glass build pad can be constructed with fully cured imaged structures of any shape providing discontinuous planes for initiating the build. Any arrangement, size, and spacing of shapes may be used so long as the structures provide the necessary support base.

In the illustrated embodiments of FIGS. 56 through 58, the truncated pyramid structures are arranged in a grid pattern, spaced from about 0.140 to about 0.562 inches apart. One useful embodiment has the pyramids spaces 0.281 inches apart. The truncated pyramid structures all extend from the surface of the build pad by a single predetermined distance of about 0.1 inch.

Figure 56A:
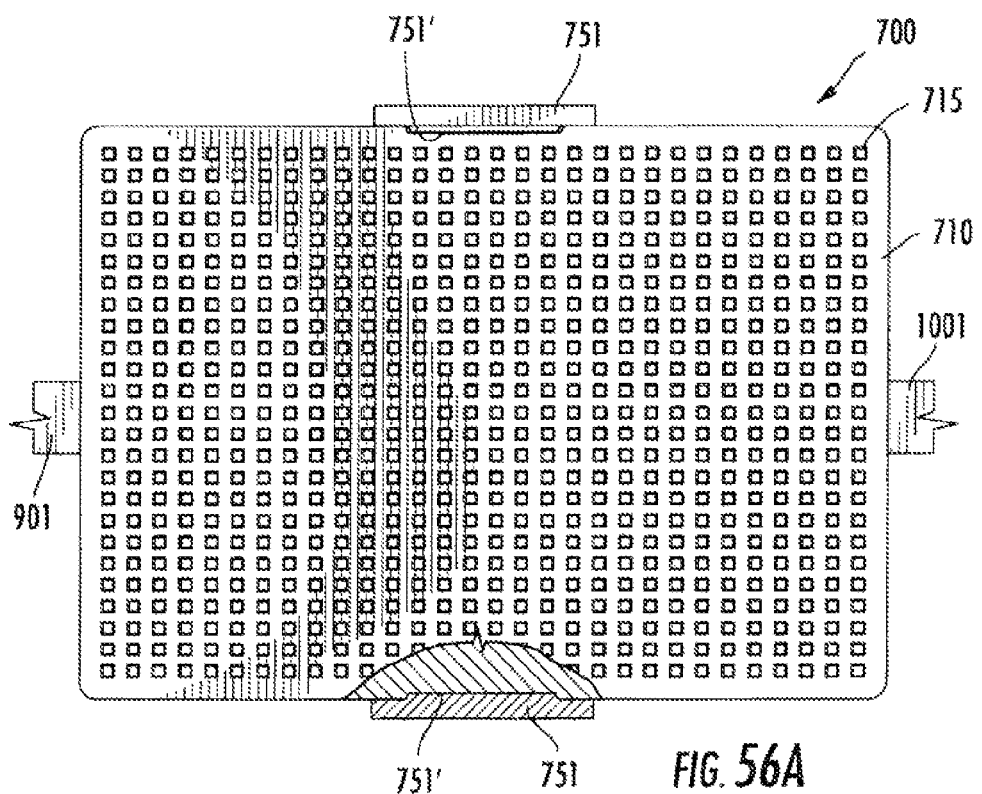
FIG. 56A is a plan view in partial section from the underside of the build platform assembly of FIG. 56 with the build platform inserted illustrating the raised discontinuous structure of the underside of the build platform for supporting a build and a section along line 56A-56A of FIG. 56C illustrating a recess in the build platform into which fits a section of the build platform supporting frame.
Figure 56B:
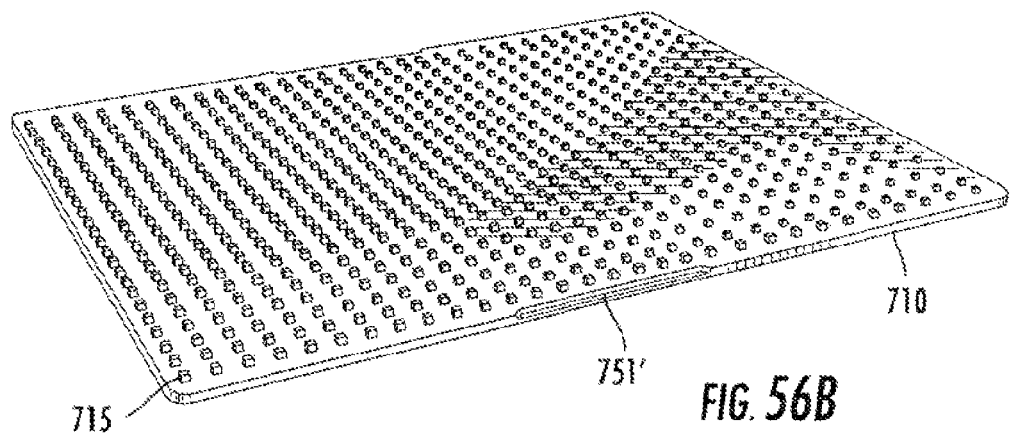
FIG. 56B is a left-hand underside perspective view of the build platform of FIG. 56.
Figure 56C:
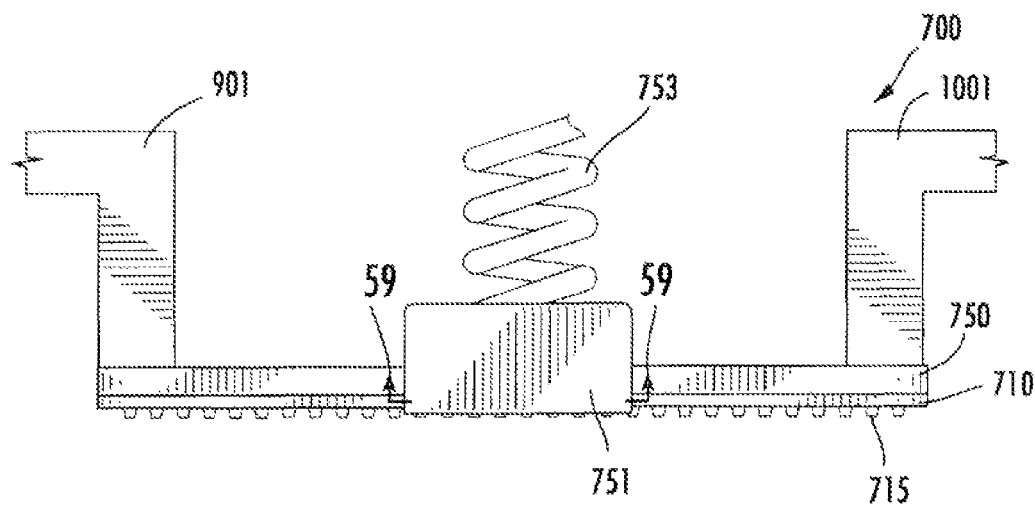
FIG. 56C is a front plan view of build platform assembly of FIG. 56 illustrating the build platform secured to the supporting frame.

In one embodiment (FIGS. 56, 56A, and 56C), the build pad is illustrated as a transparent pad supported in a frame snap attachment 751 mounted on a ground, flat build platform 750 that is attached to elevator brackets 901, 1001, which are attached to a pair of elevator arms 900, 1000, respectively (FIGS. 2 and 3). Cutouts 751' in the build pad (FIG. 56B) provide a point of attachment for the snap attachment 751. FIG. 56A provides a horizontal section through the snap attachments and a portion of the build pad as shown along the arrows in FIG. 56C to illustrate engagement with the cutouts 751'. A vacuum hose 753 (FIGS. 2 and 56) is provided, connected to a vacuum pump in the electrical housing 128 (FIG. 1) for the apparatus, to pull vacuum on the build pad for secure attachment to the build platform.

Figure 57A:
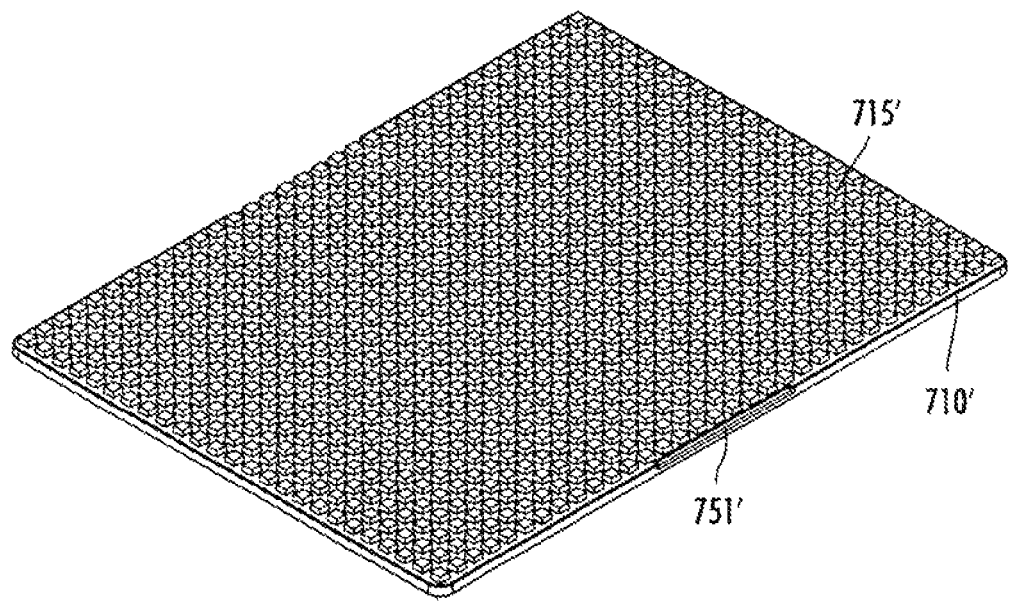

FIGS. 57 through 57A illustrate an alternative build pad that is not transparent and, although having a similar pyramid structure 715' as described above for build supports on the side of the pad facing the build (FIG. 57A), the embodiment of these figures includes on the opposite side a plurality of discrete support structures 714 for engaging the ground, flat build platform (FIG. 56), a vacuum orifice 711, and a foam seal about the periphery for secure vacuum attachment. The support structures 714 are configured to provide support while at the same time allowing vacuum to be pulled evenly about the surface of the pad. The seal compresses to a point level with the top of the support structures on the initial compression stroke of the elevator to which the build platform is attached, as is described below in connection with the elevator, thereby setting the seal.

Yet another alternative to the ground, flat build platform of FIG. 56 is illustrated in FIG. 58. An open frame 716 with a hinged portion 718 is provided for the build pad for removal and replacement of the build pad. A transparent build pad 710 employed in this frame provides for ultraviolet ("UV") cure of the build through the build pad after a layer is imaged. This embodiment is illustrated in FIG. 3 and UV cure is discussed below.

Figure 59:
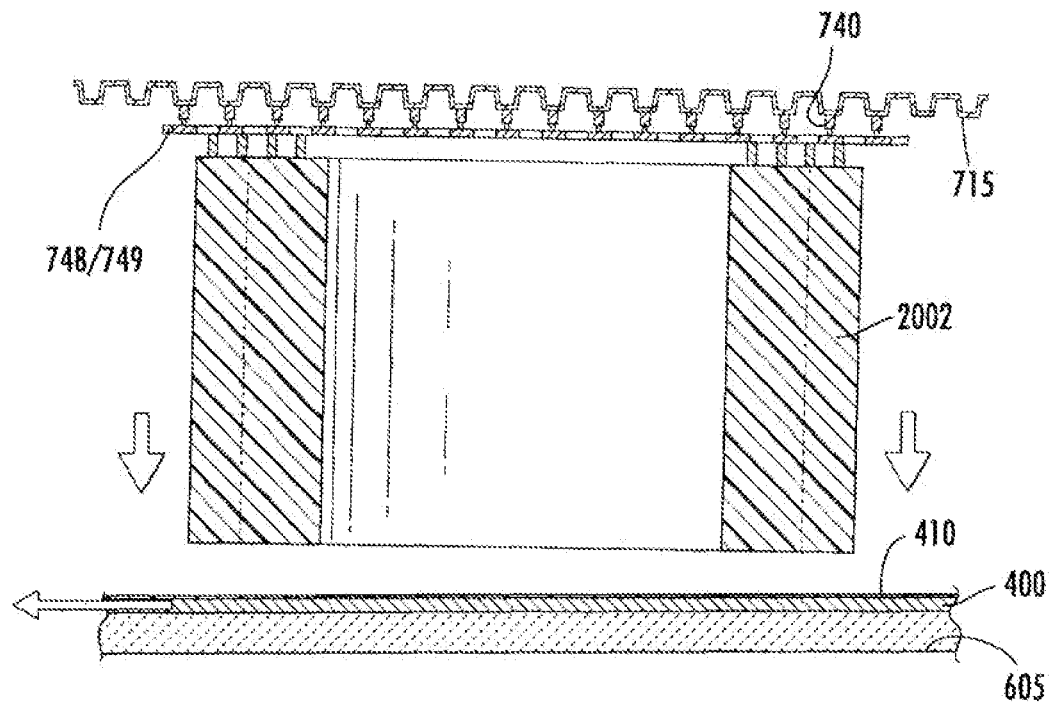
FIG. 59 is a sectional plan view of a build and build platform of the invention as it approaches the image plane.
Figure 60:
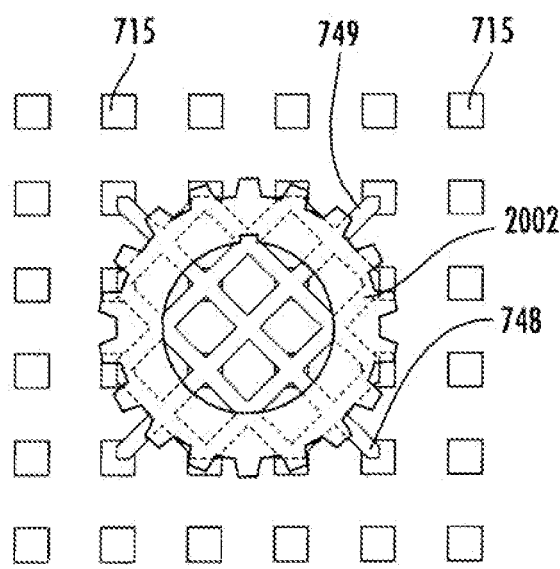
FIG. 60 is a plan view of the build pad and support structure for a build.

FIGS. 59 and 60 illustrate support structures for a build 2002. A series of solidified layers of discrete portions of solid imaging build material 740 (FIG. 59) can be built from these structures 715 (715' in FIG. 57) extending from the build pad, which form the base of the support structure on which the build is produced. From these discrete portions 740 a lattice 748/749 (FIGS. 59 and 60) is constructed by forming a plurality of layers of solidified solid image build material extending as a plurality of longitudinal members across the discrete portions. The longitudinal members include two series of parallel members 748, 749 that intersect to form the lattice separate from and parallel to the build pad. The intersection of the two series of longitudinal members may be at approximately 90° angles, resulting in a square grid.

The grid of the lattice may be built so that it diagonally connects the discrete portions built from the raised structures of the build pad at a 45° angle, which is shown in FIG. 60. The lattice may span the extents of the region to be used for supports for the build part, and may extend several pixels beyond such a region to create a buffer, thereby enabling the supports to firmly adhere to the grid. From the lattice, the supports are constructed as a plurality of layers of solidified solid image build material extending as discrete longitudinal spaced-apart members that are generally perpendicular to the plane of the lattice. A variety of solid imaging resins, the same or different, may be used to construct the lattice and supports extending from the build pad. In addition to separating the build part from the build pad to enable the irradiation of all surfaces of the part, the use of supports further provides structural support during the build for more complex three-dimensional objects. The use of a raised surface on the build pad with a lattice and supports extending from the raised surface enables the secondary or post-cure assemblies to cure all surfaces of the build part tack-free, including those surfaces connected to the build pad.

Turning now to a discussion of the elevator assemblies and their operation, elevator arms 900, 1000 (FIGS. 2 and 3) move the build platform, pad, and thus the build to place the surface of the build into contact with solid imaging build material, a solidifiable photopolymer build material, and after exposure, out of contact with the solidifiable photopolymer build material as successive layers are formed during the building process. To enable the movement of the build platform toward the image plane and away from the image plane, a series of independent z-axis elevator assemblies as depicted in FIGS. 2 and 3 are attached to the build platform by elevator brackets 901, 1001 shown in FIG. 56.

Figure 61:
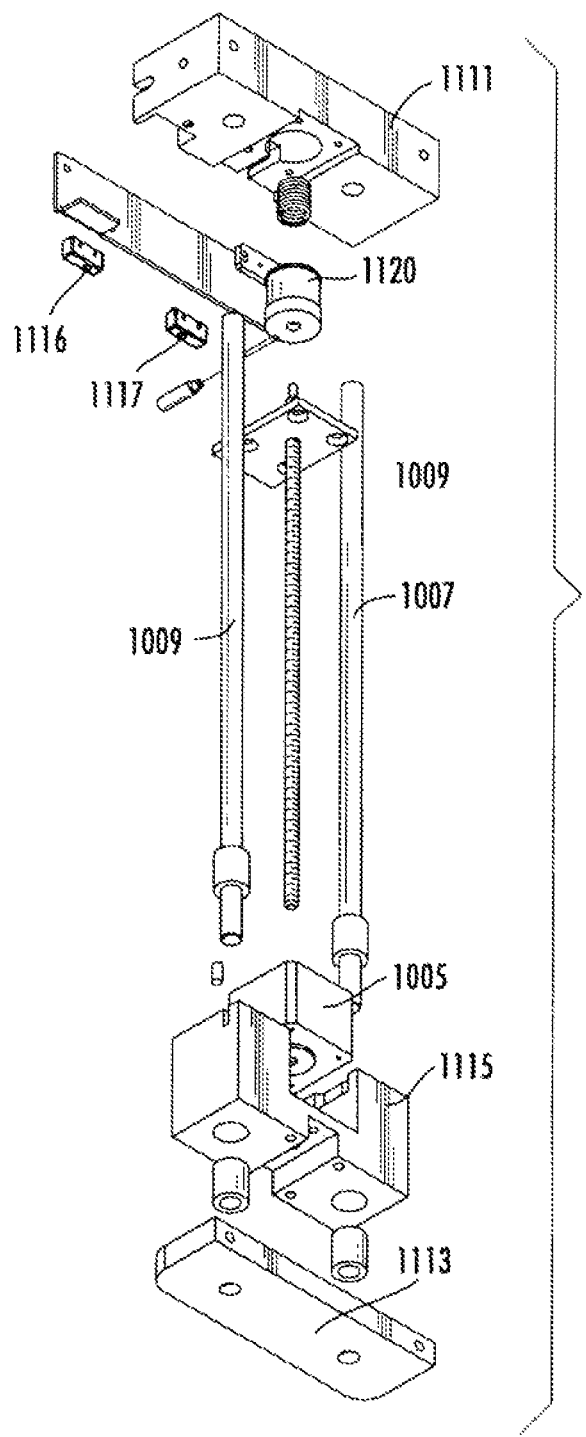
FIG. 61 is an exploded perspective view of an elevator assembly of the invention.

An elevator assembly is illustrated in FIG. 61. Each elevator assembly comprises an independently-operated stepper motor 1005 or DC servo motor working in conjunction with a lead screw 1007 to effect the movement of the attached build platform along the length of the lead screw. Guide shafts 1009 steer the movement of the attached build platform. The guide shafts secure upper and lower mounting blocks 1111, 1113, respectively, installed within the apparatus. The stepper motor is mounted into a stepper motor mounting block 1115 that can travel between the upper and lower mounting blocks along the guide shafts. The lead screw is secured at one end to upper mounting block with the opposite end of the lead screw having an unconnected floating terminus. The build platform may be connected to the elevator assemblies by a pair brackets 901, 1001 (FIG. 56) extending from the steeper motor mounting blocks and attached to the build platform.

Because each elevator assembly moves independently of the other, the position of the build platform must be initialized prior to any build process to ensure that the build platform is parallel to the image plane; otherwise, there may not be uniform spacing between the build pad and the image plane across the entire build pad, which could cause uneven layer thickness. This initialization is accomplished by means of a compression stroke of the elevator assembly. During this compression stroke, the build platform is lowered to the image plane until the build pad makes contact with the image plane. As the build pad is pressed against the image plane, spring-activated plungers 1120 cooperating with a compression switch 1117 secured at the attached end of the lead screw on the upper mounting block of each of the elevator assemblies register the forces applied.

In one embodiment, the plunger activates the compression switch 1117 at a force of about 22 pounds or about 97.86 Newtons. A homing switch 1116 may also be provided adjacent to the compression switch to indicate that a build platform has reached its uppermost position. The compression stroke may further serve to set the vacuum seal described above in connection with FIG. 57 or to detect whether a build pad even is present. The performance of the compression stroke may be monitored, and with at least a close approximation of the relative location of the components, the absence of a build pad could be known if the elevator assembly is able to move the build platform farther than should be possible.

Figure 62:
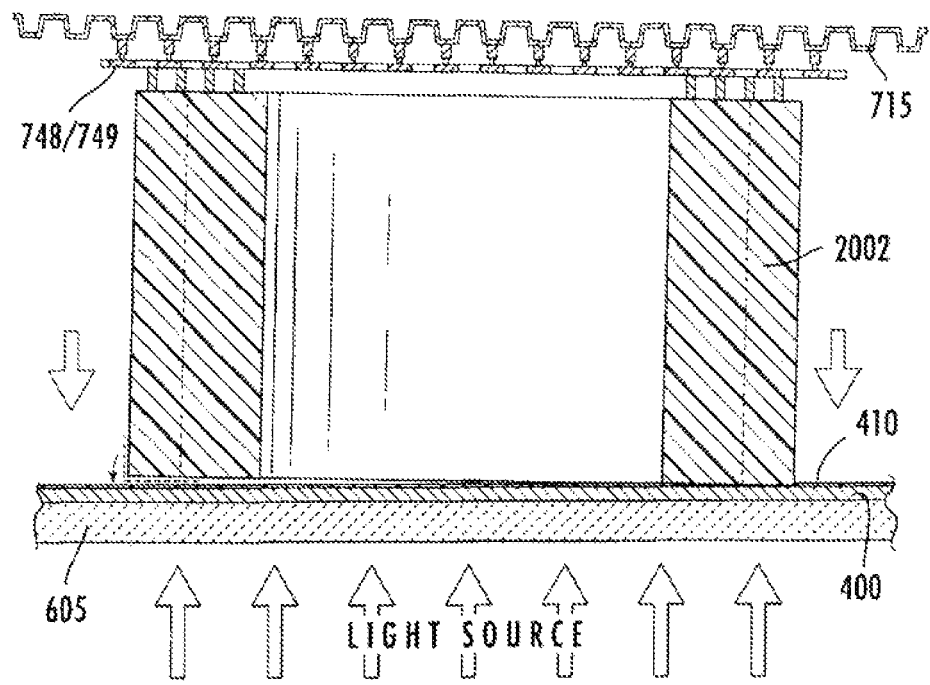
FIGS. 62 and 63 are sectional plan views of a build and build platform of the invention upon entering the image plane and lifted from the image plane, respectively.

After initialization of the platform and pad, the build may progress, starting with the supports. As illustrated in FIG. 62, as the elevator assemblies cause the build surface to approach the layer of imaging material on the film, it is desirable to tilt the build surface so that one end engages the image material before the other. The build may then be brought to level in the image material layer. A down tilt assists in eliminating bubbles or voids between layers of the build material. Thereafter, the fresh layer of build material is imaged with radiation from an imaging light source to solidify the layer onto the build surface, as indicated by the arrows in FIG. 62.

It should be recognized that the down tilt action can start with either the left or right elevator moving down first, and the down tilt can be alternated between the left and right elevators during the build to even out slight differences that may occur between initiating the tilt with one or the other elevator.

Figure 63:
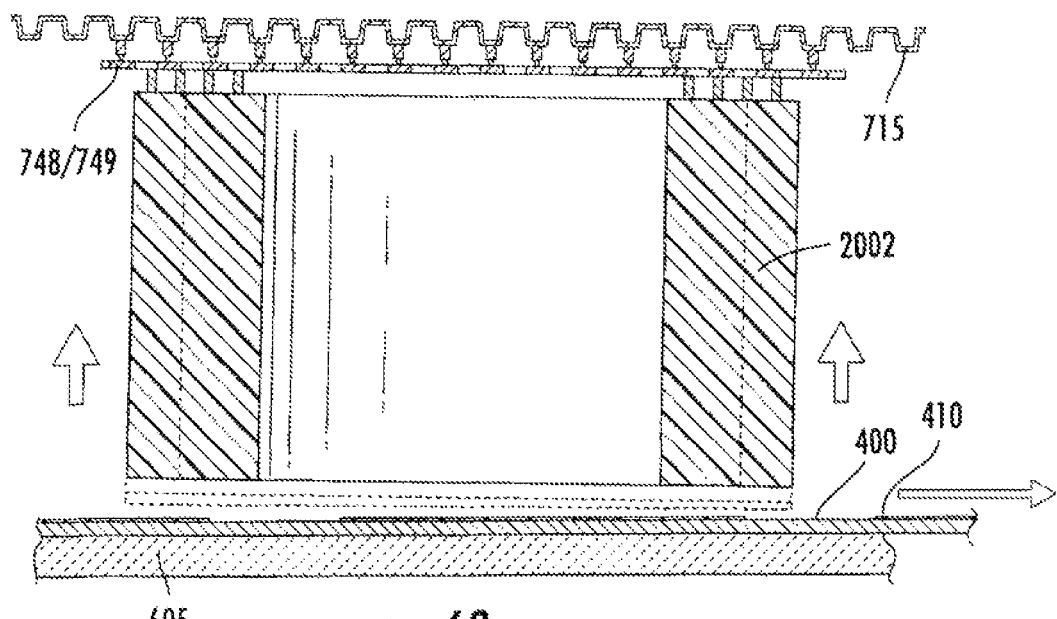

Once the layer of resin is cured by the imager, the build object may be separated from the transport film as illustrated in FIG. 63. The elevator assemblies move the build platform away from the image plane, allowing the film to return to the cartridge in the direction of the arrow to remove and filter any resin remaining on the coating film. An un-coating procedure for removal of excess uncured build material may be initiated, either with the intra-layer coating assembly 300 (FIG. 2) or with the transport surface extended in the absence of build material (FIG. 3). A post-imaging UV cure, described below, may be performed further to harden the resin before re-extending the transport film and recoating the build with another layer added to the build object.

To avoid undue stress on the build part caused by adhesion of the build object to the transport film following the addition of a layer, the elevator assemblies may be used to aid in the separation the build object from the coater film by adding a peeling action. This is especially important for parts with larger cross sections. Just as the elevator assemblies may be operated independently to create a down tilt to eliminate bubbles or voids between layers of the build material, as illustrated in FIG. 62, the elevator assemblies may be operated independently to create an up tilt, as shown in FIG. 63 upon completion of the primary cure, FIG. 62. This up tilt serves to break the attractive force created between the transport film and build material, thus reducing the force needed to separate the build part from the shade and reducing the chance of stressing or breaking features of the build. The up-tilt step may include a horizontal displacement of the build platform to avoid distortion, bending, or tearing of build features as a result of the non-synchronous movement of the independent elevator assemblies.

The up tilt action can start with either the left or right elevator moving up first, and the up tilt can be alternated between the left and right elevators during the build to even out slight differences that may occur between initiating the tilt with one or the other elevator.

By moving the build platform laterally in a direction corresponding to the tilt, the entire build object is rotated rather than simply raising one side, which may cause shearing forces. The horizontal distance the elevator apparatus needs to shift equals the vertical distance one of the elevators moves to effect the tilt multiplied by the height of the build part all divided by the distance between the elevators. For example, if the left elevator is moved up by a distance D to begin the release process of a part that has a height H, and the two elevators are separated by a distance W, the build platform should be shifted to the right a distance $d=D \cdot H/W$. Ideally, the accelerations for the two movements should be matched. When the part is moved back down to engage the coated film, the same action of shifting the elevator, and thereby the build part, may be performed in reverse.

Alternatively, the film may be shifted instead of the elevators attached to the build platform to accomplish the same rotation. Since the film may adhere to the image plane, either naturally or due to a vacuum hold, both the coater film and image plane may be moved in the image plane as the part is pulled away from the coater.

Figure 64:
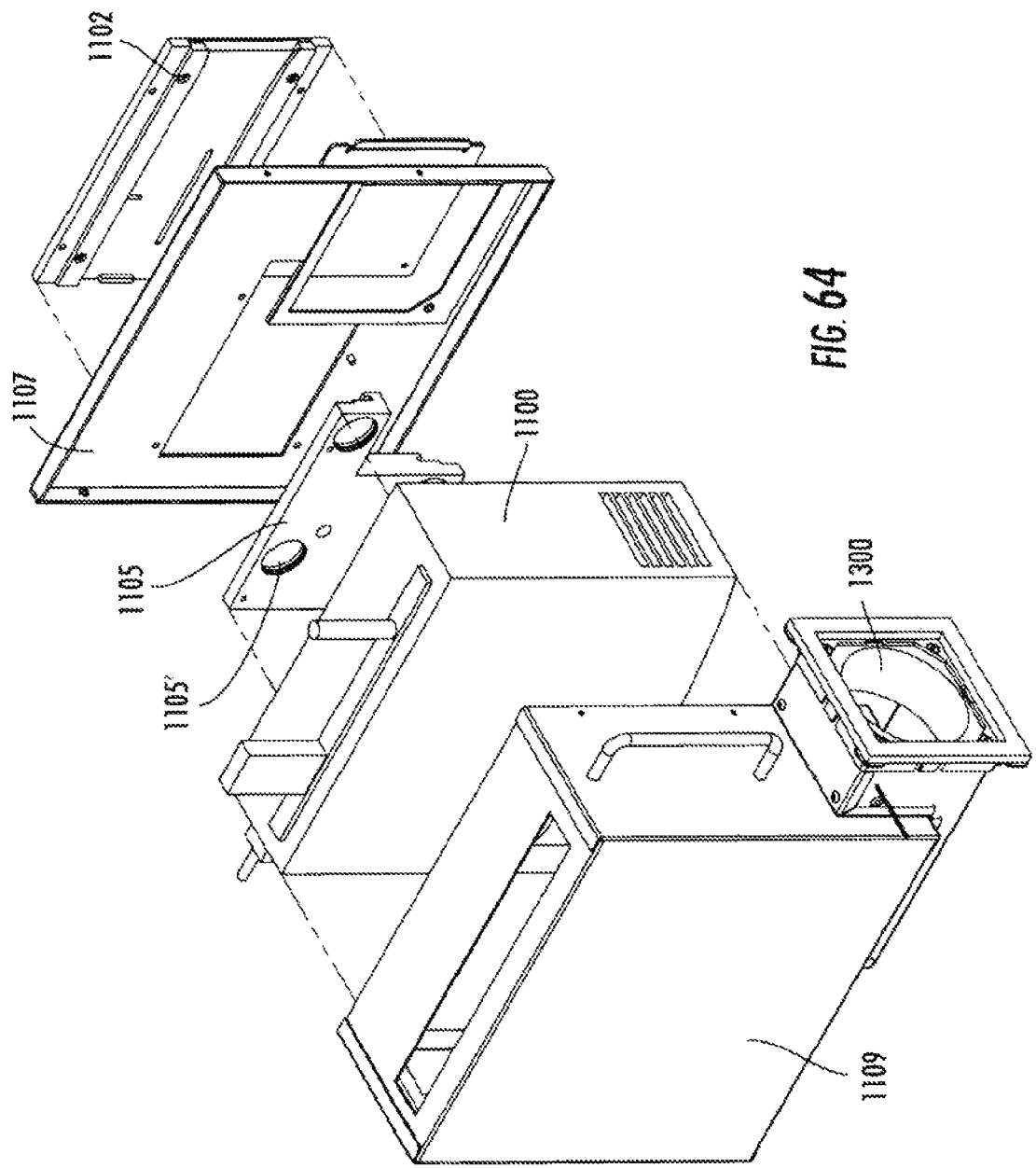
FIGS. 64, 64A, and 64B are exploded perspective views of an imager assembly and alignment fixture of the invention.
Figure 64A:
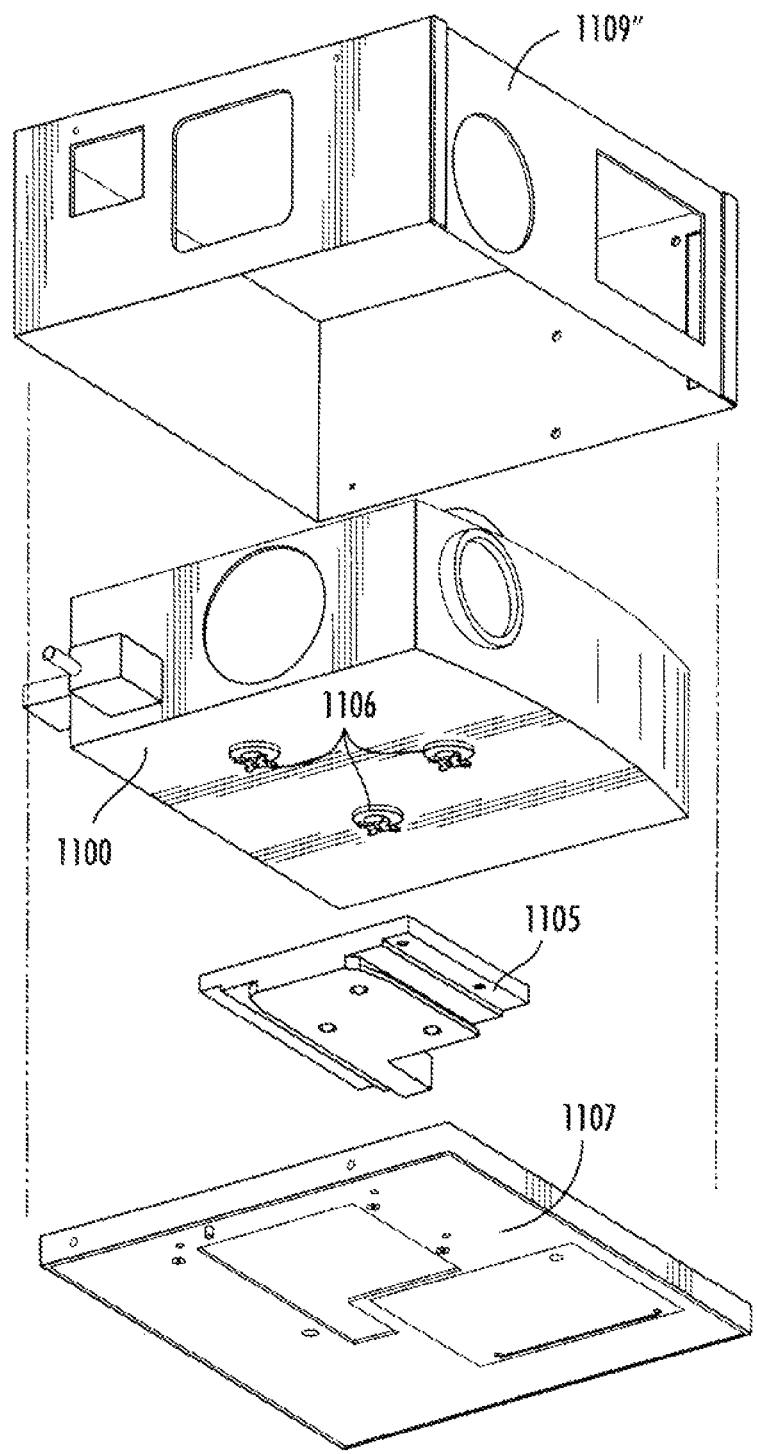
Figure 64B:
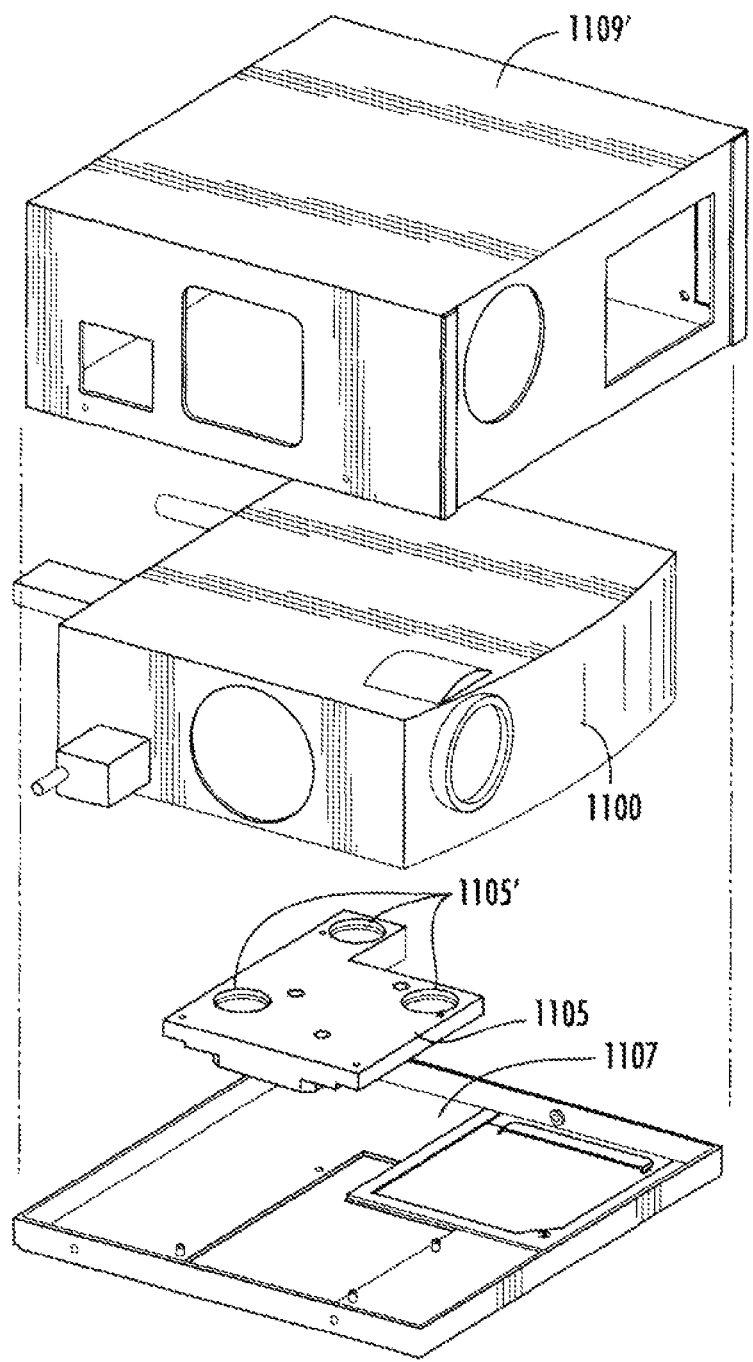

Turning now to the radiation assemblies of the invention, and in particular that of the imager 1100, FIGS. 64 through 64B illustrate an exploded imager alignment housing. The imager 1100 may be a custom-built UV projector or laser system or a commercially-available digital light processing ("DLP") projector with modified optics to display both unfiltered UV-A and visible light wavelengths, with a desired focal length established based on the arrangement of the flexible transport imaging system, and the light intensity adjusted based on the build material used. Other useful imagers include liquid crystal display ("LCD") projectors, liquid crystal on silicon ("LCoS") projectors, and light emitting diode ("LED") projectors, which are similar to LCD projectors and use bright LED's for the light source instead of an arc lamp. DLP projectors made specifically for UV are also contemplated, although the build material may need to be modified to take full advantage of the projector. Also contemplated are imager arrays of UV-only LED's or plasma arrays in projectors with transfer lenses. Traditional CRT projectors can be used with visible and UV or with UV only.

In one specific embodiment, the imager is a DLP projector having a lamp and a nine-element projection lens imaging radiation from the lamp over a spectral range suitable for solid imaging including from 350 to 450 nm in focus at a projection distance of 400 mm over an image area of 9 inches by 6.75 inches. The DLP projector may include a UV/IR filter to remove radiation from the lamp outside the desired spectral range. An illumination lens may be used to uniformly distribute radiation from the lamp across the imaging element. A UV-enhanced light pipe interconnecting the lamp and the illumination lens and UV-enhanced mirrors in radiation-directing communication with the illumination lens and imaging element may also be provided.

Figure 65:
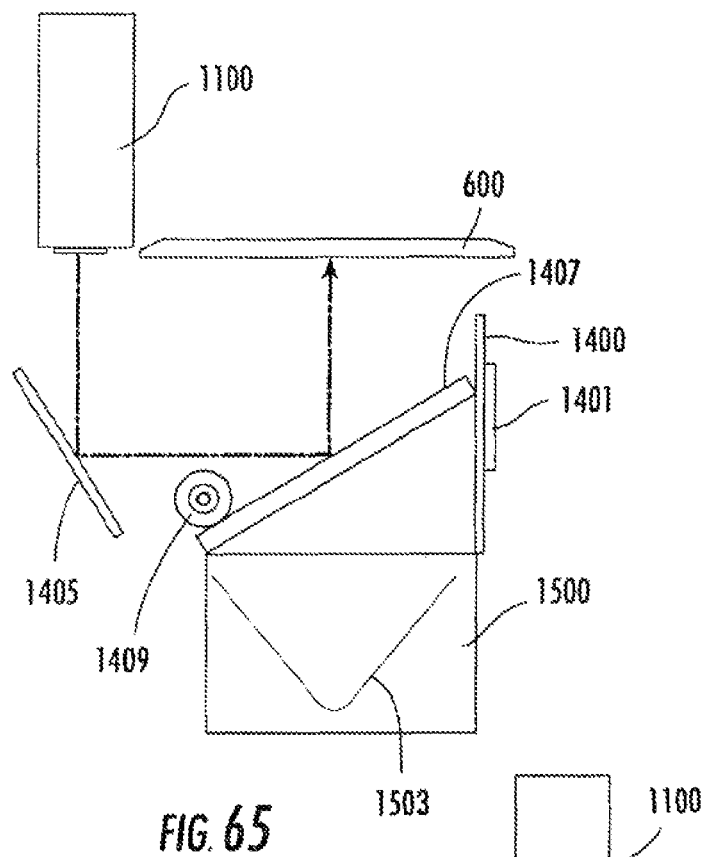
FIGS. 65 and 66 are schematic plan sequence views, the plan views being taken from the right side of the apparatus by rotating the apparatus of FIG. 2 counterclockwise, illustrating a digital light processing ("DLP") imager illuminating the underside of the radiation-transparent image plane via a mirror assembly for folding the image in FIG. 65 and then in FIG. 66 retraction of one mirror for illumination of the image plane by a high-intensity UV assembly for post-image curing.
Figure 66:
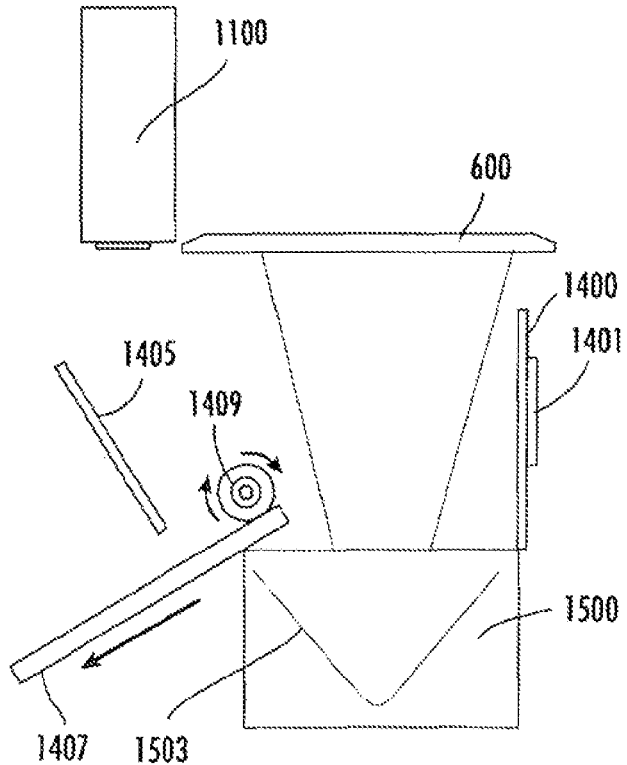

Because an imager has a specific focal length corresponding to the size of the build pad, and larger builds therefore require a longer focal length, larger builds would necessitate a correspondingly larger solid imaging apparatus. Alternatively, a series of mirrors 1405, 1407 as illustrated in FIGS. 65 and 66 or a mirror assembly 1399 as illustrated in FIG. 3 are provided to reflect the projected light onto the image plane within a smaller frame, effectively "bending" the projected light within the apparatus while maintaining a longer focal length.

Image alignment typically will have already been accomplished prior to shipment to the user so that all a user of the apparatus of the invention has to do is remove and replace a spent imager with a new one to obtain an aligned image. Imager alignment is accomplished prior to purchase of the imager by the user using an imager alignment fixture and an alignment procedure as described below.

The imager typically has a frame 1109, 1107 into which the imager components are fixed, the frame having alignment members 1106 (FIG. 64A) corresponding to receptacles 1105' (FIG. 64) in an alignment fixture 1105. The receptacles may contain an adhesive to fix the frame securely in position to the alignment fixture. One embodiment of the alignment fixture 1105 for three such frame alignment members 1106 and having alignment fixture receptacles 1105' is shown in FIGS. 64 through 64B.

The imager alignment fixture may then be precisely aligned and interlocked to fit within a corresponding alignment fixture 1102 located on the solid imaging apparatus (FIGS. 2 and 3). The connection between the corresponding alignment fixtures may be one or more tongues on the imager alignment fixture corresponding to one or more grooves in the apparatus fixture. The housing 1109, 1109', and 1107 that contains the imager 1100 and the associated alignment fixture 1105 also includes vents for venting heat produced by the imager.

To align and focus the imager prior to shipment to the user, therefore, the imaging alignment fixture should be precisely located, a target should be imaged at a fixed distance between the target and the imager, the location of the imager should be adjusted accordingly so that the image is located precisely on the target, the imager should be focused, and then the alignment fixture should be secured to the adjusted imager. To align the imager in this system, a target fixture may be placed on the image plane in place of the build pad and the fixture may be adjusted by adjusting the build pad support frame. Thereafter, a build pad inserted into its corresponding supporting frame by the user will be aligned to the imager.

Once the imager is aligned, and before shipment to the user, the imager may then be characterized for the gray scale for any pixel in the image against a predetermined threshold of solidification of the borders in the build. Gray scale adjustment is described in co-pending and commonly owned U.S. patent application Ser. No. 11/468,090 filed Aug. 29, 2006 for "Improved Wall Smoothness," the contents of which are incorporated herein by reference in their entirety.

An alternative, although less efficient method of improving the borders of the build, not necessarily with equivalent results, is to image a layer of build material more than one time, shifting the image in the subpixel range to achieve better resolution at the boundaries of the build, as is described in co-pending and commonly owned U.S. patent application Ser. No. 11/096,748 filed Apr. 1, 2005 for Edge Smoothness with Low Resolution Projected Images for Use in Solid Imaging," the contents of which are incorporated herein by reference in their entirety.

Turning now to a discussion of the additional radiation assemblies of the invention, which are used for a secondary cure to further react and dry the build layers, FIGS. 65 and 66 illustrate schematically a high-intensity UV lamp assembly 1500 and an imager 1100. A pair of mirrors 1405 and 1407 form a mirror assembly located within the desk top modeler behind a UV shield 1400 (FIG. 2) so as to convey the image to the image plane in a compact format. Mirror 1405 is fixedly secured within the desk top modeler while mirror 1407 is reciprocatingly secured for moving back and forth by a track wheel 1409.

Mirror 1405 is generally located at an angle from the vertical of about 30 degrees and the mirror 1407 is generally located at an angle of about 60 degrees from the vertical. Mirror 1407 is reciprocatingly secured for use in illuminating the image plane assembly 600 when extended (FIG. 65) and illumination of the image plane assembly by the high intensity UV assembly 1500 when retracted (FIG. 66). Reference photo diodes 1401 for monitoring intensity (FIG. 2) are useful for making process adjustments depending on the age of the imager and for monitoring performance of the high intensity UV source, both of which usefully may be located in UV shield 1400.

UV sensor/bulb degradation indicators, such as the photo diodes mentioned above, are used primarily to adjust the exposure time to achieve constant exposures. Because the light intensity of an imager and a high intensity UV bulb may fade as the imager ages, the UV sensor/bulb degradation indicator also can signal when the intensity of the imager needs to be increased to counteract any degradation or ultimately when the imager or high intensity bulb needs to be replaced.

The intensity of the projected image may be measured and characterized against a gray scale of from black to white of from 0 to 255. The gray scale is measured at one location and the intensity measurement may be taken at 16 different locations selected diagonally across the image plane from corner-to-corner and horizontally and vertically across the image plane.

The high intensity UV lamp assembly 1500 comprises a pull out housing frame 1501 (FIG. 2) that can be easily inserted into and removed from the desk top modeler for replacement as needed. Within the frame are located a high intensity UV bulb 1502 and a parabolic reflector 1503, the bulb being of an intensity capable of curing the build through each individual layer to the previously built layer, typically about 600 Watts in the embodiment illustrated. A transparent build pad normally is not needed with a high intensity UV source to achieve a through-the-build cure. High intensity UV is applied after each layer is initially cured by the imager 1100 and cleaned by the intra-layer cleaning assembly 300 (FIG. 2). The high intensity UV source provides a final cure that produces a tack-free and fully reacted build.

Through-the-build cure is a function of the available UV energy and the time it takes to cure through a layer and to obtain a tack-free condition on the backside of the build, which is the side attached to the supports on the build pad. Generally speaking, through-the-build cure can be obtained with a build material of a relatively high degree of photosensitivity by applying 80 mW/cm2 of UV-A for about 8 seconds, which is about 0.64 J/cm2. A less sensitive build material may require more, and so a useful range of UV-A is from about 0.5 to 3 J/cm2, depending on the demands of the specific build material. A medium-pressure mercury arc lamp having 600 Watts of input power in the reflector illustrated in FIG. 67A can achieve 80 mW/cm2 over a build area of 9×6.75 inches, which is 392 cm2, which is a total utilization of about 31 Watts of UV-A.

Individual lamps may be more or less efficient, and the invention could be practiced with more or less UV-A depending on whether the operator wanted to speed up or slow down the rate of cure. For example, mercury arc lamps are available with less power, down to about 300 Watts, or with more power, up to several thousand Watts. These sources could be used within practical limits on time and cooling and the context of use. Higher power systems may not be compatible with use in a desk-top modeler for the office.

It should be recognized that a variety of other sources of UV could be used, including those that also provide visible or other radiation, including those mentioned above as imagers, so long as the imager or other source provides sufficient UV to obtain post-curing of a build, as set forth above.

Figure 67:
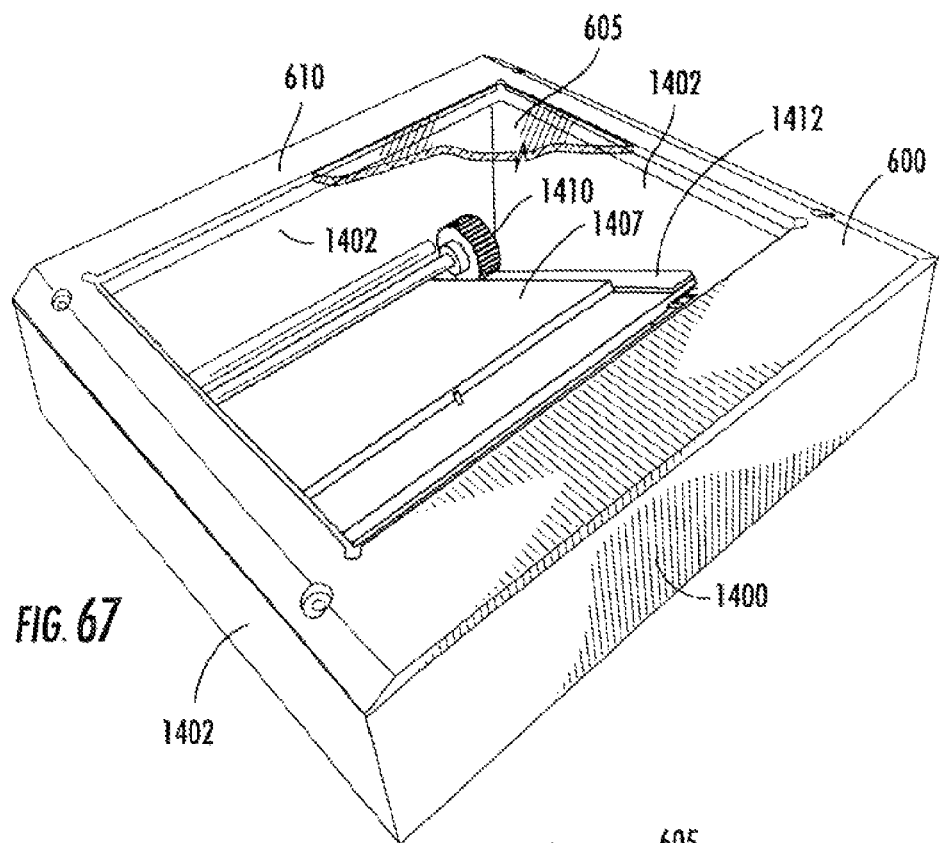
FIGS. 67 and 67A are overhead perspective sequence views from the viewer's left-hand side, viewing the front of the apparatus of FIG. 2, of the image plane in partial section and the frame for the image plane mounted atop a UV assembly and illustrating a retractable mirror in FIG. 67 and retraction of the mirror in FIG. 67A for illumination of the image plane by the UV assembly.
Figure 67A:
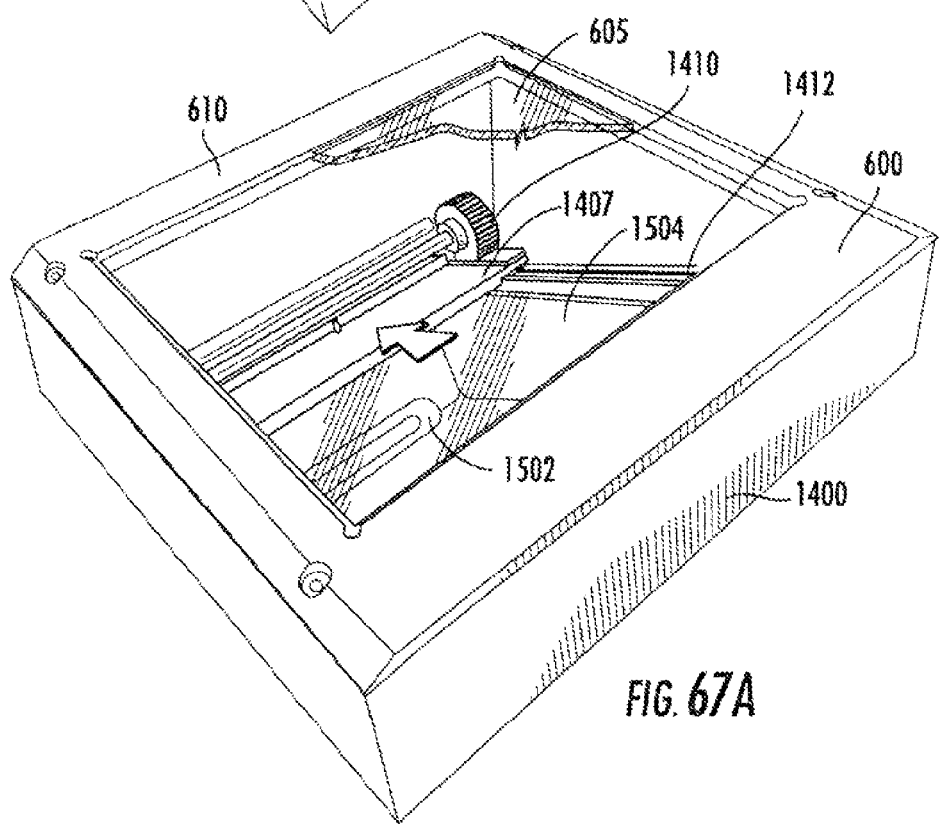
Figure 68:
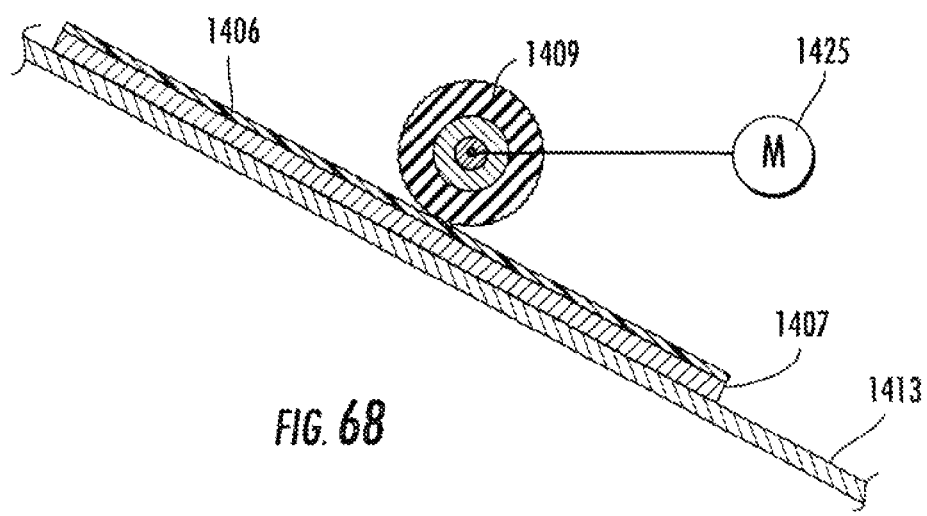
FIG. 68 is a sectional schematic partial side plan view taken from FIG. 67B illustrating the toothed rubber roller wheel, drive motor M, friction surface, mirror-supporting frame, and mirror retraction track.

Turning now to a discussion of the operation of the reciprocating mirror 1407 (FIGS. 65 and 66) as illustrated in more detail in FIGS. 67 through 68, FIG. 67 illustrates image plane assembly 600 mounted atop a housing box frame 1400, 1402 for the reciprocating mirror 1407. A right-most toothed rubber roller wheel 1410 engages a friction track 1412 to retract and extend the mirror. There are two such rollers and tracks, one on the left and one on the right side of the mirror 1407. In FIG. 67, the mirror is fully extended for imaging the image plane assembly. In FIG. 67A, the mirror is retracted, exposing the image plane to the UV bulb 1502 and parabolic reflector 1504 below. The roller wheels are driven by a motor 1425 (FIGS. 2 and 68), which is a DC planetary gear motor similar to that used to extend the transport film and intra-layer cleaning assembly.

A large amount of heat can be generated by the UV bulb, which typically remains on at all times during use of the apparatus because it cannot be instantly turned off and on. The surface of the bulb may approach 1000 degrees Fahrenheit or more and the surface of the bulb enclosure may reach 200 degrees Fahrenheit or more. The apparatus is provided with a multiplicity of cooling channels and fans (as illustrated in one embodiment at 1600, FIG. 2) for forced air cooling for removing excess heat, and may also be provided with dust filters for intake air and charcoal filters for odor control, if desired.

Figure 67B:
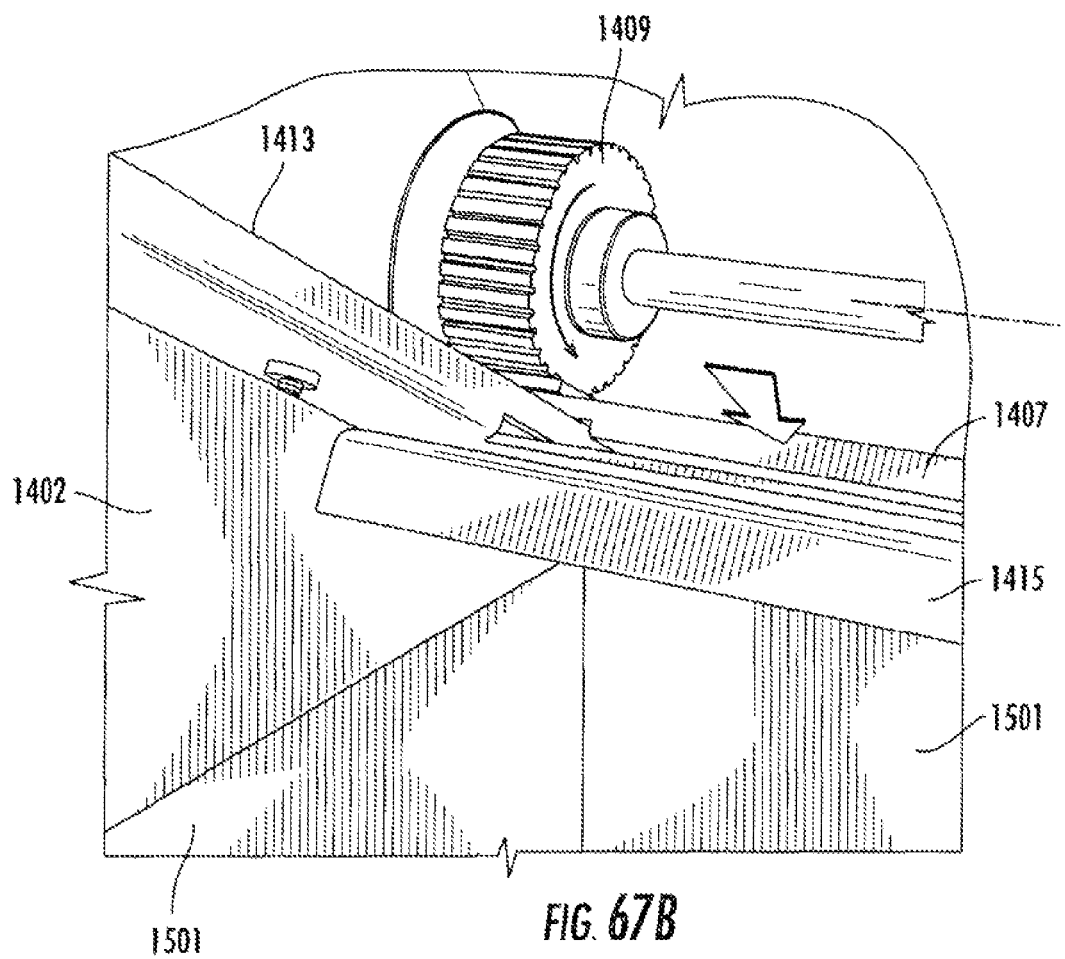
FIG. 67B is a partial perspective view from inside the right-hand front corner of the UV assembly of FIG. 67A illustrating the retracted mirror of FIG. 67A from underneath the image plane and facing the left-most rubber roller wheel, which rotates against a friction surface to retract and extend the mirror.

For example, a dust filter may be provided on the vented housing floor of the apparatus as illustrated in floor 134' of FIG. 3. Suitably located intake fans pulling air through a dust filter in the housing floor can discharge into the mirror box frame 1402 and behind the UV box frame 1500, 1501 (FIG. 67B). A fan can be located inside the UV box to blow air received from the intake fans around the parabolic reflector 1503 (FIG. 65) and into the mirror frame box 1400, 1402 (FIG. 67). The mirror box frame should be open to discharge to the surrounding housing thereby to exit the housing. Exhaust fans useful for this purpose and charcoal filters for odor control may be located at the rear of the housing.

FIG. 67B illustrates the retracted mirror 1407 and a more detailed view of the support 1413 for mirror frame box 1415 and the left-most toothed rubber wheel 1409, corresponding to wheel 1410 (FIG. 67A). The mirror sits atop a box frame element 1415 reciprocatingly mounted in frame 1411 atop mirror frame 1402 in support 1413. A section through the toothed wheel 1409 illustrates electrical connection with a motor M (component 1425 in FIG. 2) and the relationship of the friction track 1416, mirror 1407, and mirror support frame 1413.

An alternative fixed mirror assembly 1399 comprising a similar pair of mirrors is shown in FIG. 3. In the alternative arrangement of FIG. 3, the mirrors of mirror assembly 1399 are fixed at a similar angle to those of FIGS. 2 and 65 and are not retractable for reciprocating operation since no separate UV source is located below the mirrors. Instead, UV for post-curing, if any, is provided through the image plane by the imager via the mirrors and additional UV sources, halo assembly 1500' and hood assembly 1500" as described below and in connection with FIG. 3 above.

Figure 69:
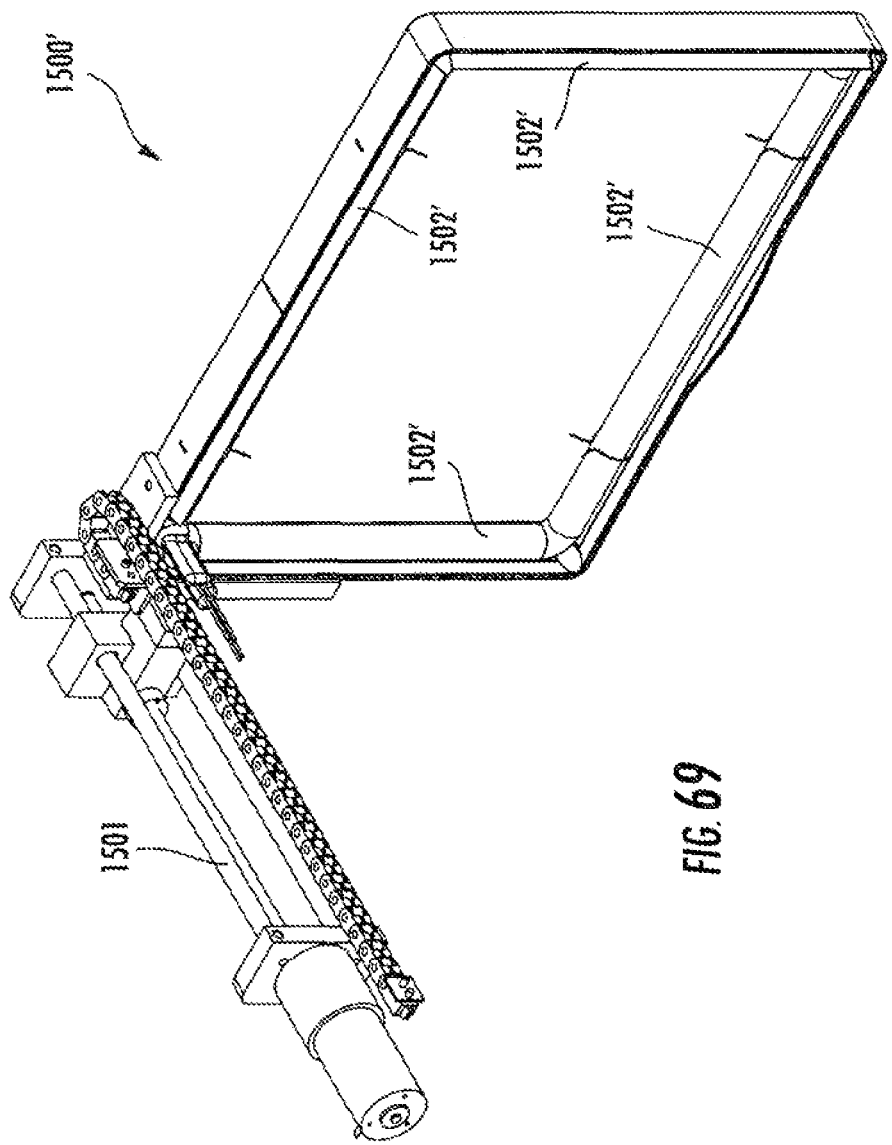
FIG. 69 is a perspective view of a halo assembly of the invention for secondary cure UV exposure of the sides of the build.

FIG. 69 illustrates halo assembly 1500'. The halo assembly travels on a stepper motor-and-guide-rod elevator 1501' to provides UV radiation at a somewhat lower intensity of about 100 Watts to the vertically oriented surfaces of the build. UV bulbs 1502' contained in a frame 1503' surround the vertical surfaces of the build with UV radiation.

Figure 70:
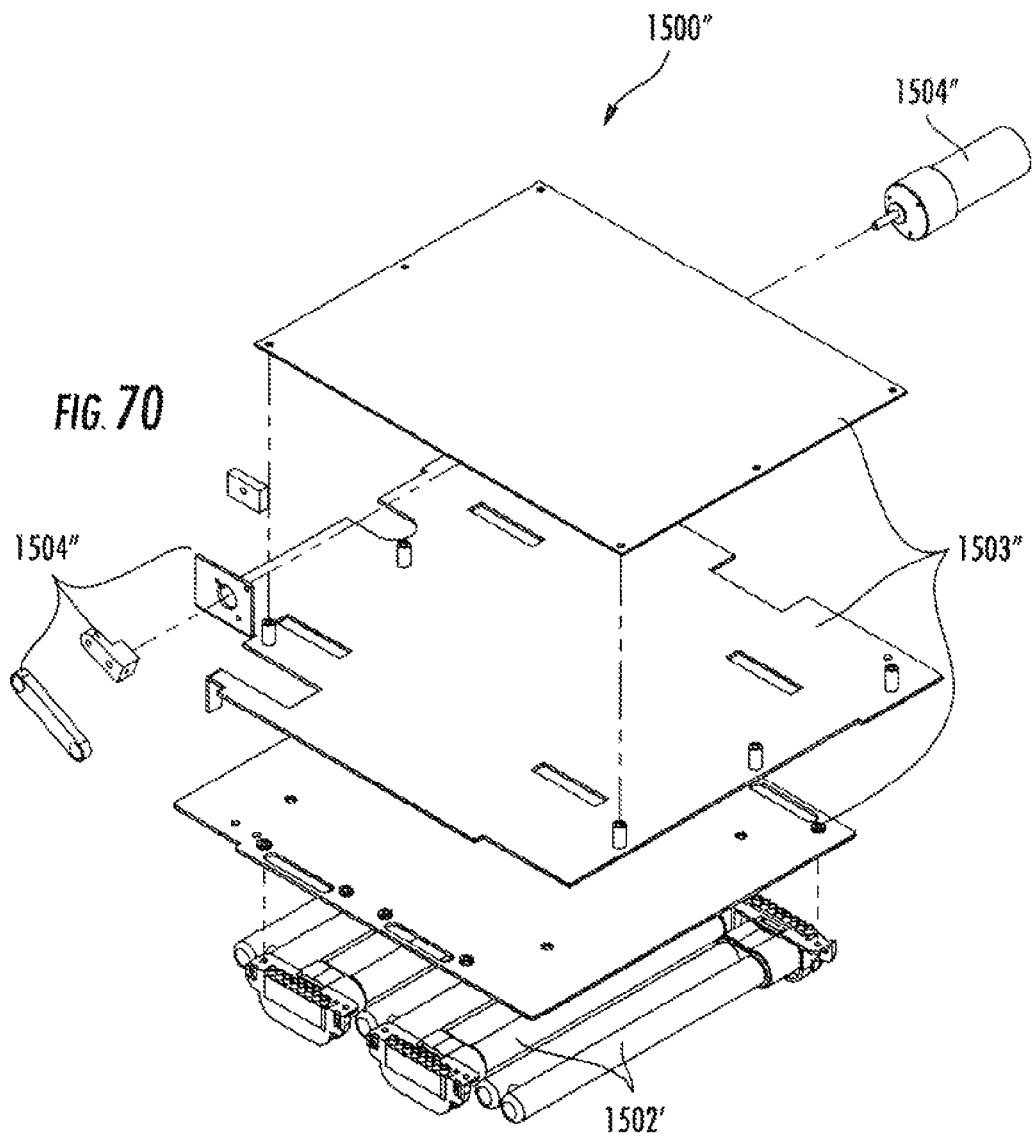
FIG. 70 is a perspective view of a hood assembly of the invention for secondary cure UV exposure through the build platform.

FIG. 70 illustrates hood assembly 1500", which includes UV bulbs 1502' of about 100 Watts mounted to a frame 1503" (shown in exploded view) that has a lever arm and motor assembly 1504" (also shown in exploded view) for providing UV radiation through a transparent build pad (FIG. 58) to the supports and initial build layers.

The invention has been described with specific reference to preferred embodiments. However, variations can be made within the spirit and scope of the invention as described in the foregoing specification as defined in the appended claims.

What is claimed is:

1. A method for facilitating release of a build object on a build platform in a solid imaging device from an image plane in the solid imaging device, said method comprising the steps of:
   a) solidifying solid image build material on the image plane to the build object to define a layer of the build object;
   b) tilting with respect to the image plane the build platform to lift one edge of the build object off the image plane, wherein tilting of the build platform is performed while lifting the build object from the image plane; and
   c) repeating steps (a) and (b) for at least one additional layer of the build object.

2. The method of claim 1 wherein the steps (a) through (b) are repeated, alternately lifting a first and a second edge.

3. The method of claim 1 wherein said image plane further comprises a flexible build material transport surface on a rigid surface transparent to solid imaging radiation and said method further comprises the steps of adhering the transport surface to the rigid surface, contacting a layer of build material on the build material transport surface opposite the rigid surface with the build, and imaging the layer to solidify the layer, and wherein said step of tilting the build platform lifts one edge of the build off the transport surface.

4. The method of claim 3 further comprising the steps of lifting the build off the transport surface and thereafter releasing the transport surface from the rigid surface.

5. The method of claim 1 wherein tilting the build platform to lift one edge of the build object breaks an attractive force between the cured build material and the surface to which it is adhered.

6. The method of claim 5 wherein the surface to which the cured build material is adhered is a transport film.

7. The method of claim 1 further comprising horizontally displacing the build platform relative to the image plane while tilting the build platform.

8. The method of claim 7 wherein horizontally displacing the build platform avoids at least one of distorting, bending, or tearing features of the build object.

\* \* \* \* \*